(12) United States Patent
Mizuno et al.

(10) Patent No.: US 6,996,052 B1
(45) Date of Patent: Feb. 7, 2006

(54) OPTICAL INFORMATION RECORDING MEDIUM AND OPTICAL RECORDING METHOD

(75) Inventors: Hironobu Mizuno, Yokohama (JP); Takashi Ohno, Yokohama (JP); Michikazu Horie, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/530,599

(22) PCT Filed: Sep. 8, 1999

(86) PCT No.: PCT/JP99/04874

§ 371 (c)(1),
(2), (4) Date: May 9, 2000

(87) PCT Pub. No.: WO00/14735

PCT Pub. Date: Mar. 16, 2000

(30) Foreign Application Priority Data

| Sep. 9, 1998 | (JP) | 10/254877 |
| Mar. 3, 1999 | (JP) | 11/055792 |
| Jun. 10, 1999 | (JP) | 11/163685 |

(51) Int. Cl.
*G11B 7/24* (2006.01)

(52) U.S. Cl. .............. 369/275.1; 369/275.2; 369/13.35; 369/13.41; 369/47.1

(58) Field of Classification Search ......... 369/13.01, 369/13.02, 13.04, 13.06, 47.1, 47.49, 47.5, 369/47.53, 53.1, 53.11, 59.1, 59.11, 59.12, 369/116, 275.1, 275.2

See application file for complete search history.

(56) References Cited

U.S. PATENT DOCUMENTS

| 5,304,440 | A | * | 4/1994 | Ono et al. ............... 430/21 |
| 5,541,909 | A | * | 7/1996 | Nakajima et al. ........ 369/275.1 |
| 5,637,372 | A |   | 6/1997 | Tominaga et al. |
| 5,789,055 | A |   | 8/1998 | Yoon |
| 6,004,646 | A |   | 12/1999 | Ohno et al. |
| 6,128,273 | A | * | 10/2000 | Horie et al. ............ 369/275.4 |
| 6,143,468 | A |   | 11/2000 | Ohno et al. |
| 6,294,310 | B1 |  | 9/2001 | Ohno et al. |
| 6,411,585 | B1 |  | 6/2002 | Kobayashi |

FOREIGN PATENT DOCUMENTS

| EP | 0 717 404 | 6/1996 |
| EP | 0 844 607 | 5/1998 |
| EP | 0 847 049 | 6/1998 |
| JP | 1-303643 | 12/1989 |

(Continued)

OTHER PUBLICATIONS

U.S. Appl. No. 09/530,599, filed May 9, 2000, Pending.

(Continued)

*Primary Examiner*—Muhammad Edun
(74) *Attorney, Agent, or Firm*—Oblon, Spivak, McClelland, Maier & Neustadt, P.C.

(57) ABSTRACT

An optical information recording medium for recording information by a plurality of record mark lengths, wherein the shortest mark length is at most 0.5 $\mu$m, and a crystal state is an unrecorded or erased state and an amorphous state is a recorded state, wherein the erasing is carried out by recrystallization which substantially proceeds by crystal growth from an interface between the amorphous portion or a melt portion and a peripheral crystal portion; and an optical recording method suitable therefore. The medium of the present invention has characteristics that overwriting can be made at a high speed, the jitter of mark edge is small, mark length modulation recording can be made at a high density, and the formed mark is excellent in the stability with the lapse of time.

63 Claims, 32 Drawing Sheets

FOREIGN PATENT DOCUMENTS

| | | |
|---|---|---|
| JP | 4-28587 | 1/1992 |
| JP | 5-174422 | 7/1993 |
| JP | 5-282704 | 10/1993 |
| JP | 9-282661 | 10/1997 |
| JP | 10-112028 | 4/1998 |
| JP | 10-112063 | 4/1998 |
| JP | 10-283677 | 10/1998 |
| JP | 10-320773 | 12/1998 |

OTHER PUBLICATIONS

U.S. Appl. No. 09/919,846, filed Aug. 2, 2001, Pending.
U.S. Appl. No. 10/059,193, filed Jan. 31, 2002, Pending.
U.S. Appl. No. 10/287,582, filed Nov. 5, 2002, Pending.
U.S. Appl. No. 09/530,599, filed May 5, 2000, Pending.
U.S. Appl. No. 09/842,035, filed Apr. 26, 2001, Pending.
N. Miyagawa, et al., Japanese Journal of Applied Physics, vol. 35, Part I, No. 1B, XP-000729856, pp. 502-503, "Phase Change Optical Disk Using Land and Groove Method Applicable to Proposed Super Density Rewritable Disc Specifications", 1996.
U.S. Appl. No. 09/530,599, May 9, 2000, Mizuno et al.
U.S. Appl. No. 10/900,108, Jul. 28, 2004, Mizuno et al.
U.S. Appl. No. 09/530,599, May 9, 2000, Mizuno et al.
U.S. Appl. No. 10/890,414, Jul. 14, 2004, Ohno et al.
U.S. Appl. No. 11/104,542, Apr. 13, 2005, Ohno et al.
U.S. Appl. No. 11/113,119, Apr. 25, 2005, Ohno et al.
U.S. Appl. No. 09/530,599, May 9, 2000, Mizuno et al.

\* cited by examiner (b)

(a)

(b) COMPARATIVE EXAMPLE 1

(a) EXAMPLE 1

(a) MARK LENGTH DEPENDENCY (b) RECORDING LINEAR VELOCITY DEPENDENCY

RECORDING ONCE AFTER DC ERASING
AFTER 10 TIMES OF DOW (b)

(a)

OPTICAL INFORMATION RECORDING MEDIUM AND OPTICAL RECORDING METHOD

BACKGROUND OF THE INVENTION

1. Field of the Invention

The present invention relates to an optical information recording medium for high density recording having a phase-change type recording layer, such as a rewritable DVD, and an optical recording method. Particularly, it relates to an optical information recording medium and an optical recording method, whereby the linear velocity dependency and the recording power dependency at the time of one-beam overwriting and the stability with time of recorded marks, are improved.

2. Discussion of the Background

With a compact disk (CD) or DVD, it is common that recording of binary signals and detection of tracking signals are carried out by utilizing a change in reflectance caused by interference of reflected lights from the mirror surface and the bottom of pits.

In recent years, phase-change type rewritable compact disks (CD-RW, CD-Rewritable) have been widely used as media interchangeable with CD. Further, also with respect to DVD, various proposals have been made for phase-change type rewritable DVD.

Such phase-change type rewritable CD and DVD utilize a change in the phase difference and the difference in reflectance caused by a difference in the refractive index as between an amorphous state and a crystalline state for detecting recording information signals. A usual phase-change medium has a structure comprising a substrate, and a lower protective layer, a phase-change recording layer, an upper protective layer and a reflective layer, formed on the substrate, whereby multiple interference of these layers can be utilized to control the difference in reflectance and the phase difference and to provide CD or DVD with interchangeability.

With CD-RW, within a range where the reflectance is lowered to a level of from 15 to 25%, interchangeability with a CD in the recording signals and the groove signals can be secured, and retrieving can be carried out by a CD drive having an amplifying system added in order to complement the low reflectance.

With a phase-change recording medium, erasing and rewriting can be carried out simply by modulating the intensity of a single laser beam. Accordingly, with a phase-change recording medium such as CD-RW or rewritable DVD, recording includes overwriting wherein recording and erasing are carried out at the same time.

For information recording utilizing a phase-change, it is possible to employ a crystal state, an amorphous state or a mixed state thereof, and a plurality of crystal phases may also be used. However, with rewritable phase-change recording media which are presently practically used, it is common that an unrecorded or erased state is a crystal state, and recording is carried out by forming amorphous marks. As a material for the recording layer, it is common to employ a chalcogen element, i.e. a chalcogenide alloy containing S, Se or Te.

For example, it may be a GeSbTe type containing, as the main component, a GeTe—$Sb_2Te_3$ pseudo binary alloy, an InSbTe type containing, as the main component, an InTe—$Sb_2Te_3$ pseudo binary alloy, a AgInSbTe type alloy containing, as the main component, eutectic crystal of $Sb_{0.7}Te_{0.3}$, or a GeSnTe type.

Among them, a system having excess Sb added to a GeTe—$Sb_2Te_3$ pseudo binary alloy, particularly, an intermetallic compound neighborhood composition such as $Ge_1Sb_2Te_4$ or $Ge_2Sb_2Te_5$, has been mainly practically used.

Such a composition is characterized by crystallization accompanying no phase separation which is specific to an intermetallic compound and has a high crystal-growth rate, whereby initialization is easy, and the recrystallization speed at the time of erasing is high. Therefore, as a recording layer showing practical overwriting characteristics, an attention has been drawn only to a pseudo binary alloy system or an intermetallic compound neighborhood composition (Jpn. J. Appl. Phys., vol. 69 (1991), p 2849 or SPIE, Vol. 2514 (1995), pp 294 –301).

On the other hand, with such a composition, metastable tetragonal system crystal grains will grow. Such crystal grains show distinct grain boundaries, and their sizes are not uniform and optical anisotropy is remarkable depending upon the orientation. Accordingly, there is a problem that optical white noises are likely to be generated.

Such crystal grains different in the particle sizes and optical properties, are likely to grow around amorphous marks, whereby there will be a problem that jitter of mark is likely to increase, or the optical characteristics are different from peripheral crystals, whereby they are likely to be detected as non-erased portions.

Accordingly, there has been a problem that it is impossible to obtain good retrieving characteristics in recording at a high linear velocity or in high density mark length modulation recording. Specifically, according to the specification for rewritable DVD, the shortest mark length is 0.6 $\mu$m, but if the shortest mark length is further decreased, jitter has been found to increase abruptly.

As a method for reducing jitter, there is so-called absorptivity correction. With a conventional four-layer structure, light energy absorbed by a recording layer is usually such that light energy Ac absorbed in a crystal state having a high reflectance is smaller than light energy Aa absorbed in an amorphous state having a low reflectance (Ac<Aa). Therefore, there is a problem that depending upon whether the original state was a crystal state or an amorphous state at the time of overwriting, the shapes, etc., of newly recorded marks are different, whereby jitter will increase.

Here, by adjusting the absorptivity of light energy in the crystal state and in the amorphous state to be substantially equal, the mark shape may be stabilized irrespective of the original state, whereby jitter can be reduced. Further, crystal requires an extra heat corresponding to the latent heat at the time of melting, and accordingly, it is preferred to adjust so that light energy is absorbed more in the crystal state (Ac>Aa).

To accomplish this relationship, a method may be mentioned wherein at least one layer of light absorptive nature is added to make a structure of at least 5 layers, so that part of light absorption in the amorphous state is absorbed by this absorptive layer. For example, an absorptive layer of e.g. Au or Si is inserted between the lower protective layer and the substrate or on the upper protective layer (Jpn. J. Appl. Phys., vol. 37 (1998), pp 3339–3342, Jpn. L. Appl. Phys., Vol. 37 (1998), pp 2516 –2520).

However, such a layer structure creates a problem in the heat-resisting property or the adhesion of the absorptive layer, whereby deterioration such as microscopic deformation or peeling tends to be remarkable by repetitive overwriting. Further, the storage stability is likely to be impaired, since peeling or the like is likely to occur.

Namely, it has been difficult with a GeTe—$Sb_2Te_3$ pseudo binary alloy recording layer to accomplish high densification while maintaining a conventional four-layer structure.

Further, with the GeTe—$Sb_2Te_3$ pseudo binary alloy recording layer, the birefringence has a wavelength dependency such that the shorter the wavelength, the smaller the real part and the larger the imaginary part. Accordingly, especially when a short wavelength laser beam is employed as a light source, it is difficult to accomplish the condition of Ac>Aa.

Therefore, in recent years, a AgInSbTe four component alloy has been employed as a material for the recording layer. The AgInSbTe four component alloy has a feature that an erasing ratio as high as 40 dB can be obtained, whereby a high linear velocity and high density mark length modulation recording can be carried out with the conventional four-layer structure without absorptivity correction.

However, high speed recording usually means that the crystallization speed is high and the recorded information is easily erased, whereby amorphous marks are likely to be crystallized and the stability of recorded marks with lapse of time is poor in many cases.

Further, a medium which is capable of recording and retrieving information at a high speed, has been demanded recently in order to shorten the time for recording or to speed up the transmission of information, as the quantity of information has increased. For example, a standard speed of CD (1-time velocity) is from 1.2 to 1.4 m/s. Whereas, CD-RW capable of recording at a speed as high as 4-times velocity has been commercialized, and CD-RW capable of recording at a speed as high as 8- to 10-times velocity is now desired.

On the other hand, as rewritable DVD, various types have been proposed or commercialized including DVD-RAM, DVD+RW and DVD-RW. However, rewritable DVD with 4.7 GB which is a capacity equivalent to read-only DVD, has not yet been practically developed.

Namely, a medium which is excellent in stability of marks and capable of recording short marks at a high speed is demanded.

However, it has been believed that the high speed recording and the stability of marks are incompatible properties and it is difficult to satisfy both of them at the same time.

The present inventors have extensively studied the principle of crystallization and conversion to amorphous state, and as a result, found an epoch-making medium satisfying all these properties at the same time.

Namely, it is an object of the present invention to provide an optical information recording medium which is capable of recording short marks very well at a high speed and excellent in the stability of marks, and an optical recording method.

SUMMARY OF THE INVENTION

In the first aspect, the present invention provides an optical information recording medium for recording information by a plurality of record mark lengths, wherein the shortest mark length is at most 0.5 $\mu$m, and a crystal state is an unrecorded or erased state and an amorphous state is a recorded state, which has, on a substrate, at least a phase change recording layer, wherein erasing of information is made by recrystallization which substantially proceeds by crystal growth from a boundary between a peripheral crystal portion and an amorphous portion or a melt portion.

In the second aspect, the present invention provides an optical information recording medium for recording information by a plurality of record mark lengths, wherein the shortest mark length is at most 0.5 $\mu$m, and a crystal state is an unrecorded or erased state and an amorphous state is a recorded state, which has, on a substrate, a phase change recording layer which is made of a thin film comprising Ge, Sb and Te as main components, wherein said medium will be crystallized when the recording layer is continuously irradiated at a constant linear velocity with a recording laser beam having a writing power Pw sufficient to melt the recording layer, and an amorphous mark will be formed when the recording layer is irradiated at a constant linear velocity with a recording laser beam having a writing power Pw sufficient to melt the recording layer, and then the recording laser beam is cut off.

In the third aspect, the present invention provides an optical information recording medium comprising a substrate, and a first protective layer, a phase change recording layer, a second protective layer and a reflective layer, formed on the substrate sequentially from the incident direction of a recording or retrieving laser beam, for recording information by a plurality of record mark lengths, wherein the shortest mark length is at most 0.5 $\mu$m, and a crystal state of the recording layer is an unrecorded or erased state and an amorphous state of the recording layer is a recorded state, wherein the phase change recording layer is made of a thin film having a thickness of from 5 nm to 25 nm and comprising, as a main component, a GeSbTe alloy having a composition represented by a region (except for the boundary lines) defined by four linear lines, i.e. linear line A connecting ($Sb_{0.7}Te_{0.3}$) and Ge, linear line B connecting ($Ge_{0.03}Sb_{0.68}Te_{0.29}$) and ($Sb_{0.95}Ge_{0.05}$), linear line C connecting ($Sb_{0.9}Ge_{0.1}$) and ($Te_{0.9}Ge_{0.1}$) and linear line D connecting ($Sb_{0.8}Te_{0.2}$) and Ge, in the GeSbTe ternary phase diagram, and the second protective layer has a thickness of from 5 nm to 30 nm.

In a further aspect, the present invention provides an optical recording method which is preferably employed when the above medium is used.

DESCRIPTION OF THE PREFERRED EMBODIMENT

Figure 1:
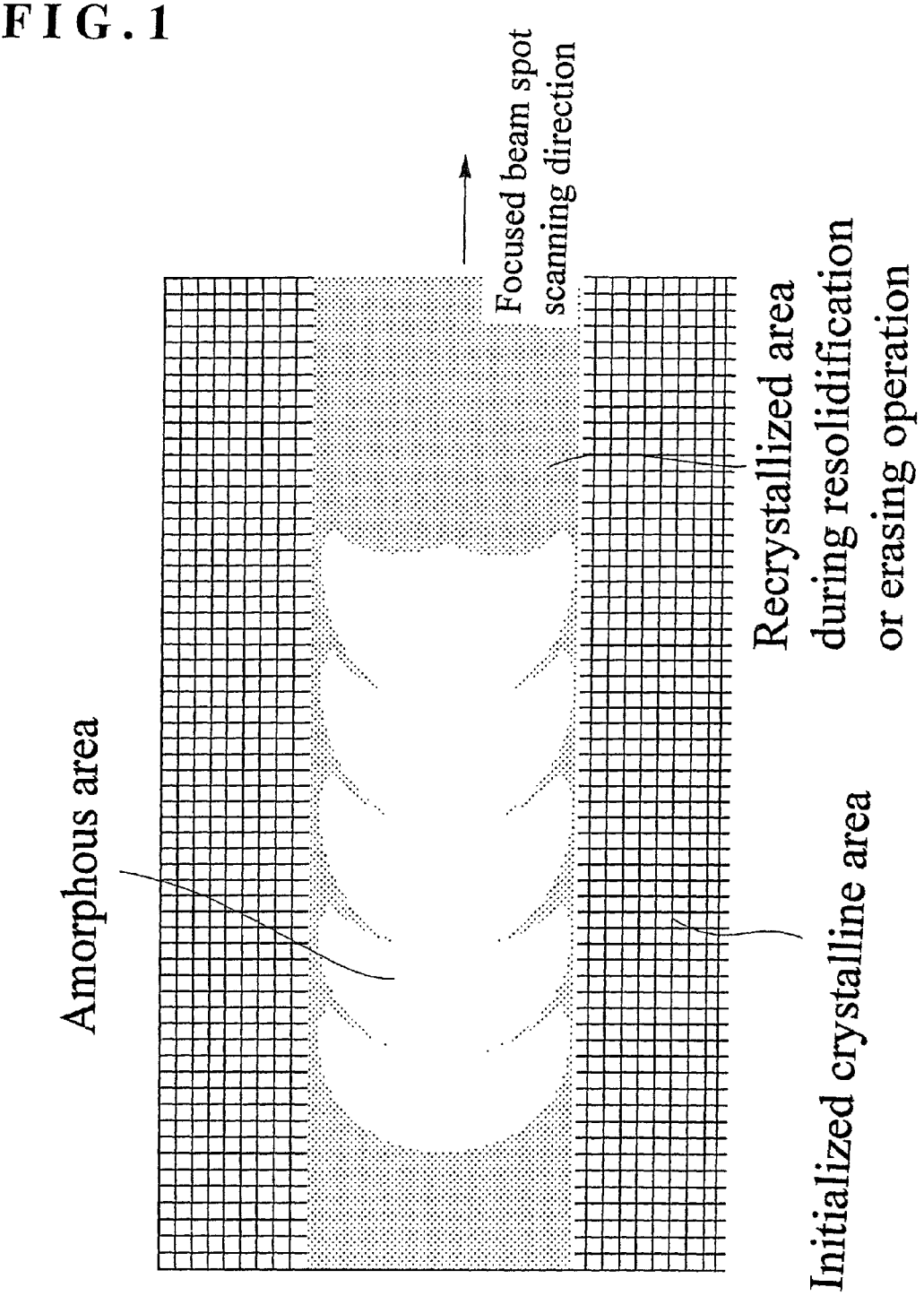
FIG. 1 is a view illustrating examples of amorphous mark shapes.

The present inventors have found that a high speed and high density stable recording can be made by using a phase change medium wherein a crystal state is an unrecorded or erased state and an amorphous state is a recorded state, and the erasing is carried out by recrystallization which substantially proceeds by crystal growth from the boundary between an amorphous portion or a melt portion and a peripheral crystal portion. Namely, by using such a medium, it is possible to conduct overwriting at a high speed, and conduct a high density mark length modulation recording with a small jitter of a mark edge, and the stability of the formed marks with the lapse of time is excellent.

In general, the erasing step of amorphous marks is caused by heating the recording layer up to a temperature of at least the crystallization temperature and at most the vicinity of the melting point to convert it to an amorphous solid state or a melt state, and then cooling for recrystallization.

According to the studies of the present inventors, the following has been found. Namely, recrystallization proceeds by two processes i.e. (1) formation of crystal nuclei in an amorphous region and (2) crystal growth starting from the boundary between an amorphous portion or a melt portion and a crystal portion. The above- mentioned effect can be obtained by suppressing the former so that the crystal nuclei formation hardly proceeds, and utilizing substantially only the latter crystal growth process.

In usual, the crystallization proceeds at a temperature of at least the crystallization temperature and at most the vicinity of the melting point. However, within this temperature range, the crystal nuclei formation proceeds at a relatively low temperature side and the crystal growth proceeds at a higher temperature side. The crystal nuclei formation is not necessarily required for the erasing. The erasing is possible when the crystal growth proceeds at a high speed from, as a nucleus, the boundary point between the amorphous portion or melt portion and a peripheral crystal region surrounding it.

Particularly, the finer or shorter the mark is, the easier the crystallization is made instantaneously to the center of mark only by the crystal growth from the peripheral crystal portion, whereby the erasing can be made completely for an extremely short period of time. Accordingly, the effect is significant in a high density recording medium using fine marks with the shortest mark length of at most 0.5 µm, by which the erasing can be made at a level of at most 100 nsec and a high speed overwriting can be made.

In general, the high density recording can be made as the shortest mark length is short. However, the shortest mark length is preferably at most 10 nm in view of the stability of marks.

Further, as the width of mark is narrow, the crystallization tends to be made instantaneously to the center of mark only by the crystal growth from the peripheral crystal portion, such being preferred. Accordingly, it is preferred to adjust the track pitch of tracks on which the information is to be recorded to, for example, at most 0.8 µm so that the mark will not be broadened horizontally. In usual, the mark width is about a half of the track pitch. In general, as the track pitch is narrow, a higher density recording can be made. However, the track pitch preferably at least 0.1 µm in view of the stability of mark. The track may be either a groove alone or both of a groove and a land.

The medium of the present invention is also different in the stability of an amorphous mark with the lapse of time. Namely, within the temperature range of at least the crystallization temperature and at most the vicinity of the melting point, the crystal growth from the peripheral crystal portion proceeds in a relatively high temperature region near the melting point and hardly proceeds at a low temperature, whereby the amorphous mark once formed is hardly crystallized and excellent in the stability with the lapse of time. The crystallization temperature is usually within a range of from 100° C to 200° C., and the thermal stability can be maintained at such a temperature.

Particularly, in a usual use range of less than 100° C., the recorded amorphous mark is extremely stable, and the amplitude of recorded signals does not substantially deteriorate. On the contrary, it can be concluded from such stability with the lapse of time that the recording is accompanied by no substantial crystal nuclei formation.

Further, it is another advantage of the medium of the present invention that in the mark length recording, smooth mark edge of extremely low jitter can be formed.

In general, in the recording of amorphous marks, the recording layer is once melted and resolidified for conversion to an amorphous state. However, the peripheral portion of the mark is of a relatively low temperature as compared with the center. Accordingly, in conventional media, recrystallization by the crystal nuclei growth is likely to cause in the peripheral portion of mark, by which coarse grains wherein amorphous sections coexist and sway of mark edge is caused.

The erasing of the medium of the present invention is governed by the crystal growth from the boundary between the amorphous portion or melt portion and the crystal portion and it is made at a high speed. This principle can be seen at a time of recording. Namely, similar principle will act at the time of recording, and the melt region is resolidified and converted to an amorphous state as well, only the crystal growth from the peripheral crystal portion is caused and the crystallization by the crystal nuclei growth is hardly caused, whereby the mark edge hardly sways.

Namely, within the temperature range of at least the crystallization temperature and at most the vicinity of the melting point, the crystal growth from the peripheral crystal portion proceeds only at a relatively high temperature region near the melting point and hardly proceeds at a low temperature. Accordingly, at the time of this resolidification from the melt state, the boundary configuration of the amorphous mark is determined only by the cooling speed when the temperature decreases and passes the melting point.

And, coarse grains wherein amorphous sections due to the crystal nuclei growth at the time of resolidification coexist and which have been problematic in the prior art, is hardly formed in the periphery of amorphous mark. It is also found that this effect is extremely useful for the suppression of noise due to the sway of mark edge.

Furthermore, the mark edge shape is stable and does not change with the lapse of time, whereby not only the initial jitter is small but also the jitter hardly deteriorates with the lapse of time.

The principle of the crystallization of the present invention will be described in further detail.

In the medium of the present invention, the boundary portion between the amorphous mark and the surrounding crystal portion becomes a nucleus for the crystal growth, and no substantial crystal nuclei are formed in the interior of the amorphous mark. Accordingly, crystals grow solely from the boundary portion of the mark.

On the other hand, in a conventional GeTe—$Sb_2Te_3$ type recording layer, crystal nuclei are randomly formed in the amorphous mark, and crystallization proceeds as they grow.

The difference between the two crystallization processes can be confirmed by a transmission electron microscope. When an erasing laser beam with a relatively low power is applied direct-currently to both recording layers after formation of amorphous marks, in the GeTe—$Sb_2Te_3$ type recording layer, it is observed that crystallization proceeds from the center of the amorphous mark where the temperature becomes high, whereas in the recording layer of the present invention, it is observed that crystal grows from the periphery of the amorphous mark. Particularly, the crystal growth from the front end and the rear end is substantial.

The recording layer composition wherein erasing is carried out by such principle is often seen in alloy systems having excess Sb and other elements of up to about 20 atomic % added to a composition in the vicinity of a $Sb_{0.7}Te_{0.3}$ eutectic point, namely, a thin layer comprising as a main component a $M_y(Sb_xTe_{1-x})_{1-y}$ alloy wherein ($0.6 \leq x \leq 0.9$, $0 < y \leq 0.2$ and M is at least one of Ga, Zn, Ge, Sn, Si, Cu, Au, Al, Pd, Pt, Pb, Cr, Co, O, S, Se, Ta, Nb and V).

An alloy having excess Sb contained in $Sb_{0.7}Te_{0.3}$ has a characteristic that overwriting at a high linear velocity is possible, since it shows extremely large crystal growth from the crystal in a peripheral portion of an amorphous mark as compared with a GeTe—$Sb_2Te_3$ pseudo binary alloy system. The excess Sb increases the crystal growth speed from the peripheral crystal portion to a great extent, not accelerates the random formation and growth of crystal nuclei in the amorphous mark.

However, since a SbTe binary alloy shows not a little the formation of crystal nuclei, the stability of the amorphous mark with the lapse of time is remarkably poor, whereby it is required to add proper elements.

According to the studies of the present inventors, the addition of Ge is extremely effective for suppression of the formation of crystal nuclei.

Now, whether or not recrystallization of the amorphous mark is governed only substantially by recrystallization from the peripheral crystal portion, can be determined indirectly from the evaluation of the stability with the lapse of time.

As a specific evaluation method, a method for measuring the modulation of retrieving signals when accelerated condition test under a high temperature high humidity condition is carried out, may be mentioned.

Namely, when signals are recorded with a plurality of mark length of which the shortest mark length is at most 0.5 µm, the recording is made under the condition satisfying the following relation:

$$M_1/M_0 \geq 0.9$$

wherein $M_0$ represents a modulation of signals retrieved immediately after the recording, and $M_1$ represents a modulation of signals retrieved after the recording medium is kept for 1000 hours under a condition of 80° C. and 80% relative humidity after the recording.

Figure 6:
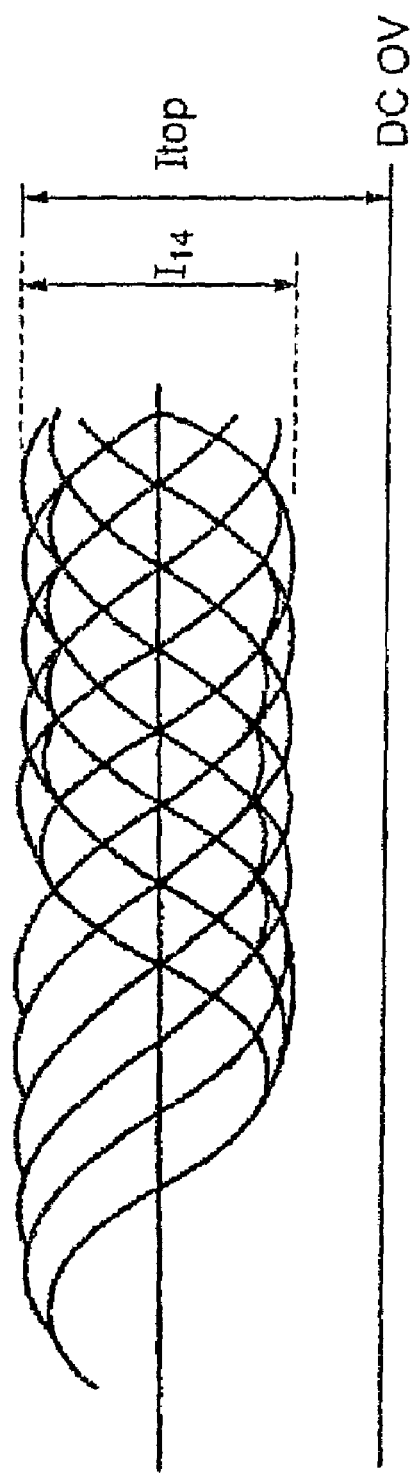
FIG. 6 is a signal waveform diagram showing the relation of the signal intensity with the amplitude and modulation of a signal.

The mark length modulation system is not limited and, for example, EFM modulation, EFM plus modulation and (1,7) RLL-NRZI (run length limited-non return to zero inverted) modulation may be used. Random signals as shown in FIG. 6 are recorded with the shortest mark length of at most 0.5 µm. For the above evaluation, it is preferred to set the shortest mark length at least about 0.2 µm. It should be mentioned that it is necessary to satisfy the above formula in one evaluation condition, and not necessary to satisfy the above formula in all the evaluation condition.

As an example, random signals of EFM plus modulation system are recorded with a plurality of mark lengths of which the shortest mark length is 0.4 µm.

The modulation is one obtained by standardizing a signal amplitude of the longest mark of this modulation system with the top signal intensity. FIG. 6 shows the wave form of DC retrieving signals (retrieving signals including direct current component) when EFM plus modulated random signals are recorded and retrieved. The modulation is defined by a ratio $I_{14}/I_{top}$ wherein $I_{top}$ represents a signal intensity of a top of 14T mark and $I_{14}$ is a signal amplitude.

If the modulation does not change, amorphous mark size can be determined to be sufficiently stable. If the modulation of random signals recorded before acceleration test maintains at least 90% of the initial value even after the acceleration test, it can be presumed that the recording is accompanied with no substantial formation of crystal nuclei.

In the recording layer of the present invention, crystal growth from the peripheral crystal portion is likely to occur even in a high temperature region immediately below the melting point, and accordingly, crystal growth from the peripheral crystal portion may occur even when the recording layer is melted and resolidified in order to form an amorphous mark. Accordingly, in a case where the cooling rate after melting is so slow that it does not reach a critical cooling rate required for solidification as an amorphous substance, the entire melted region undergoes recrystallization almost instantaneously.

This can be confirmed by the following experiment.

On a polycarbonate substrate having a thickness of 0.6 mm and provided with a guide groove for a recording or retrieving laser beam, a $(ZnS)_{80}(SiO_2)_{20}$ first protective layer having a thickness of 68 nm, a $Ge_{0.05}Sb_{0.71}Te_{0.24}$ recording layer having a thickness of 18 nm, a $(ZnS)_{80}(SiO_2)_{20}$ second protective layer having a thickness of 20 nm and an $Al_{0.995}Ta_{0.005}$ reflective layer having a thickness of 250 nm, were formed in this order, and an ultraviolet-curable resin protective layer was further provided in a thickness of 4 μm. Two of such laminates were bonded by a hot melt adhesive so that the recording layer sides were located inside, to obtain an optical recording medium. The composition of the recording layer was adjusted to be Sb/Te≈3 to make overwriting at a linear velocity of at least 7 m/s possible. To this medium, an oval laser beam having a long diameter of about 100 μm and a short diameter of about 1.5 μm was applied for scanning in the short axis direction to carry out initialization by melting and recrystallization.

A focused beam having a wavelength of 637 nm and NA=0.63, was applied for scanning along the guide groove at a linear velocity of 7 m/s, and a recording laser beam with a recording power Pw of 10 mW was applied directcurrently, and then the power was rapidly downed to 1 mW. Namely, the recording laser beam was substantially cut off. Here, the beam diameter was 0.9 μm, which corresponds to a region where the Gaussian beam energy intensity becomes at least $1/e^2$ of the peak intensity.

Figure 2:
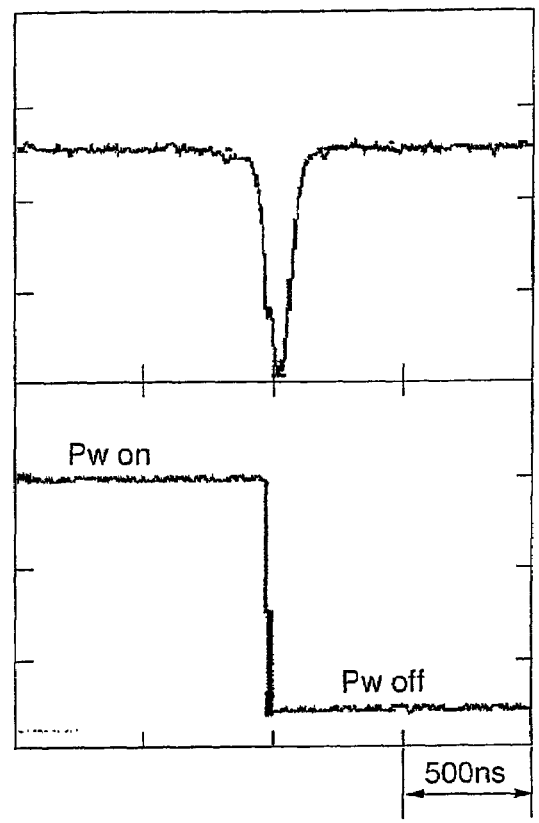
FIG. 2 is a view illustrating the change in reflectance when recording was carried out on one embodiment of the medium of the present invention.

FIG. 2 shows a change in reflectance before and after cutting off the recording laser beam. As shown in the lower side in FIG. 2, the recording laser beam was cut off as the time passed. On the left side of the lower side in FIG. 2, the recording laser beam is continuously i.e. direct-currently applied, and on the right side, the laser beam is cut off. The same region was scanned with a retrieving laser beam having a retrieving power of 1.0 mW, whereby the retrieving waveform as shown in the upper part in FIG. 2, was obtained. This corresponds to the change in reflectance.

In the vicinity where the recording laser beam was instantaneously cut off, the reflectance was low, and before and after the cutting off of the recording laser beam, the reflectance was substantially the same. As observed by TEM, the portion at which the reflectance was low, was amorphous, and the portions before and after thereof were confirmed to be crystalline. Namely, so long as the recording laser beam is continuously applied, the melt portion will crystallize, and only the melt region in the vicinity of the portion where the recording laser beam was cut off, becomes to be amorphous.

Namely, when the recording laser beam is applied continuously, the cooling rate of the recording layer will be suppressed by the excess heat from the subsequent portion, whereby a critical cooling rate required for the formation of amorphous substance can not be obtained. Whereas, if the recording laser beam is cut off once, the excess heat from the subsequent portion is cut off, whereby the cooling rate can be increased.

Further, when the recording power Pw was adjusted to be at least 7 mW, an amorphous mark was formed by cutting off the recording laser beam.

As a result of a study, it has been found that the medium of the present invention generally undergoes crystallization when continuously irradiated with a recording laser beam with a recording power Pw sufficient to melt the recording layer, at a constant linear velocity, and an amorphous mark is formed when irradiation with a recording laser beam with a recording power Pw sufficient to melt the recording layer at a constant linear velocity, is followed by irradiation with a recording laser beam with a power of substantially zero. Here, a power of substantially zero means that the power may not strictly be zero, and it is a bias power Pb represented by $0 \leq Pb \leq 0.2Pw$, more preferably a bias power Pb represented by $0 \leq Pb \leq 0.1$ Pw.

In the present invention, recrystallization of the melt portion at the time of resolidification is almost caused solely by the crystal growth from the peripheral solid phase crystal portion. Accordingly, the recrystallization portion is not formed at the central portion of the amorphous mark, whereby smooth and continuous mark edge is formed.

Heretofore, such a material which is remarkably crystallizable, has been considered to be unsuitable for a recording layer for mark length recording, because if a recording laser beam is applied for a long time to form a long mark, most of the melt region will be crystallized.

However, according to the study by the present inventors, in high density recording where the shortest mark length is less than 0.5 μm, good jitter is obtainable by positively employing the competition process between the conversion to amorphous state of the melt region and the recrystallization from the boundary of the peripheral solid phase crystal portion.

Thus, it has been found that as will be described hereinafter, it is extremely effective to employ a pulse-dividing system for the formation of a mark having a length of nT, wherein a recording power Pw applied section is combined with the power cutting off section i.e. a bias power Pb applied section.

When recording is carried out by the pulse-dividing system, as shown in FIG. 1, herring bone-shaped (or crescent-shaped) amorphous portions are linked to form an amorphous mark.

The shape of the front end of the mark is determined only by the shape of the front end of the front herringbone-shaped amorphous portion, and the shape of the rear end of the mark is determined by the shape of the rear end of the last herringbone-shaped amorphous portion.

Usually, the front end shape of an amorphous portion is smooth, and accordingly, the front end shape of the mark will also become smooth. Due to dissipation of the heat forwardly, the cooling rate can be maintained to be sufficiently high, whereby the shape reflects substantially the shape of the forward end of the melt region and accordingly governed by the rise time of the recording pulse. The recording pulse i.e. the build-up in the Pw applied section, may be at most 2 or 3 nsec.

On the other hand, the rear end shape of an amorphous portion is determined by the cooling rate determined by the fall time of the recording pulse and the size of the recrystallized region progressing from the peripheral crystal portion, particularly the rear end crystal portion. To make the cooling rate sufficiently high, the fall time in the Pw applied section is preferably at most 2 or 3 nsec. The size of the recrystallized region can precisely be controlled by the length of off-pulse i.e. the Pb applied section.

Further, it is also important that the above-mentioned ultrarapid cooling structure is used as the layer structure, and the cooling rate of the recording layer is made as sharp as possible and at the same time, the spatial distribution of the cooling rate is adjusted to be sharp in the vicinity of the rear end of the mark, so that the position of the end of the mark will not sway.

Now, the present inventors have extensively studied the optical recording medium by which a short mark can be recorded at a high speed and which is excellent in the stability of the recording mark with the lapse of time, and as a result, found that a specific composition having Ge added in the vicinity of a $Sb_{0.7}Te_{0.3}$ eutectic composition is particularly excellent, and obtained an optical recording medium excellent in other properties by choosing an appropriate layer structure.

Figure 3:
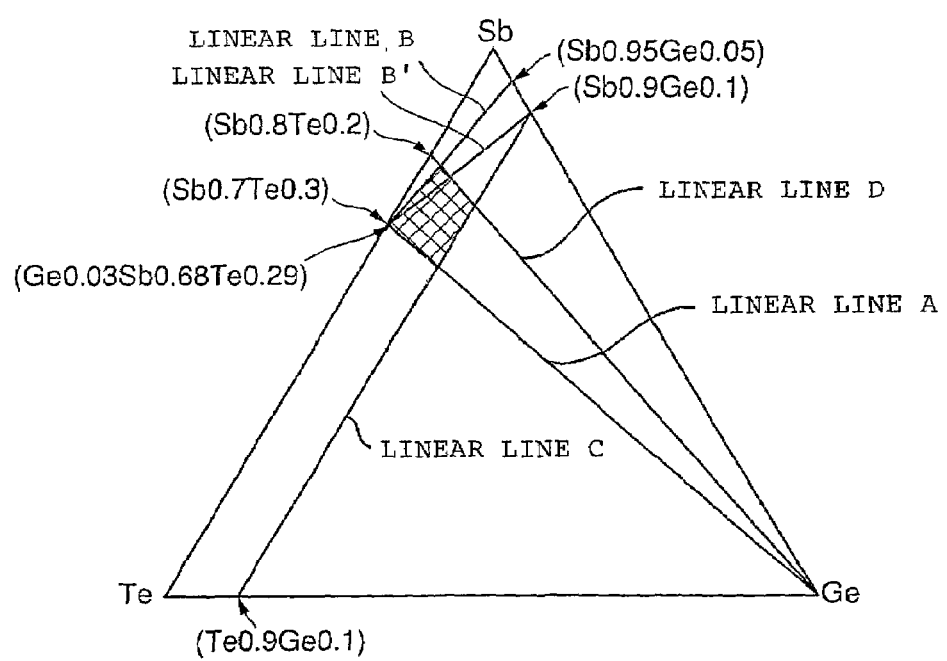
FIG. 3 is a GeSbTe ternary phase diagram showing the compositional ranges for the recording layer of the medium of the present invention.

Namely, the present inventors have paid an attention to a new ternary alloy having excessive Sb and Ge added to $Sb_{0.7}Te_{0.3}$ and studied its applicability to high density mark length modulation recording. As a result, it has been found that a medium employing a recording layer composition having an extremely limited Ge—Sb—Te ratio, defined by the four linear lines A, B, C and D in the GeSbTe ternary phase diagram as shown in FIG. 3, is excellent in the repetitive overwriting durability and the stability with time in high density mark length modulation recording.

Namely, the recording layer is made of a thin film comprising, as a main component, a GeSbTe alloy having a composition represented by a region (except for the boundary lines) defined by four linear lines, i.e. linear line A connecting ($Sb_{0.7}Te_{0.3}$) and Ge, linear line B connecting ($Ge_{0.03}Sb_{0.68}Te_{0.29}$) and ($Sb_{0.95}Ge_{0.05}$), linear line C connecting ($Sb_{0.9}Ge_{0.1}$) and ($Te_{0.9}Ge_{0.1}$) and linear line D connecting ($Sb_{0.8}Te_{0.2}$) and Ge, in the GeSbTe ternary phase diagram. This recording layer is employed in combination with the layer structure as described hereinafter to make a medium which is very useful for high density mark length modulation recording with the shortest mark length of at most 0.5 $\mu$m. And, it is possible to obtain a recording density equal to DVD and excellent retrieving interchangeability with DVD.

It is also possible to secure a repetitive overwriting durability and a wide margin wherein excellent jitter can be obtained for the change in the recording power and retrieving power.

Within this compositional range, as the amount of Sb is larger than y=0.7 in the $Sb_yTe_{1-y}$ alloy, the excess Sb amount increases, whereby the crystallization speed becomes high, and it becomes possible to overwrite at a high speed.

More specifically, in the EFM plus modulation recording (mark length modulation recording of 8–16 modulation), even if the length of 3T mark as the shortest mark is shortened to a level of 0.4 $\mu$m or 0.35 $\mu$m, good jitter is obtainable. Further, an servo signal can be obtained, and tracking servo can be applied by a conventional read-only DVD drive. Further, overwriting is possible at a linear velocity within a range of from 1 to 10 m/s.

Thus, it is possible to obtain rewritable DVD having the same capacity as read-only DVD and substantial retrieving interchangeability.

If the excess Sb amount is controlled, the high density overwriting of high quality as described above, can be accomplished at a high linear velocity of at least 8 m/s. Further, by changing the recording pulse dividing method (the pulse strategy) depending upon the linear velocity as described hereinafter, good overwriting becomes possible within a wide linear velocity range including at least from 3 to 8 m/s.

This composition will be described in further detail.

With a composition in the neighborhood of $Sb_{0.7}Te_{0.3}$ eutectic point wherein the amount of Ge added is at most 10 atomic %, the crystallization speed tends to increase as the Sb/Te ratio increases. Namely, Sb in excess of $Sb_{0.7}Te_{0.3}$ will precipitate as Sb clusters which serve as crystal nuclei in the process of recrystallization. And, in the absence of Sb in excess of $Sb_{0.7}Te_{0.3}$, erasing performance becomes insufficient, whereby overwriting is substantially impossible. Further, at the time of initialization, there will be no substantial formation of nuclei, whereby there is a problem that the initialization is difficult, and the productivity is very poor (linear line A).

On the other hand, if the amount of Sb is increased in the $Sb_{0.7}Te_{0.3}$ eutectic binary alloy, the crystallization temperature decreases, and the stability with time of amorphous marks tends to be impaired, although the crystallization speed increases. Further, such is not suitable for recording at a low linear velocity of about 3 m/s, and formed amorphous marks will disappear when irradiated with a retrieving laser beam (with a laser power of about 1 mW) in a short period of time. Accordingly, Sb in excess of linear line D connecting ($Sb_{0.8}Te_{0.2}$) and Ge should not be contained.

Further, within the range for the excess amount of Sb as defined by linear lines A and D, with the SbTe binary system by itself, the crystallization temperature is low, and crystal nuclei of excess Sb will be present, whereby amorphous marks tend to be too unstable. Therefore, as the excess Sb amount is large, added amount of Ge is larger. By four coordinate bonding of Ge, the crystal nuclei growth rate can be controlled substantially completely. As a result, the crystallization temperature increases, and archival life increases. Linear line B connecting ($Ge_{0.03}Sb_{0.68}Te_{0.29}$) and ($Sb_{0.95}Ge_{0.05}$) defines this condition. More preferably, Ge is contained in an amount larger than the linear line B' connecting ($Ge_{0.03}Sb_{0.68}Te_{0.29}$) and ($Sb_{0.9}Ge_{0.1}$) Further, if the Ge content becomes 10 atomic % or higher, jitter deteriorates during mark length recording, and a high melting point Ge compound, particularly GeTe, tends to segregate by repetitive overwriting. Further, it is undesirable that crystallization of an amorphous film immediately after film formation, tends to be very difficult (linear line C). To reduce jitter, Ge is more preferably at most 7.5 atomic %.

To carry out overwriting at a linear velocity of at least 3 m/s, the recording layer is preferably made of a thin film comprising, as a main component, a $Ge_x(Sb_yTe_{1-y})_{1-x}$ alloy ($0.04 \leq x < 0.10$, $0.72 \leq y < 0.8$). Namely, for recording at a linear velocity of at least 3 m/s, it is preferred that the Sb amount is increased so that in the $Sb_yTe_{1-y}$ alloy, $y \geq 0.72$. However, by increasing the Sb amount, stability of amorphous marks tends to slightly deteriorate, and to supplement this, it is preferred to adjust Ge to be slightly large at a level of $x \geq 0.04$.

Further, to carry out overwriting at a linear velocity of at least 7 m/s, the recording layer is preferably made of a thin film comprising, as a main component, a $Ge_x(Sb_yTe_{1-y})_{1-x}$ alloy ($0.045 \leq x \leq 0.075$, $0.74 \leq y < 0.8$). Namely, for recording at a linear velocity of at least 7 m/s, it is preferred that the Sb amount is further increased so that in the $Sb_yTe_{1-y}$ alloy, $y \geq 0.74$. Here, in order to increase the stability of amorphous marks, the amount of Ge is adjusted to be $x \geq 0.045$. On the other hand, at a high linear velocity, jitter is likely to deteriorate, and to supplement this, the amount of Ge is adjusted to be $x \leq 0.075$.

There have been some reports on a GeSbTe ternary composition or a recording layer composition comprising such a ternary composition as the base material and additional elements (JP-A-61-258787, JP-A-62-53886, JP-A-62-152786, JP-A-1-63195, JP-A-1-211249, and JP-A-1-277338).

However, the compositions disclosed in these publications are all poorer in Sb than linear line A connecting ($Sb_{0.7}Te_{0.3}$) and Ge and different from the compositional range of the present invention.

These compositions contain as the main component a $Sb_2Te_3$ metal compound composition. Further, with a GeTe—$Sb_2Te_3$ pseudo binary alloy system, excess Sb has an effect to slow down the crystallization speed, as contrary to the present invention. Accordingly, to carry out overwriting at a high linear velocity of at least 5 m/s, it is rather detrimental to incorporate excess Sb to a composition on the linear line of GeTe—$Sb_2Te_3$, particularly to the $Ge_2Sb_2Te_5$ composition.

Figure 4:
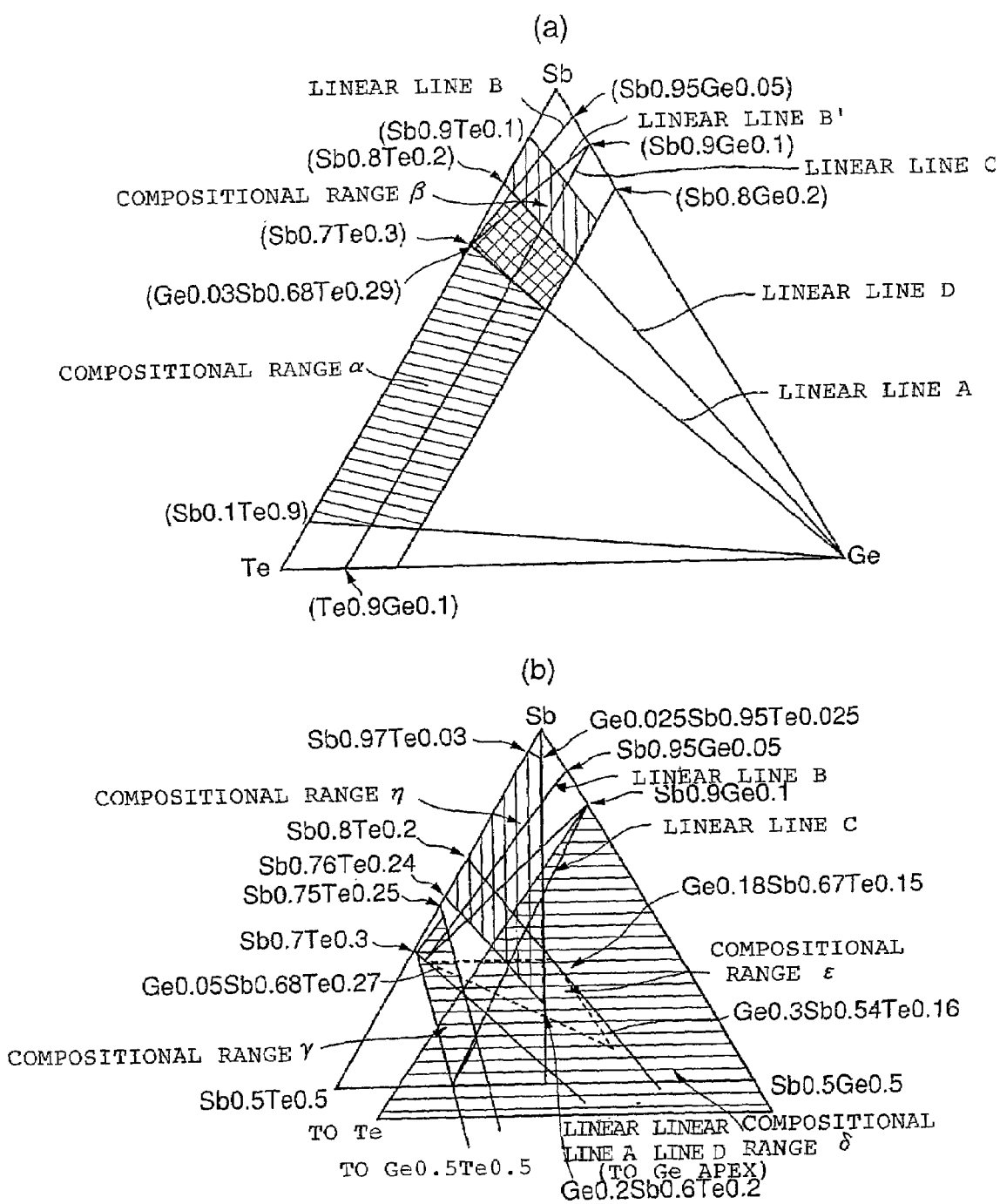
FIG. 4 are GeSbTe ternary phase diagrams showing the compositional ranges of conventional GeSbTe compositions.

As compositions having a third element including Ge selectively added to the composition in the neighborhood of $Sb_{0.7}Te_{0.3}$ containing excess Sb, there are those disclosed in JP-A-1-100745 (compositional range α in FIG. 4 (a)) and JP-A-1-303643 (compositional range β in FIG. 4 (a)).

However, in JP-A-1-100745, the base composition has an extremely wide range such that in $Sb_{1-x}Te_x$, $0.10 \leq x \leq 0.80$. Accordingly, the concept of the present invention that only a region where Sb is in excess of $Sb_{0.7}Te_{0.3}$ is utilized to attain excellent repetitive overwriting durability and archival life in high density recording, is not disclosed or suggested.

In JP-A-1-303643, no mention is made about a problem that in high density recording as in the present invention, if Sb is contained excessively beyond linear line D, stability with time of amorphous marks will be impaired. Further, neither publication mentions about the problem resulting from the excess content of Ge beyond linear line C.

Further, as compositions which partially overlap with the recording layer composition of the present invention, there are those disclosed in JP-A-1-115685 (compositional range γ), JP-A-1-251342 (compositional range δ), JP-A-3-71887 (compositional range ε) and JP-A-4-28587 (compositional range η), as shown in FIG. 4 (b).

JP-A-1-115685 discloses a composition having Au, Pd added to a base material of compositional range γ, but it is intended for low density recording and is substantially distinguished from the composition of the present invention by linear lines A and B. The composition in that publication is one suitable for recording at a low density corresponding to a mark length of about 1.1 μm (linear velocity: 4 m/s, frequency: 1.75 MHz, square wave with a duty of 50%) and for DC erasing, and it is considered to be different in the suitability of the composition from the composition of the present invention intended for high density recording including short marks.

The compositional range δ disclosed in JP-A-1-251342 is an extremely Ge-rich GeSbTe system consisting essentially of a system having at least about 10 atomic % of Ge added to a $Sb_{0.7}Te_{0.3}$ eutectic crystal, and is substantially distinguished from the composition of the present invention by linear line C. Within the compositional range δ, a composition containing more than 10 atomic % of Ge, has a serious problem that, as mentioned above, the crystallization speed is slow, and particularly, initialization to crystallize the recording layer after the film formation, is difficult, whereby the productivity is low and can not be practically employed. In this publication, in order to overcome the problem of this crystallization speed, Au or Pd which forms crystal nuclei, is added. However, in a region where Ge is smaller than linear line C as in the present invention, such an addition is not required.

Further, in the publication, it is described that if the amount of Ge is less than 10 atomic %, no adequate change in light intensity as between a recorded portion and a non-recorded portion, is obtainable. Whereas, in the present invention, by adjusting the layer structure including the protective layer and the reflective layer, a very large change in light intensity at a level of a modulation of at least 60%, is obtained.

The compositional range ε disclosed in JP-A-3-71887 is intended for low density recording, and is substantially distinguished from the composition of the present invention by linear line C. Especially, the concept of the present invention that the compositional range of the present invention is utilized to obtain excellent repetitive overwriting durability and archival life in high density recording, is not disclosed or suggested.

The compositional range η disclosed in JP-A-4-28587 includes extremely Sb-rich and Ge-rich compositions, and is substantially distinguished from the composition of the present invention by linear line D.

As described in the foregoing, none of the publications discloses the technical problem relating to high density mark length modulation recording where the shortest mark length is 0.5 μm, as intended to be solved by the present invention, or selection of the optimum composition or improvement of the layer structure or the recording method to solve such a problem.

Now, the layer structure of the optical information recording medium of the present invention will be described. The medium of the present invention makes it possible to realize a medium which is capable of overwriting within a wide linear velocity range covering from at least 3 m/s to 8 m/s, preferably from 1 m/s to 10 m/s in high density mark length modulation recording where the shortest mark length is at most 0.5 μm, by the combination of the recording layer having the above described composition with the layer structure as described hereinafter. And, it is thereby possible to maintain so-called retrieving interchangeability with DVD.

The phase-change recording layer is covered with the upper and lower protective layers.

Figure 5:
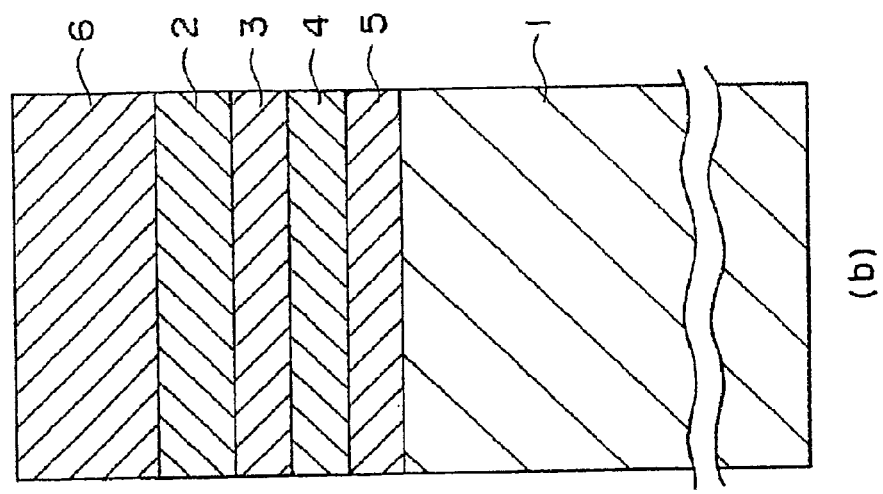
FIG. 5 are diagrammatical view illustrating an example of the layer structures of media of the present invention.
Figure 5:
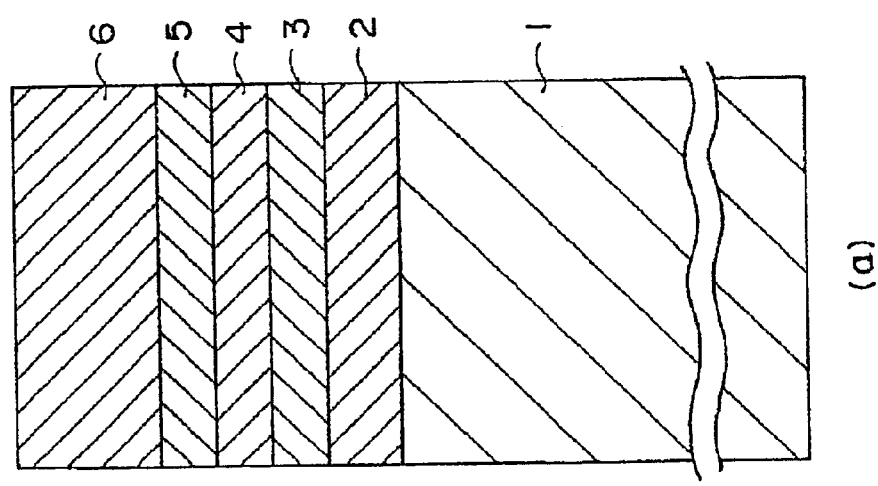

Further, as shown in FIG. 5 (a), the medium of the present invention has a structure of substrate 1/first protective layer 2/recording layer 3/second protective layer 4/reflective layer 5, and the top thereof is coated with an ultraviolet curable or thermosetting resin (protective coating layer 6). The order of the respective layers as shown in FIG. 5 (a) is suitable when a focused laser beam for recording and retrieving is irradiated to the recording layer through the transparent substrate.

Otherwise, the medium may take a structure in which the above order of the respective layers is reversed so that they are laminated in the order of substrate 1/reflective layer 5/second protective layer 4/recording layer 3/first protective layer 2, as shown in FIG. 5 (b). This layer structure is suitable when the focused laser beam is applied from the first protective layer side. Such a structure is useful in a case where the object numerical aperture NA is at least 0.7, so that the necessity for shortening the distance between the recording layer and the object lens is high.

With the structure shown in FIG. 5 (a), the substrate may be made of a transparent resin such as a polycarbonate, acrylic or polyolefin resin, or a transparent glass may be employed as the substrate.

Among them, a polycarbonate resin is most widely employed for CD and is inexpensive, and thus is most preferred.

Also with the structure shown in FIG. 5 (b), a resin or glass may be employed, but the substrate itself is not required to be transparent, and there may be a case where it is preferred to employ glass or an aluminum alloy in order to increase the rigidity or flatness.

On the substrate, a groove with a pitch of at most 0.8 μm is formed to guide the recording or retrieving laser beam. However, this groove may not necessarily be a geometrically trapezoidal groove, and it may be a groove formed optically, for example, by forming a waveguide having different reflective indices, for example, by ion injection.

In the layer structure disclosed in FIG. 5 (a), in order to prevent deformation by a high temperature at the time of recording, a first protective layer 2 is formed on the substrate surface, and a second protective layer 4 is formed on the recording layer 3. The second protective layer 4 has a plurality of functions i.e. to prevent mutual diffusion of the recording layer 3 and the reflective layer 5 and to effectively release the heat to the reflective layer 5 while suppressing deformation of the recording layer.

Also in FIG. 5 (b), as observed from the incident side of the focused laser beam, the second protective layer 4 has functions to prevent mutual diffusion between the recording layer 3 and the reflective layer 5, to release the heat and to prevent deformation of the recording layer. The first protective layer in the FIG. 5 (b) has functions to prevent deformation of the recording layer, to prevent direct contact of the recording layer with air (to prevent oxidation or contamination) and to prevent damages of the recording layer due to contact with an optical pickup.

A protective layer may further be provided between the reflective layer and the substrate, by which, for example, thermal damages to a resin substrate can be prevented.

With the structure disclosed in FIG. 5 (b), it is preferred to further provide, outside the first protective layer 2, a harder dielectric or amorphous carbon protective layer or an ultraviolet curable or thermosetting resin layer. Otherwise, it is also possible to bond a thin transparent sheet having a thickness of from 0.05 to 0.6 mm so that the focused laser beam may be applied through this thin sheet.

Further, a medium such as DVD takes a structure wherein media of FIG. 5 (a) are bonded by an adhesive with the recording layer sides located inside. With the media of FIG. 5 (b), they are bonded reversely with the recording layer sides located outside. Further, with the medium of FIG. 5 (b), tracking grooves may be formed on both sides of one substrate by infection molding, and multi layers may be formed on both sides by sputtering.

The recording layer 3, the protective layers 2 and 4 and the reflective layer 5 are formed by e.g. sputtering.

With a view to preventing oxidation or contamination among the respective layers, it is preferred to carry out film forming by an in-line apparatus having a target for the recording layer, a target for the protective layers and, if necessary, a target for the reflective layer set in the same vacuum chamber.

The material for the protective layers 2 and 4 is determined taking into consideration the refractive index, the thermal conductivity, the chemical stability, the mechanical strength, the adhesive property, etc. Usually, an oxide, sulfide, nitride or carbide of a metal or semiconductor, or a fluoride of e.g. Ca, Mg or Li, which is highly transparent and has a high melting point, can be employed.

Such an oxide, sulfide, nitride, carbide or fluoride may not necessarily take a stoichiometrical composition, and in order to control the refractive index, etc., it is effective to control the composition or to use them as a mixture.

In the protective layers 2 and 4, the compositional ratio and the mixing ratio may change in the thickness direction. Further, the protective layers 2 and 4 may comprise a plurality of layers, respectively. Respective layers thereof may be different in the compositional ratio and mixing ratio depending upon the characteristics to be required.

Taking into consideration the repetitive recording characteristics, the film density of these protective layers is preferably at least 80% of the bulk state from the viewpoint of the mechanical strength. In the case of employing a thin film of a mixed dielectric, the following theoretical density may be used as the bulk density.

$$\rho = \Sigma m_i \rho_i \qquad (1)$$

$m_i$: mol concentration of each component i $\rho_i$: bulk density of each component The recording layer 3 of the medium of the present invention is a phase change recording layer, and its thickness is usually preferably within a range of from 5 nm to 100 nm.

If the thickness of the recording layer 3 is thinner than 5 nm, it tends to be difficult to obtain adequate contrast, and the crystallization speed tends to be slow, and erasing of the record in a short period of time tends to be difficult.

On the other hand, if it exceeds 100 nm, it tends to be difficult to obtain optical contrast, and cracking is likely to occur, such being undesirable.

Further, in high density recording where it is required to obtain high contrast so as to be interchangeable with a read-only ROM disk such as DVD and the shortest mark length is at most 0.5 μm, the thickness of the recording layer is preferably from 5 nm to 25 nm. If the thickness is less than 5 nm, the reflectance tends to be too low, and an influence of a non-uniform composition at the initial stage of the film formation or a rough film, tends to appear, such being undesirable.

On the other hand, if it is thicker than 25 nm, the heat capacity tends to be large, whereby the recording sensitivity tends to be poor, and the crystal growth tends to be three dimensional, whereby edges of amorphous marks tend to be non-uniform, thus leading to an increase of jitter. Further, the volume change due to the phase change of the recording layer tends to be distinct, whereby the repetitive overwriting durability tends to be poor, such being undesirable. From the viewpoint of the jitter of the mark edges and the overwriting durability, the thickness is more preferably at most 20 nm.

Further, the density of the recording layer is preferably at least 80%, more preferably at least 90%, of the bulk density. Here, the bulk density may, of course, be actually measured by preparing an alloy block, but an approximate value can be obtained by replacing the molar concentrations of the respective components in the above Formula (1) with atomic % of the respective elements and by replacing the bulk densities with the molecular weights of the respective elements.

For the density of the recording layer, in a sputtering method, it is necessary to increase the amount of high energy Ar irradiated to the recording layer, for example, by lowering the pressure of the sputtering gas (rare gas such as Ar) during the film forming, or by disposing the substrate closely in front of the target. The high energy Ar is one wherein a part of Ar ions irradiated to the target for sputtering, is rebound to reach the substrate side, or one wherein Ar ions in the plasma are accelerated by the sheath voltage over the entire surface of the substrate to reach the substrate.

The irradiation effect of such a high energy rare gas is called an atomic peening effect. In sputtering with Ar gas which is commonly used, Ar will be included in the sputtered film by such an atomic peening effect. The atomic peening effect can be estimated from the amount of Ar in the film. Namely, the amount of Ar being small, means that the irradiation effect of high energy Ar is small, whereby a film of a low density is likely to be formed. On the other hand, if the amount of Ar is large, irradiation of high energy Ar is vigorous, and although the density becomes high, Ar included in the film will precipitate as void during repetitive overwriting, whereby the repetitive overwriting durability tends to be low. A proper amount of Ar in the recording layer film is from 0.1 atomic % to 1.5 atomic %. Further, it is advisable to employ high frequency sputtering rather than direct current sputtering, since a high density film can be obtained while reducing the amount of Ar in the film.

In the present invention, the recording layer is made of a thin film comprising, as a main component, a GeSnTe alloy having the above described composition. Namely, the ratio in amount of the respective elements of Ge, Sb and Te in the recording layer may be in the above described compositional range, and other elements may further be incorporated to the recording layer in a total amount of about 10 atomic %.

Further, the optical constant of the recording medium may be finely adjusted by adding from 0.1 atomic % to 5 atomic % of at least one element selected from O, N and S to the recording layer. However, it is not desirable to add such an element beyond 5 atomic %, since the crystallization speed will thereby be decreased, whereby the erasing performance deteriorates.

Further, in order to increase the stability with time without lowering the crystallization speed at the time of overwriting, at least one member selected from the group consisting of V, Nb, Ta, Cr, Co, Pt and Zr is preferably added in an amount of at most 8 atomic %. More preferably, such a member is added in an amount of from 0.1 atomic % to 5 atomic %. The total amount of such additive elements and Ge is preferably at most 15 atomic %, relative to SbTe. If they are contained excessively, phase separation other than Sb is likely to take place. Particularly, when the content of Ge is at least 3 atomic % and at most 5 atomic %, the effect of the addition is substantial.

It is preferred to add at least one member of Si, Sn and Pb in an amount of at most 5 atomic %, in order to improve the archival life and to finely adjust the refractive index. The total content of these additive elements and Ge, is preferably at most 15 atomic %. These elements have the same four coordinate networks as Ge.

Addition of Al, Ga and/or In in an amount of at most 8 atomic % is effective to increase the crystallization temperature and at the same time to reduce jitter or to improve the recording sensitivity. However, segregation is also likely to result, it is preferred to adjust the amount to at most 6 atomic %. Further, the total content of such elements and Ge is preferably at most 15 atomic %, more preferably at most 13 atomic %.

Addition of Ag in an amount of at most 8 atomic % is also effective to improve the recording sensitivity, and especially when this is employed in the case where the amount of Ge exceeds 5 atomic %, the effect is remarkable. However, the addition exceeding 8 atomic % is not desirable, since jitter will increase, or the stability of amorphous marks tends to be impaired. If the total amount of Ag and Ge exceeds 15 atomic %, segregation is likely to result, such being undesirable. The content of Ag is most preferably at most 5 atomic %.

The recording layer 3 of the recording medium of the present invention is usually amorphous in the state after film formation. Accordingly, it is necessary to crystallize the entire surface of the recording layer after the film formation to change it to an initialized state (unrecorded state).

As an initialization method, in the case of an alloy containing excess Sb in $Sb_{0.7}Te_{0.3}$, initialization may be carried out by annealing in a solid phase. However, in the case of a composition which further contains Ge, it is preferred to initialize it by melt recrystallization wherein the recording layer is once melted and then crystallized by gradually cooling for resolidification.

The recording layer of the present invention contains no substantial nuclei formed by crystal growth immediately after the film formation, whereby crystallization in a solid phase is difficult, but by the melt recrystallization, a few crystal nuclei will be formed and then melted, and recrystallization is accelerated at a high speed mainly by the crystal growth.

Further, crystals formed by the melt recrystallization and crystals formed by annealing in the solid phase, are different in reflectance, and if they are present in a mixed state, they may cause a noise. And, at the time of actual overwrite recording, the erased portion will be crystals formed by the melt recrystallization, and accordingly, the initialization is also preferably carried out by the melt recrystallization.

Here, melting of the recording layer is limited locally and in a short time of at most about 1 msec. If the melt region is broad, or the melting time or cooling time is long, the respective layers may be damaged, or the surface of a plastic substrate may be deformed, by the heat.

To provide such a heat history, a high power semiconductor laser beam with a wavelength of from about 600 to 1,000 nm is irradiated as focused to have a long axis of from 100 to 300 μm and a short axis of from 1 to 3 μm and scanned at a linear velocity of from 1 to 10 m/s so that the short axis direction is the scanning axis. Even with a similarly focused laser beam, if it is close to a circular shape, the melt region tends to be too broad, whereby reconversion to amorphous state is likely to take place and damage to the multi layer structure or to the substrate tends to be large, such being undesirable.

The fact that the initialization has been carried out by the melt recrystallization, can be confirmed as follows. Namely, to the medium after the initialization, a recording laser beam with a recording power Pw sufficient to melt the recording layer, having a spot with a diameter smaller than about 1.5 μm, is applied direct-currently at a constant linear velocity. In a case where a guide groove is present, this operation is carried out in a state where a tracking servo and a focus servo are applied to a track consisting of a groove or a land.

Thereafter, on the same track, an erasing laser beam with an erasing power Pe (≦Pw) is applied direct- currently, and if the reflectance of the erased state thereby obtained, is substantially the same as the reflectance of the totally unrecorded initial state, the initialized state is confirmed to be the melt re- crystallized state.

Namely, the recording layer was once melted by irradiation with the recording laser beam, and the state where it was completely re-crystallized by irradiation with the erasing laser beam, is in the melt-re- crystallized state, as passed through the processes of melting by the recording laser beam and recrystallization by the erasing laser beam.

Here, the reflectance $R_{ini}$ in the initialized state being substantially the same as the reflectance $R_{cry}$ in the melt-re-crystallized state, means that the difference in reflectance between the two as defined by $(R_{ini}-R_{cry})/\{(R_{ini}+R_{cry})/2\}$, is at most 20%. Usually, merely by the solid phase crystallization such as annealing, the difference in the reflectance is larger than 20%.

Now, layers other than the recording layer will be described.

The layer structure of the present invention belongs to one type of layer structure so-called a rapid cooling structure. In the rapid cooling structure, a layer structure is employed whereby the heat dissipation is prompted to increase the cooling rate at the time of resolidification of the recording layer, whereby a high erasing ratio by a high speed crystallization will be realized while avoiding the problem of recrystallization at the time of amorphous mark formation. For this purpose, the thickness of the second protective layer is adjusted to be at least 5 nm and at most 30 nm. If the thickness is thinner than 5 nm, the structure is likely to break due to e.g. deformation during the melting of the recording layer, or the heat dissipation effect tends to be so large that the power required for recording tends to be unnecessarily large.

The thickness of the second protective layer in the ultrarapid cooling structure of the present invention, is substantially influential over the durability in repetitive overwriting, and it is important also with a view to preventing deterioration of jitter. If the thickness exceeds 30 nm, the temperature difference between the recording layer side and the reflective layer side of the second protective layer becomes large at the time of recording, and due to the difference in the thermal expansion at both sides of the protective layer, the protective layer itself tends to deform asymmetrically. Repetition of this deformation brings about accumulation of microscopic plastic deformation in the interior of the protective layer, thus leading to an increase of noise, such being undesirable.

By using the recording layer of the present invention, low jitter can be realized in high density recording with the shortest mark length of at most 0.5 μm. However, according to the study by the present inventors, in order to realize high density recording, in a case where a laser diode with a short wavelength (such as a wavelength of at most 700 nm) is employed, it will be required to take a due care also with respect to the layer structure of the above-mentioned rapid cooling structure. Especially, in the study of one beam overwrite characteristics employing a focused laser beam having a wavelength of at most 500 nm and a numerical aperture NA at a level of at least 0.55, it has been found important to make the temperature distribution in the mark width direction to be flat in order to obtain a high erasing ratio and a wide erasing power margin. This is also true in an optical system corresponding to DVD wherein an optical system having a wavelength of from 630 to 680 nm and NA=0.6 is employed. In high density mark length modulation recording employing such an optical system, a material having a particularly low thermal conductivity is used as the second protective layer. Preferably, the film thickness is adjusted to be from 10 nm to 25 nm.

In either case, the erasing ratio and the erasing power margin can be improved by employing a material having a particularly high thermal conductivity for the reflective layer 5 formed thereon.

According to the study by the present inventors, in order to let the recording layer of the present invention perform particularly good erasing characteristics in a wide erasing power range, it is preferred to employ a layer structure whereby not only the temperature distribution or the change with time in the film thickness direction, but also the temperature distribution in the film plane direction (a direction perpendicular to the recording beam scanning direction) is made to be flat as far as possible.

The present inventors have tried to broaden the range for recrystallization and to increase the erasing ratio and the erasing power margin without melting and reconversion to amorphous state, by flattening the temperature distribution in the transverse direction of the track in the medium by properly designing the layer structure of the medium.

On the other hand, it has been found that by promoting heat dissipation from the recording layer to the reflective layer having an extremely high thermal conductivity via a very thin second protective layer having a low thermal conductivity, the temperature distribution in the recording layer becomes flat. Even if the thermal conductivity of the second protective layer is made high, the heat dissipation effect can be accelerated, but if the heat dissipation is accelerated too much, the irradiation power required for recording will be high, i.e. the recording sensitivity will remarkably be low.

In the present invention, it is preferred to employ a thin second protective layer having a low thermal conductivity.

By using a thin second protective layer having a low thermal conductivity, the thermal conduction from the recording layer to the reflective layer will be delayed for a few nsec to a few tens nsec at the initiation of the recording power irradiation, and thereafter, heat dissipation to the reflective layer can be promoted, whereby it is possible to avoid lowering the recording sensitivity unnecessarily by heat dissipation.

A conventional material for the protective layer containing, as the main component, $SiO_2$, $Ta_2O_5$, $Al_2O_3$, AlN, SiN or the like, is not preferred for the second protective layer 4 of the medium of the present invention, since the thermal conductivity of the material itself is too high. Namely, the thermal conductivity of a metal oxide or nitride is higher by at least one figure as compared with the after-mentioned protective layer to be used for the protective layer of the present invention, even when compared with the same thin film state.

On the other hand, heat dissipation in the reflective layer can be accomplished even by increasing the thickness of the reflective layer. However, if the thickness of the reflective layer exceeds 300 nm, the thermal conduction in the film thickness direction rather than the in-plane direction of the recording layer, becomes remarkable, whereby the effect for improving the temperature distribution in the in-plane direction can not be obtained. Further, the heat capacity of the reflective layer itself will increase, and it tends to take time for cooing of the reflective layer, and consequently of the recording layer, whereby formation of amorphous marks will be hindered. It is most preferred that a reflective layer having a high thermal conductivity is formed to be thin so that heat dissipation in the transverse direction is selectively promoted.

The conventional rapid cooling structure is intended to release the heat from the recording layer to the reflective layer as quickly as possible, paying an attention only to one-dimensional heat dissipation in the thickness direction, and no adequate attention has been paid to the flattening of the temperature distribution in the in-plane direction.

The "ultra rapid cooling structure taking into consideration the effect for delaying the thermal conduction by the second protective layer" according to the present invention, is more effective when applied to the recording layer of the present invention, as compared with the application to the conventional GeTe—$Sb_2Te_3$ recording layer, because with the recording layer of the present invention, the crystal growth at the time of resolidification in the vicinity of Tm is a rate controlling factor for the recrystallization. To maximize the cooling rate in the vicinity of Tm to ensure and secure formation of amorphous marks and their edges, the ultra rapid cooling structure is effective, and while high speed erasing intrinsically possible in the vicinity of Tm, by flattening of the temperature distribution in the in-plane direction, erasing by recrystallization can be secured to a higher erasing power level.

In the present invention, the material for the second protective layer preferably has a low thermal conductivity, and the index for the low thermal conductivity is $1 \times 10^{-3}$ pJ/($\mu$m·K·nsec). However, it is difficult to directly measure the thermal conductivity in a thin film state of such a low thermal conductivity material, and instead, an index may be obtained from a thermal simulation and the results of actual measurement of the recording sensitivity.

As a material for the second protective layer having a low thermal conductivity which brings about preferred results, a composite dielectric is preferred which contains from 50 mol % to 90 mol % of at least one member selected from the group consisting of ZnS, ZnO, $TaS_2$ and rare earth sulfides and which further contains a heat resistant compound having a melting point or a decomposition point of at least 1,000° C.

More specifically, a composite dielectric is preferred which contains from 60 mol % to 90 mol % of a sulfide of a rare earth element such as La, Ce, Nd or Y.

Otherwise, it is preferred that the compositional range of ZnS, ZnO or a rare earth sulfide is made to be from 70 to 90 mol %.

As the heat resistant compound having a melting point or a decomposition point of at least 1,000° C., to be mixed therewith, an oxide, nitride or carbide of e.g. Mg, Ca, Sr, Y, La, Ce, Ho, Er, Yb, Ti, Zr, Hf, V, Nb, Ta, Zn, Al, Si, Ge or Pb, or a fluoride of e.g. Ca, Mg or Li, may be employed.

Particularly, as a material to be mixed with ZnO, a sulfide of a rare earth element such as Y, La, Ce or Nd, or a mixture of a sulfide and an oxide, is preferred.

The thickness of this second protective layer is at most 30 nm, preferably at most 25 nm. If the thickness exceeds 30 nm, no adequate effect for flattening the temperature distribution in the mark width direction can be obtained. If the thickness is less than 5 nm, the effect for delaying the thermal conductivity at the second protective layer portion tends to be insufficient, whereby the decrease in the recording sensitivity tends to be remarkable, such being undesirable.

The thickness of the second protective layer 4 is preferably from 15 nm to 25 nm when the wavelength of the recording laser beam is from 600 to 700 nm, and it is preferably from 5 to 20 nm, more preferably from 5 to 15 nm, when the wavelength is from 350 to 600 nm.

In the present invention, a thin reflective layer 5 of at most 300 nm having a very high thermal conductivity, is employed to promote the heat dissipation effect in the transverse direction.

In general, the thermal conductivity of a thin film differs substantially from the thermal conductivity in the bulk state and is usually smaller. Particularly, with a thin film of less than 40 nm, by the influence of the scattered structure at the initial stage of the growth, the thermal conductivity may sometimes be smaller by at least one figure, such being undesirable. Further, depending upon the film forming conditions, the crystallizability or the amount of impurities may differ, which will be a factor for various thermal conductivities even with the same composition.

In the present invention, to define the reflective layer having a high thermal conductivity which shows good characteristics, the thermal conductivity of the reflective layer can be directly measured, but the degree of the thermal conductivity can be estimated by means of the electric resistance. With a material like a metal film whereby electrons govern mainly the heat or the electrical conductivity, the thermal conductivity and the electrical conductivity are in a good proportional relationship.

The electrical resistance of a thin film is represented by a resistivity specified by its film thickness or by the area of the measured region. The volume resistivity and the sheet resistivity can be measured by a usual four probe method, and the measuring method is prescribed in JIS K 7194. By the method, data can be obtained much simply and with better reproducibility than measuring the thermal conductivity of the thin film directly.

In the present invention, the reflective layer preferably has a volume resistivity of from 20 n$\Omega$·m to 150 n$\Omega$·m, more preferably from 20 n$\Omega$·m to 100 n$\Omega$·m. A material having a volume resistivity of less than 20 n$\Omega$·m is hardly obtainable in a thin film state. Even in a case where the volume resistivity is larger than 150 n$\Omega$·m, the sheet resistivity can be lowered by increasing the film thickness to a level exceeding 300 nm. However, according to the study by the present inventors, even if only the sheet resistivity is lowered with such a material having a high volume resistivity, no adequate effect for heat dissipation is obtainable. This may be attributable to the fact that with the thick film, the heat capacity per unit area becomes large. Further, with such a thick film, it takes time for film formation, and the cost for the material also increases, such being undesirable from the viewpoint of the production cost. Further, microscopic flatness of the film surface is also likely to deteriorate.

It is preferred to employ a material having a low volume resistivity having a film thickness of at most 300 nm, whereby a sheet resistance of from 0.2 to 0.9 $\Omega$/□ can be obtained. The volume resistivity is most preferably 0.5 $\Omega$/□.

The material suitable for the present invention is as follows.

For example, it is an Al—Mg—Si type alloy containing from 0.3 wt % to 0.8 wt % of Si and from 0.3 wt % to 1.2 wt % of Mg.

Further, with an Al alloy containing from 0.2 atomic % to 2 atomic % of Ta, Ti, Co, Cr, Si, Sc, Hf, Pd, Pt, Mg, Zr, Mo or Mn in Al, the volume resistivity increases in proportion to the concentration of the additive element, and the hillock resistance will be improved, and it may be employed taking into consideration the durability, the volume resistivity, the film forming speed, etc.

With respect to the Al alloy, if the amount of the added impurity is less than 0.2 atomic %, the hillock resistance tends to be inadequate in many cases, although it may depend upon the film-forming condition. On the other hand, if it exceeds 2 atomic %, the above-mentioned low resistivity can not be obtained.

In a case where the stability with time is regarded as more important, the additive component is preferably Ta. Especially, when the upper protective layer 4 containing ZnS as the main component, an AlTa alloy containing from 0.5 atomic % to 0.8 atomic % of Ta is preferred as a reflective layer which satisfies all of the corrosion resistance, adhesion and high thermal conductivity in good balance. Further, it is possible to obtain a preferred effect for the production such that by an addition of only 0.5 atomic % of Ta, the film-forming rate will be increased by from 30 to 40% as compared with pure Al or an Al—Mg—Si alloy.

In a case where the above Al alloy is used for a reflective layer, the preferred film thickness is from 150 to 300 nm. If the thickness is less than 150 nm, the heat dissipation effect will be inadequate even with pure Al. If the thickness exceeds 300 nm, the heat dissipates in a vertical direction rather than a horizontal direction, whereby no contribution to the improvement of the heat distribution in the horizontal direction can be obtained, and the heat capacity of the reflective layer itself tends to be large, whereby the cooling rate of the recording layer tends to be slow. Further, the microscopic flatness of the film surface is also likely to deteriorate.

Further, a Ag alloy containing from 0.2 atomic % to 5 atomic % of Ti, V, Ta, Nb, W, Co, Cr, Si, Ge, Sn, Sc, Hf, Pd, Rh, Au, Pt, Mg, Zr, Mo or Mn in Ag, is also preferred. In a case where the stability with time is regarded as more important, the additive component is preferably Ti or Mg.

In a case where the above Ag alloy is used for a reflective layer, the preferred film thickness is from 40 nm to 150 nm. If the thickness is less than 40 nm, the heat dissipation effect is inadequate even with pure Ag. If it exceeds 150 nm, the heat dissipates in a vertical direction rather than a horizontal direction, and no contribution to the improvement in the heat distribution in the horizontal direction can be obtained, and the unnecessarily thick film decreases the productivity. Further, the microscopic flatness of the film surface is also likely to deteriorate.

The present inventors have confirmed that the additive element to Al and the additive element to Ag, will increase the volume resistivity in proportion to the concentration of such an additive element.

It is usually considered that addition of an impurity tends to reduce the crystal particle size and increase the electron scattering at the grain boundaries thereby to lower the thermal conductivity. It is necessary to control the amount of the additive impurities in order to obtain the high thermal conductivity of the material itself by increasing the crystal grain size.

The reflective layer is usually formed by sputtering or vacuum vapor deposition. The target or the material for vapor deposition contains a substantial amount of impurities, and the total amount of impurities including moisture and oxygen to be included during the film formation is required to be at most 2 atomic %. For this purpose, the final vacuum pressure of the process chamber is preferably at most $1 \times 10^{-3}$ Pa.

If film formation is carried out at a final vacuum pressure poorer than $10^{-4}$ Pa, it is preferred to adjust the film forming rate to be at least 1 nm/sec, more preferably at least 10 nm/sec so as to prevent inclusion of impurities.

Otherwise, in a case where the intentional additive element is incorporated in an amount larger than 1 atomic %, it is preferred to adjust the film forming rate to be at least 10 nm/sec so as to minimize inclusion of additional impurities.

The film-forming conditions may sometimes influence over the crystal grain size irrespective of the amount of impurities. For example, in an alloy film having about 2 atomic % of Ta included in Al, an amorphous phase will be included between the crystal grains, and the proportions of the crystal phase and the amorphous phase depend on the film-forming conditions. For example, as the sputtering is carried out at a low pressure, the proportion of the crystal phase increases, the volume resistivity decreases, and the thermal conductivity increases.

The composition of impurities in the film or the crystallizability also depends on the sputtering gas (such as Ar, Ne or Xe) or the method for preparing the alloy target to be used for sputtering.

Thus, the volume resistivity in the thin film state will not be determined simply by the metal material or composition.

In order to obtain a high thermal conductivity, it is preferred to minimize the amount of impurities, as mentioned above. However, on the other hand, pure metal such as Al or Ag tends to be poor in the corrosion resistance or the hillock resistance. Therefore, the optimum composition is determined taking into the balance of the two into consideration.

In order to obtain higher thermal conductivity and higher reliability, it is also effective to make the reflective layer to have a multilayer structure. At that time, at least one layer is made of the above-mentioned material having a low volume resistivity having a thickness of at least 50% of the total thickness of the reflective layer, to obtain a substantial heat dissipation effect, while other layers will contribute to the improvement of the corrosion resistance, the adhesion with the protective layer or the hillock resistance.

More specifically, among metals, Ag having the highest thermal conductivity and a low volume resistivity, has low compatibility with the protective layer containing S, and tends to deteriorate slightly quickly when subjected to repetitive overwriting.

Further, it tends to be susceptible to corrosion under a high temperature high humidity accelerated test environment.

Under these circumstances, it is effective to use Ag or a Ag alloy as a material having a low volume resistivity and to form an alloy layer containing, as the main component, Al, as an interfacial layer in a thickness of from 1 nm to 100 nm between the Ag or the Ag alloy layer and the upper protective layer. If the thickness is adjusted to be at least 5 nm, the layer tends not to have a scattered structure and can be formed uniformly.

As the Al alloy, an Al alloy containing from 0.2 atomic % to 2 atomic % of Ta, Ti, Co, Cr, Si, Sc, Hf, Pd, Pt, Mg, Zr, Mo or Mn, may be mentioned as described above.

If the thickness of the interfacial layer is less than 1 nm, no adequate protective effect will be obtained, and if it exceeds 100 nm, the heat dissipation effect tends to be sacrificed.

Use of the interfacial layer is effective particularly when the reflective layer is made of Ag or an Ag alloy, because Ag is likely to undergo corrosion by sulfidization when contacted with a protective layer containing a sulfide which is regarded to be preferred in the present invention.

Further, in a case where a Ag alloy reflective layer and an Al alloy interfacial layer are employed, Ag and Al tend to mutually diffuse to each other, and it is more preferred to provide an interfacial oxide layer by oxidizing the Al surface in a thickness thicker than 1 nm. If the interfacial oxide layer exceeds 5 nm, especially 10 nm, thermal resistance will be created, whereby the function as a reflective layer having an extremely high heat dissipation property tends to be impaired, such being undesirable.

The multilayer structure of the reflective layer is effective also to obtain a desired sheet resistivity with a desired film thickness by combining a material having a high volume resistivity and a material having a low volume resistivity.

Adjustment of the volume resistivity by alloying simplifies the sputtering process by the use of an alloy target. However, such will be a factor of increasing the cost for the production of the target, or the raw material cost for the medium. Accordingly, it is effective to obtain a desired volume resistivity by laminating a thin film of pure Al or pure Ag with a thin film of the above additive element itself.

If the number of layers is up to three layers, the initial cost for apparatus may increase, but cost for individual media may sometimes be reduced.

It is preferred that the reflective layer is made to be a multilayer reflective layer comprising a plurality of metal films, having a total thickness of from 40 nm to 300 nm, wherein at least 50% of the thickness of the multilayered reflective layer is constituted by a thin metal layer (which may be a multilayer) having a volume resistivity of from 20 n$\Omega$·m to 150 n$\Omega$·m.

The thicknesses of the recording layer and the protective layers are selected taking into consideration not only the limitations from the above-mentioned aspects of the thermal characteristics, mechanical strength and reliability but also the interference effect attributable to the multilayer structure, so that the efficiency for absorbing the laser beam is good, and the amplitude of the recording signal, i.e. the contrast between the recorded state and the unrecorded state, is large.

For example, if the medium of the present invention is to be applied to rewritable DVD and interchangeability with read-only DVD is to be secured, the modulation has to be taken at a high level. Further, it is necessary that a tracking servo method so-called a DPD (Differential Phase Detection) method can be used as it is, which is commonly employed in a read only player.

FIG. 6 shows a waveform of a DC retrieving signal (a retrieving signal containing a DC component) obtained by recording and retrieving an EFM plus-modulated random signal. The modulation is defined by a ratio of $I_{14}/I_{top}$, where $I_{14}$ is the signal amplitude of 14T mark and $I_{top}$ is the signal intensity at the top of 14T mark.

$I_{top}$, in fact, corresponds to the reflectance in the groove of an unrecorded portion (crystal state). $I_{14}$ depends on both the intensity difference and the phase difference of reflected lights from the crystal portion and the amorphous portion of the phase-change medium.

Basically, the intensity difference of reflected lights is determined by the difference in reflectance between the crystal state and the amorphous state. If the above modulation after recording is at least about 0.5, low jitter can be realized, and a tracking servo by the above-mentioned DPD method will properly operate.

Figure 7:
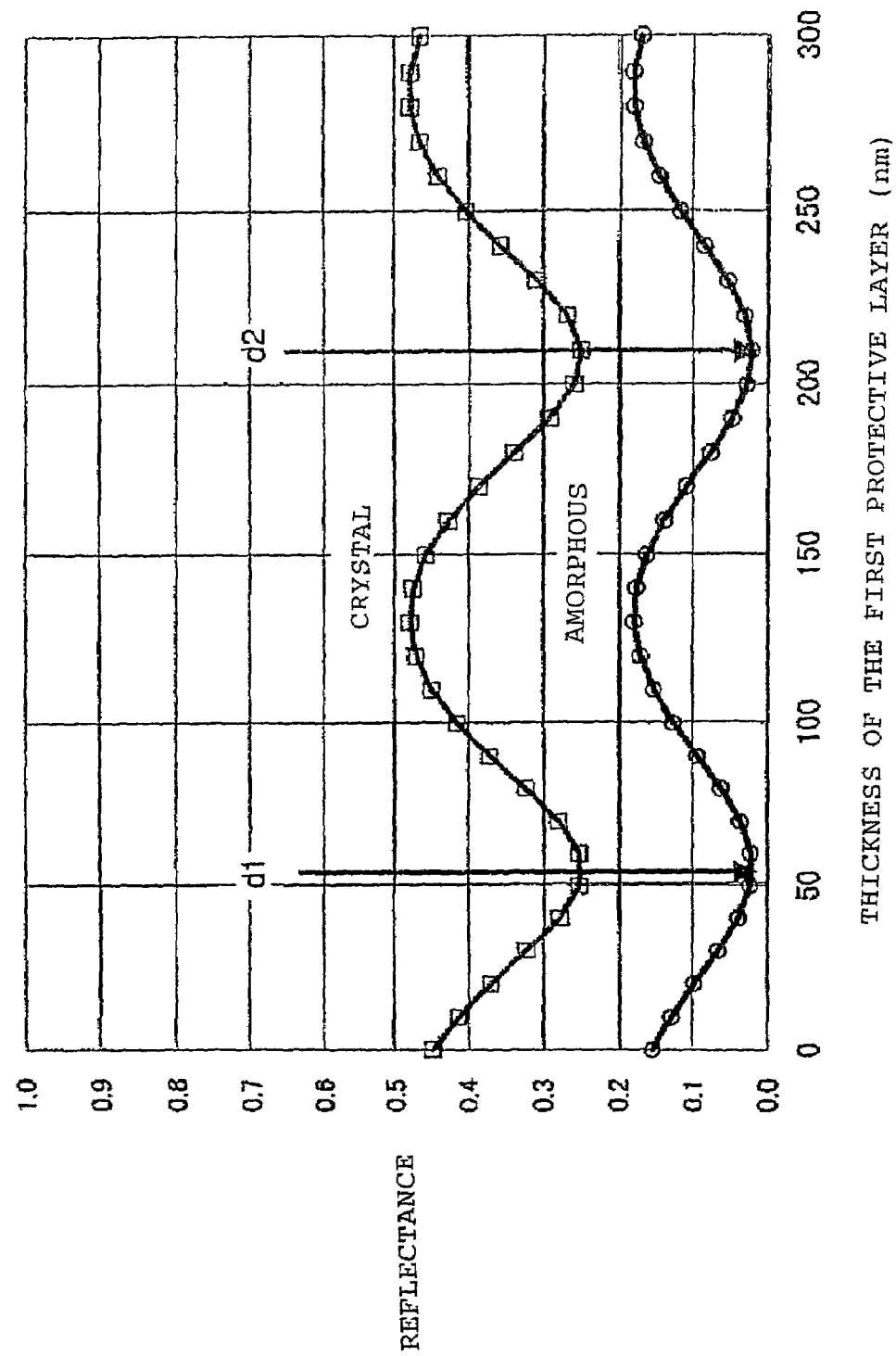
FIG. 7 is a graph for illustrating the dependency of the reflectance on the thickness of the first protective layer.

FIG. 7 illustrates an example for calculation of the difference in reflectance in a typical four-layer structure. The structure is such that a $(ZnS)_{80}(SiO_2)_{20}$ protective layer, a $Ge_{0.05}Sb_{0.69}Te_{0.26}$ recording layer, a $(ZnS)_{80}(SiO_2)_{20}$ protective layer and an $Al_{0.995}Ta_{0.005}$ reflective layer are formed on a polycarbonate substrate.

As the refractive indices of the respective layers, the actually measured values are employed. The complex refractive indices of the respective materials at a wavelength of 650 nm are 2.12–0.0 i for the upper and lower protective layers, 1.7–5.3 i for the reflective layer, 1.56 for the substrate, 3.5–2.6 i for the recording layer in an amorphous state (as measured in the state immediately after the film formation) and 2.3–4.1 i for the recording layer in the crystal state after the initialization.

The thicknesses of the recording layer, the second protective layer and the reflective layer are constant at levels of 18 nm, 20 nm and 200 nm, respectively.

So long as the dependency on the thickness of the first protective layer is observed, a change in the amplitude is usually small, and the modulation depends strongly on $I_{top}$ as the dominator, i.e. the reflectance in the crystal state. Accordingly, the reflectance in the crystal state is preferably as low as possible.

In the calculation example in FIG. 7, the first protective layer is made of a $(ZnS)_{80}(SiO_2)_{20}$ film having a refractive index n=2.12. Here, the first minimum value $d_1$ is at a thickness of from 50 to 70 nm, and the second minimum value $d_2$ is at a thickness of from 200 to 220 nm. Thereafter, the reflectance changes periodically.

The thickness of the first protective layer at which the reflectance in the crystal state becomes minimum, is determined substantially solely by the refractive index of the protective layer, provided that the recording layer has a high reflectance. The minimum point thicknesses at other refractive indices can be roughly be obtained by multiplying $d_1$ or $d_2$ by 2.1/n. However, the refractive index n of a dielectric to be used as a protective layer is usually at a level of from 1.8 to 2.3, and $d_1$ is at a level of from 60 to 80 nm.

If the refractive index n of the first protective layer is smaller than 1.8, the reflectance at the minimum point increases, whereby the modulation decreases substantially to a level of less than 0.5, such being undesirable. On the other hand, if it exceeds 2.3, the reflectance at the minimum point tends to be so low that 20% can not be accomplished, whereby it tends to be difficult to operate the focus servo or tracking servo.

With the compositional range of the recording layer of the present invention, optical characteristics similar to FIG. 7 will be obtained.

From the viewpoint of the productivity, it is preferred that the thickness of the first protective layer is at most 150 nm, because at present, the film forming speed of the dielectric protective layer by sputtering is 15 nm/sec at most, it will be costly to take a time of at least 10 seconds for the film formation. Further, the allowance in the film thickness will be strict, such being undesirable from viewpoint of the productivity. Namely, as is evident also from FIG. 7, if the thickness departs by $\Delta d$ from the desired thickness $d_0$, the reflectance changes to the same extent in the vicinity of the first minimum value $d_1$ or in the vicinity of the second minimum value $d_2$.

On the other hand, the thickness distribution from the viewpoint of the production is usually ±2 to 3% to $d_0$ because of the limitation in uniformity. Accordingly, the thinner the $d_0$, the smaller the $\Delta d$ i.e. the variation degree in the thickness, and such is advantageous, since the variation in the reflectance in the disk plane or among disks can be suppressed.

Accordingly, in the case of an inexpensive stationary facing type sputtering apparatus having no mechanism for revolution and rotation of a substrate, it is advisable to employ the film thickness in the vicinity of the first minimum value $d_1$.

On the other hand, a thick protective layer has a large effect for suppressing deformation of the substrate surface at the time of repetitive overwriting. Accordingly, if improvement of the repetitive overwriting durability is of importance, it is advisable to employ a film thickness in the vicinity of the second minimum value $d_2$.

With a medium for recording or retrieving by applying a recording or retrieving laser beam via the substrate, it is necessary to protect the substrate from the heat generated during the recording, by making the first protective layer thick to some extent. During the recording, the recording layer becomes at least 500 to 600° C. for a period of about 100 nsec. For this purpose, the film thickness is preferably at least 50 nm. If the thickness is less than 50 nm, microscopic deformation will be accumulated on the substrate by repetitive recording, which causes a noise or defect. Especially when the substrate is made of a thermoplastic material such as polycarbonate, the thickness of the protective layer becomes important.

Now, an optical recording method will be described which is preferably employed in combination with the medium of the present invention.

A preferred first recording method comprises recording mark length-modulated information on the above described recording medium by a plurality of record mark lengths, wherein a recording laser beam having an erasing power Pe capable of crystallizing amorphous phase is applied between record marks, and when the time length of one record mark is represented by nT (wherein T is the reference clock period, and n is an integer of at least 2), the time length nT of the record mark is divided in the order of:

$\eta_1 T, \alpha_1 T, \beta_1 T, \alpha_2 T, \beta_2 T, \ldots,$
$\alpha_i T, \beta_i T, \ldots, \alpha_m T, \beta_m T, \eta_2 T$ wherein m is a pulse dividing number, and m=n−k, where k is an integer of $0 \leq k \leq 2$,
$\Sigma_i(\alpha_i+\beta_i)+\eta_1\eta_n=n$, $\eta_1$ is a real number of $\eta_1 \geq 0$, $\eta_2$ is a real number of $\eta_2 \geq 0$, provided $0 \leq \eta_1+\eta_2 \leq 2.0$,
$\alpha_i(1\leq=\leq m)$ is a real number of $\alpha_i>0$, $\beta i(1\leq i\leq m)$ is a real number of $\beta_i>0$, $\Sigma\alpha_i<0.5$ n,
$\alpha_1=0.1$ to 1.5, $\beta_1=0.3$ to 1.0, $\beta_m=0$ to 1.5, $\alpha_i=0.1$ to 0.8 ($2\leq i\leq m$), and
when i is $3\leq i\leq m$, $\alpha_i+\beta_{i-1}$ is within a range of from 0.5 to 1.5 and is constant irrespective of i,
a recording laser beam having a writing power Pw of Pw>Pe, sufficient to melt the recording layer, is applied within the time of $\alpha_i T$ ($1\leq i\leq m$) and a recording laser beam having a bias power Pb of $0<Pb\leq 0.2Pe$ is applied within the time of $\beta_i T(1\leq i\leq m)$ (provided that within $\beta_m T$, the bias power may be $0<Pb\leq Pe$).

By employing the above recording method in combination with the above described medium, it is possible to accurately control the cooling rate at the time of resolidification of the recording layer and to carry out high density mark length modulation recording with the shortest mark length being at most 0.5 μm within a linear velocity range of at least from 3 m/s to 8 m/s, or by adjusting the recording conditions, within a wider linear velocity range of from 1 m/s to 15 m/s, and it is possible to accomplish repetitive overwriting of at least 1,000 times and to realize a low jitter of less than 10% of the reference clock period T.

In order to realize the high density mark length modulation recording as described above, firstly, a laser beam having a wavelength of from 350 to 680 nm is focused on the recording layer through an object lens having a numerical aperture NA of from 0.55 to 0.9, to form a very small focused laser beam spot.

More preferably, NA is from 0.55 to 0.65. If NA exceeds 0.65, the influence of aberration due to an inclination of the optical axis becomes substantial, whereby it will be necessary to reduce the distance between the object lens and the recording surface. Accordingly, in a case where a focused laser beam is applied through a substrate having a thickness of about 0.6 mm, as in the case of DVD, the upper limit of NA will be about 0.65.

Figure 8:
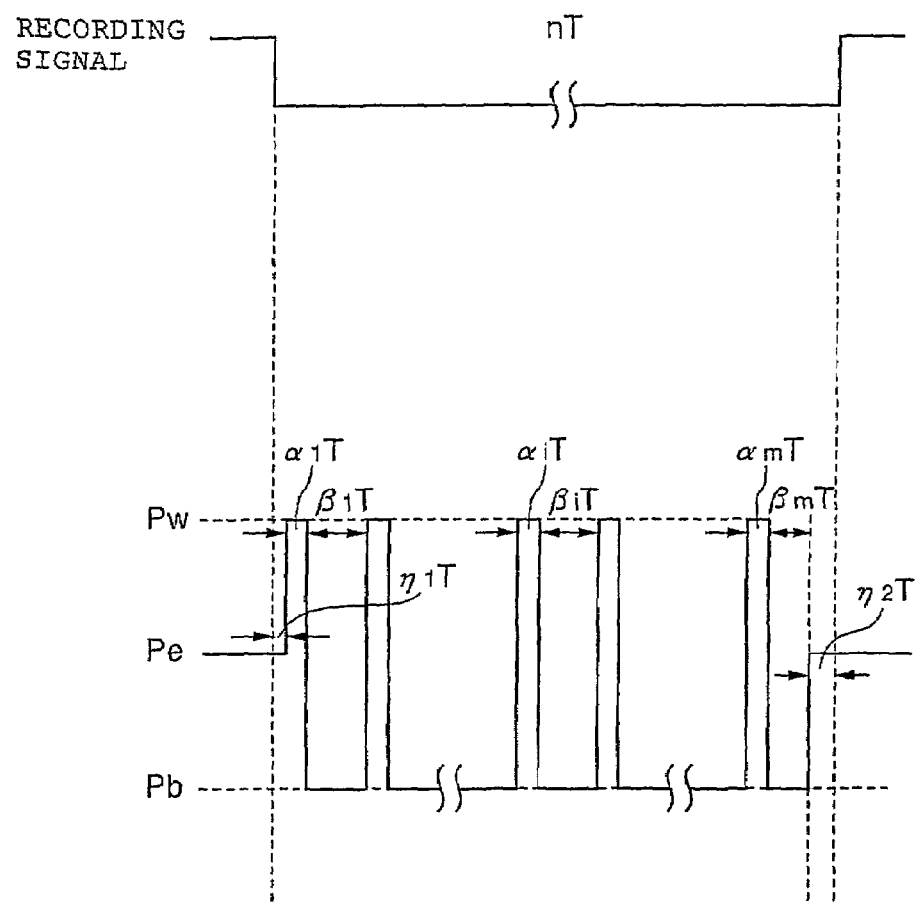
FIG. 8 is a view illustrating an embodiment of a pulse-dividing method for the power three-valued modulation recording system.

And, as shown in FIG. 8, by modulating the recording laser power to have at least three values, it is possible to broaden the power margin and the linear velocity margin during recording.

In FIG. 8, the start position of the first recording pulse $\alpha_1 T$, the final position of the final off pulse $\beta_m T$, does not necessarily agree to the start position and the final position of the initial recording signal. Within the range of $0\leq\eta_1+\eta_2\leq 2.0$, $\eta_1 T$ may be placed at the front, and $\eta_2 T$ may be placed at the end. It is effective to finely adjust the length of $\eta_1 T$ or $\eta_2 T$ depending upon the lengths of the land portions or the length of marks before and after the particular mark, in order to form the mark accurately.

Otherwise, by changing only $\beta_m$ depending upon the mark length nT, a good mark may sometimes be formed. The final $\beta_m$ may be 0. For example, a long mark such as 11T mark among 3T to 11T marks in EFM modulation or 14T mark among 3T to 14T in EFM plus modulation, is likely to accumulate heat, and it is advisable to prolong the final $\beta_m$ to prolong the cooling time.

On the other hand, in the case of a short mark such as 3T mark, it is advisable to shorten $\beta_m$. The range of such adjustment is about 0.5. In the case of high density recording exceeding a linear recording density of so-called DVD, an adequate recording signal quality can be obtained even without carrying out such fine adjustment.

Figure 9:
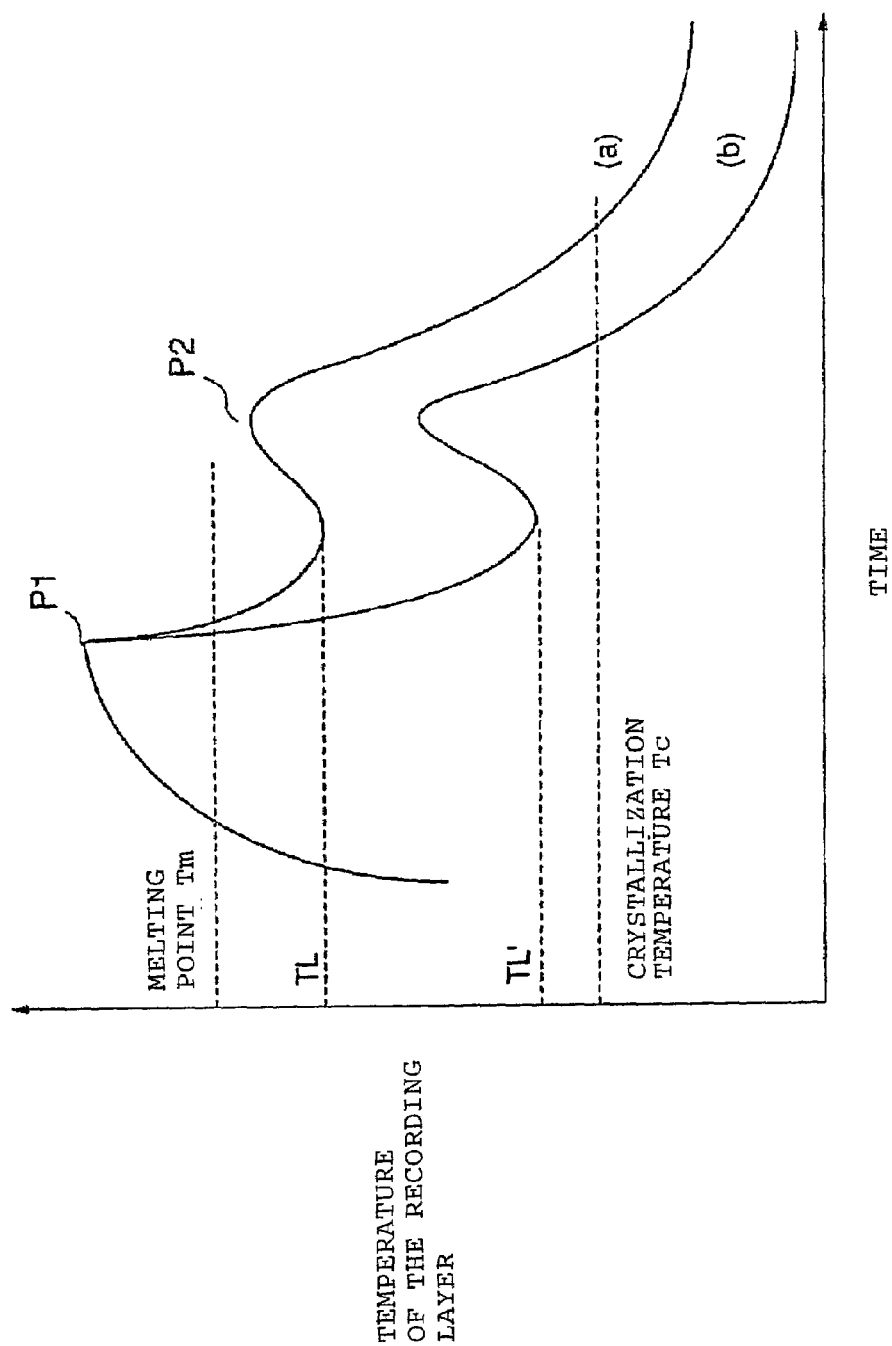
FIG. 9 is a diagrammatical view illustrating the change with time of the temperature of the recording layer.

Further, the mark shape can be controlled also by changing the intensity of the bias power Pb. FIG. 9 shows an example of changes with time of the temperature at one point on the recording layer, when two recording pulses were applied. This represents the temperature changes at the position where recording pulse P1 is applied in the case where recording pulse P1, an off pulse, recording pulse P2 were continuously applied while moving the beam relative to the medium. Line (a) represents a case where Pb=Pe, and line (b) represents a case where Pb≈0.

In FIG. 9(b), the bias power Pb was almost zero in the off pulse section, whereby TL' lowered to a point sufficiently lower than the melting point, and the cooling rate to that point was substantial. Thus, the amorphous mark is formed by the melting at the time of irradiation of the recording pulse P1, followed by rapid cooling during the subsequent off pulse period.

On the other hand, in FIG. 9(a), erasing power Pe is irradiated even during the off pulse section, whereby the cooling rate after irradiation with the first recording pulse P1, is slow, and the lowest temperature TL reached by the temperature drop in the off pulse section will remain in the vicinity of the melting point Tm, and the temperature is further raised by the subsequent recording pulse P2 to a point in the vicinity of the melting point Tm, whereby an amorphous mark can hardly be formed.

It is important to take a sharp temperature profile as shown in FIG. 9(b), for the medium of the present invention, in order to suppress the crystallization in a high temperature region and to obtain a good amorphous mark. Namely, the recording layer of the medium of the present invention shows a high crystallization rate only in the high temperature region immediately below the melting point, and accordingly, the recrystallization can be suppressed by adopting the profile of (b) whereby the recording layer temperature will not stay in the high temperature region so long.

Or, it may be considered that formation of crystal nuclei in a relatively low temperature range which is close to the crystallizing temperature Tc, is not governing in the every erasing process, and as Sb clusters which were formed during the above-mentioned initialization and which can serve as crystal nuclei, are constantly present, only the crystal growth in the high temperature region is governing.

Accordingly, by controlling the cooling rate and TL', recrystallization can be suppressed substantially completely, whereby an amorphous mark having a clear profile which substantially agrees to the melt region, can be obtained, and jitter of the mark edge can be reduced.

On the other hand, with the GeTe—$Sb_2Te_3$ pseudo binary alloy, there will be no substantial difference in the process for forming amorphous marks between the temperature profiles of (a) and (b) in FIG. 9, because this material shows recrystallizability in a wide temperature range, especially even in a low temperature range close to the crystallizing temperature Tc, although the crystallization speed may be slightly slow. Or, with this material, formation of crystal nuclei in a temperature range relatively close to Tc and formation of crystals in a temperature range close to Tm are rate-controlling, whereby it is considered that recrystallization takes place at a relatively low speed in a wide temperature range as a whole.

Also with GeTe—$Sb_2Te_3$, there may be a case where coarse grains are suppressed by using an off pulse with Pb<Pe. However, if Pb/Pe≦0.2, crystallization in the vicinity of Tc is suppressed too much, whereby erasing performance rather tends to deteriorate.

Whereas, with the material for the recording layer of the present invention, it is considered that at a relatively low temperature close to Tc, no substantial crystallization proceeds, and it is preferred to adopt Pb/Pe≦0.2. Or, more specifically, it is preferred to adopt 0≦Pb≦1.5 (mW), and Pb which is as low as possible so long as the tracking servo is stable, is employed. And, an off pulse is positively employed to secure rapid cooling, whereby the edge of an amorphous mark can distinctly be formed, such being desirable.

In the pulse-dividing method shown in FIG. 8, it is most effective to set only the front end recording pulse $\alpha_1 T$ longer than the subsequent pulses $\alpha_i T$ and to set only the front end and rear end off pulse widths $\beta_1 T$ and $\beta_m T$ differently from other off pulses, in order to secure a good balance of characteristics of long marks and short marks.

The forward end pulse $\alpha_1 T$ has no remaining heat effect, whereby it takes a slightly long time for temperature rise. Otherwise, it is effective to set the recording power of the front end pulse higher than the subsequent pulses.

Figure 10:
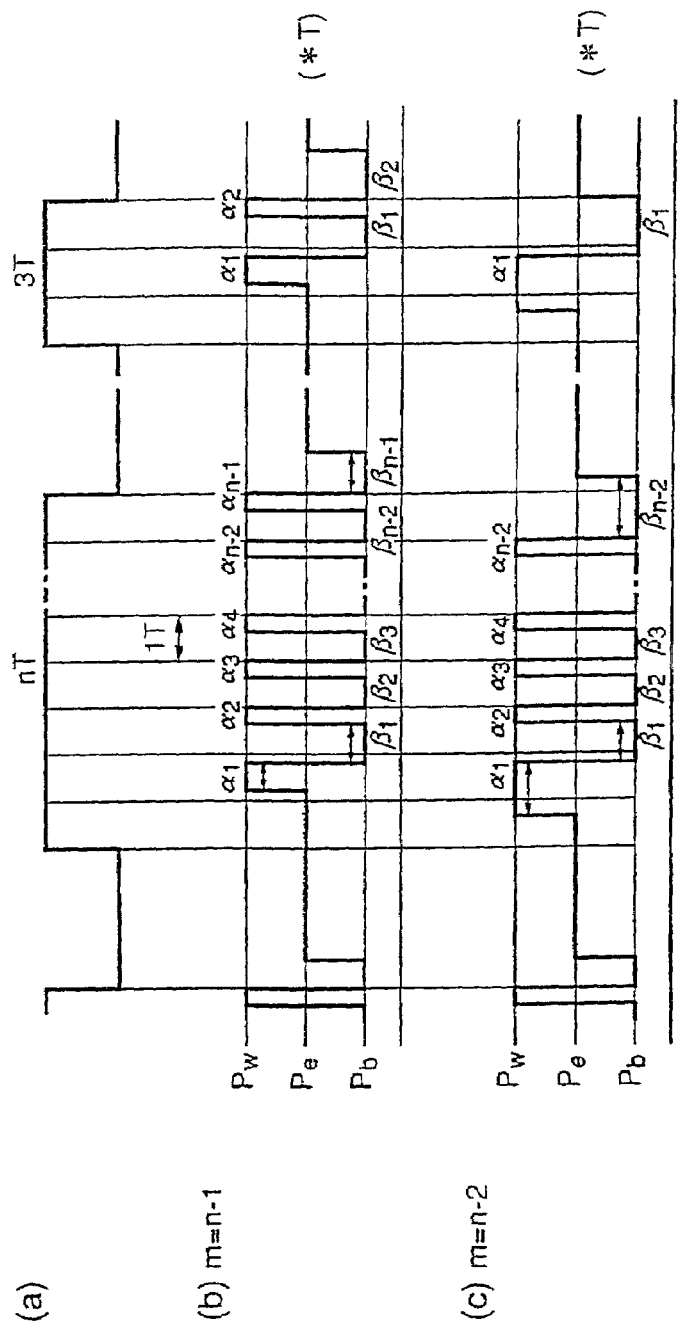
FIG. 10 is a graph showing an embodiment of a pulse-dividing method in the power three-valued modulation recording system suitable for mark length modulation recording.

Further, the pulse control can be simplified by synchronizing the switching of pulses to the clock period T. FIG. 10 shows a pulse-dividing method which is suitable for mark length modulation recording and wherein the pulse control circuit is simple. As a pulse-dividing method for recording the mark length modulated data of (a), (b) shows a case where m=n−1, and (c) shows a case where m=n−2. In (b) and (c), T is omitted to make the graphs simple. In each case, $\alpha_i(2\leq i\leq m)$ and $\beta_i(2\leq i\leq m-1)$ are constant irrespective of i, $\alpha_i\geq\alpha_i$, $\alpha_i+\beta_{i-1}=1.0(3\leq i\leq m)$, and the rear end of the recording pulse of $\alpha_i(2\leq i\leq m)$ is synchronized to the clock pulse.

Further, it is effective to adjust Pb to be the same as retrieving laser power Pr in order to simplify the circuit. It is necessary to set only the front pulse $\alpha_1 T$ longer than the subsequent pulses in order to obtain a good balance of recording of short marks and long marks in a so-called eye patterns. Otherwise, only the front pulse may be made to have a higher power than the subsequent pulses.

Figure 11:
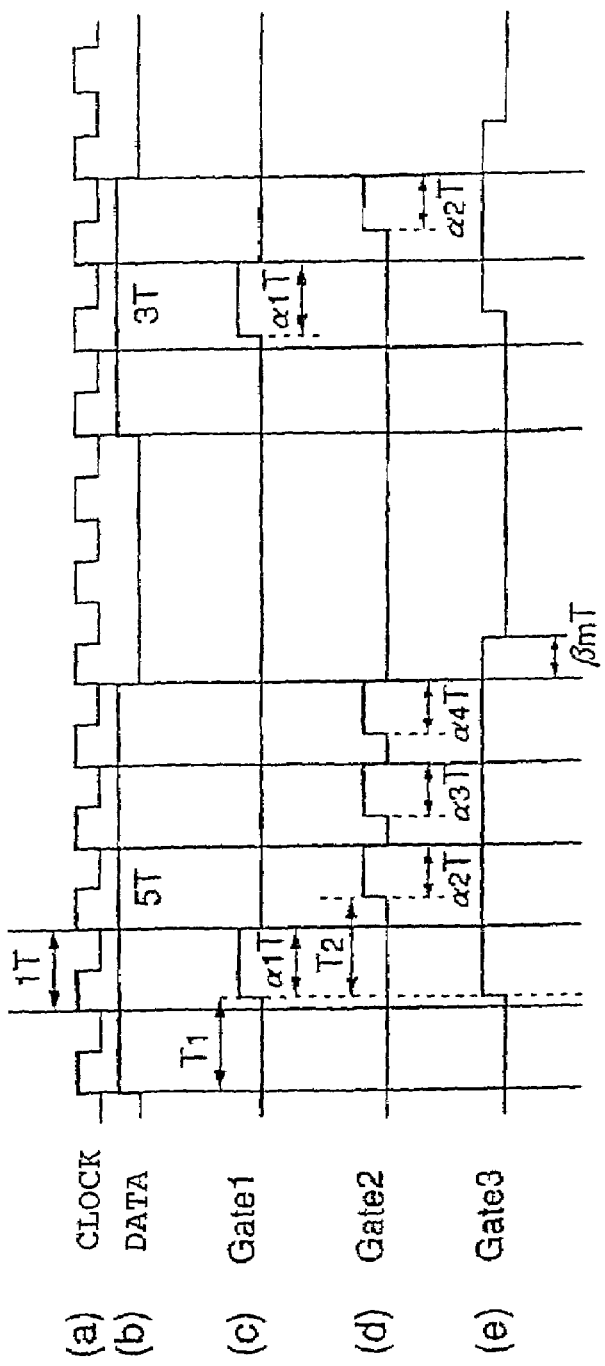
FIG. 11 is a schematic view illustrating the timing for the three types of gate-generating circuits to realize the pulse-dividing method in FIG. 10.

Such pulses can be accomplished by three types of gate generating circuits as shown in FIG. 11 and by determining the priority among them.

FIG. 11 is a view illustrating an embodiment of the pulse-generating method by the recording method of the present invention. In FIG. 11, (a) represents the clock signal, (b) represents the data signal, and (c) to (e) represent gate signals generated from three types of gate generating circuits i.e. (c) Gate 1, (d) Gate 2, and (e) Gate 3. The pulse-dividing method of the present invention can be accomplished by preliminarily deciding the priority among these three types of gate signals.

Gate 1 decides only the recording pulse generating section $\alpha_1 T$, and Gate 2 decides the timing for generating a predetermined number of subsequent pulses $\alpha_i T(2\leq i\leq m)$. Here, the pulse width $\alpha_i$ has a constant value $\alpha_c$ within $2\leq i\leq m$. Gate 3 generates the off pulse generating section $\beta_i T$. When Gate 3 is on (at a high level), Pb is generated, and when it is off (at a low level), Pe is generated.

By deciding the timing for the build-up of only $\alpha_i$ independently, $\beta_1$ can be made to have a value different from $\beta_i$.

It is advisable to synchronize the rise timing of gate 3 and Gate 1. Gate 1 and Gate 2 generate Pw, respectively. However, when Gate 1 and Gate 2 are "on", they have priority over Gate 3. If the delay time $T_1$ and $\alpha_1$ of Gate 1, and the delay time $(T_1+T_2)$ and $\alpha_c$ of Gate 2 are specified, the strategy in FIG. 10 can be specified.

Here, if $T_1$ is at least 1T, such represents the pulses in the case of m=n−1 in FIG. 10(b), and if $T_1$ is less than 1T and the number of subsequent pulses is reduced by one, such represents the pulses in the case of m=n−2 in FIG. 10(c). Here, by adjusting $\alpha_1 T$ and $\beta_{m-2}T$ to be longer than the case of m=n−1, the formed mark length is made to be nT.

As another application of the present invention, the following recording method is preferably employed in order to obtain a signal quality equivalent to read-only DVD at least at the time of retrieving, with a recording density of at least equal to read-only DVD.

Namely, this is an optical recording method wherein recording or retrieving data is carried out by focusing a laser beam having a wavelength of from 350 to 680 n=on the recording layer through the substrate by an object lens having a numerical aperture NA of from 0.55 to 0.9, wherein m=n−1 or m=n−2, 0≦Pb≦1.5 (mW), and Pe/Pw is from 0.3 to 0.6.

And, it is preferred to satisfy the following conditions:
$\alpha_1=0.3$ to 1.5,
$\alpha_1\geq\alpha_i=0.2$ to 0.8 $(2\leq i\leq m)$,
$\alpha_1+\beta_{i-1}=1.0$ $(3\leq i\leq m)$,
$\beta_m=0$ to 1.5

The ratio of Pe/Pw is maintained to be constant, so that the erasable range is broadened by increasing the erasing power when a power fluctuation has occurred, and the record mark is large with a high power. If Pe/Pw is less than 0.3, Pe is always low, and erasing tends to be inadequate. On the other hand, if it exceeds 0.6, Pe tends to be excessive, and it is likely to lead to reconversion to an amorphous state in the vicinity of the center of the laser beam, whereby erasing by complete recrystallization tends to be difficult. Further, the amount of energy irradiated to the recording layer tends to be too much, whereby the recording layer is likely to deteriorate by repetitive overwriting.

With the recording layer having the composition of the present invention, good jitter is obtainable especially when $\alpha_i$ is within a small range. Accordingly, it is advisable to set $\Sigma\alpha_i<0.5n$ and to reduce $(\Sigma\alpha_i)/n$ as k is small. Namely, when k=0 or k=1, it is preferred that $(\Sigma\alpha_i)<0.4$ n, and when k=2, it is preferred that $(\Sigma\alpha_i)<0.5$ n.

Preferably, in order to apply such a recording pulse-dividing method to overwriting at a linear velocity of at least 3 m/s, in the recording layer of $Ge_x(Sb_yTe_{1-y})_{1-x}$ of the present invention, y is adjusted to be at least 0.72, and when it is applied to overwriting at a linear velocity of 7 m/s, y is adjusted to be at least 0.74. Namely, the ratio of Sb/Te is made to be Sb-rich at a level of at least 2.57, more preferably at least 2.85.

It is one of the preferable features of the present invention that stability of amorphous marks is high and the storage stability is also good, even if the composition of the recording layer is made to be Sb-rich as described above.

JP-A-8-22644 discloses a AgInSbTe recording layer having Ag and In added in a total amount of about 10 atomic % to a composition in the neighborhood of $Sb_{0.7}Te_{0.3}$. However, this recording layer has a problem in the storage stability such that if the Sb/Te ratio in this AgInSbTe recording layer is made to be at least 2.57, the amorphous marks tend to be extremely unstable.

Now, this will be further explained with reference to a test example. Here, reference is made to a case where EFM plus modulated mark length recording is carried out in which to record a mark with a length of nT, recording is carried out by means of an optical system having a wavelength of from 630 to 680 nm and NA=0.6 within a range of a linear velocity of from 2 m/s to 5 m/s, by dividing the recording pulses into n−1.

As an embodiment of the recording layer of the present invention, $Ag_{0.05}Ge_{0.05}Sb_{0.67}Te_{0.23}$ (Sb/Te≈2.91), and as an embodiment of the above AgInSbTe recording layer, $Ag_{0.05}In_{0.05}Sb_{0.63}Te_{0.27}$ (Sb/Te≈2.33) is employed.

Both the recording layer having the composition of the present invention and the above AgInSbTe recording layer have substantially the same optical constant. Accordingly, by employing the same layer structures, it was possible to obtain equal reflectance and modulation. Thus, thermally equivalent layer structures can be applied.

The thickness of the first protective layer is made to be 100 nm, the recording layer 20 nm, the second protective layer 20 nm and the reflective layer 200 nm, and in each case, $\beta_i$=about 0.5 (1≦i≦n−1), Pw=10 to 14 (mW), Pe/Pw=0.5, and Pb≈0.

Here, with the conventional $Ag_{0.05}In_{0.05}Sb_{0.63}Te_{0.27}$ recording layer, it is preferred that $\alpha_1$=0.8 to 1.2, and $\alpha_i$=0.4 to 0.6(2≦i≦n−1). Especially when $\alpha_1$=1.0, $\alpha_i$(2≦i≦n−1)=0.5, and $\beta_m$=0.5, $\Sigma\alpha_i$ necessarily becomes 0.5 n irrespective of n.

On the other hand, with the $Ag_{0.05}Ge_{0.05}Sb_{0.67}Te_{0.23}$ recording layer of the present invention, $\alpha_1$=0.3 to 0.5, and $\alpha_i$=0.2 to 0.4(2≦i≦n−1) become preferred ranges. More specifically, $\alpha_1$ may be 0.6, and $\alpha_i$(2≦i≦n−1) may be 0.35. In this case, when n=3, $\Sigma\alpha_i$≈0.32 n, and when n=at least 4, $\Sigma\alpha_i$≈0.33n to 0.34 n.

This means that with the medium of the present invention, it is possible to reduce the average irradiation power to be applied for recording and to shorten the substantial recording pulse irradiation time to a level of $\Sigma\alpha_i<0.4n$.

The following effects can thereby be obtained.

(1) Deterioration of the quality of the recording signal due to high power recording can be reduced. The problem of high power recording is attributable to the fact that the optical energy applied to the recording layer tends to be too much, and such energy will accumulate in the recording layer. Accordingly, the cooling rate tends to be slow, whereby recrystallization of amorphous marks is likely to take place, or deterioration during repetitive overwriting tends to be remarkable.

By providing an off pulse section with a low power, the average input power is suppressed, and by releasing the heat in a in-plane direction by the reflective layer having a high thermal conductivity, even during high power recording, it is possible to suppress the adverse effect by accumulation of the heat at the rear end portions of marks, particularly at the rear end portions of long marks, and it is possible to form good long marks.

(2) Thermal damages of the respective layers during repetitive overwriting can be reduced, whereby repetitive durability can be improved. By reducing a thermal damage for every operation, it is possible to suppress deformation of e.g. a plastic substrate which is weak against heat. Further, the range where the damage occurs, can be limited to a narrower range to the center portion of the laser beam profile.

Especially, with long marks of n=at least 4 wherein the heat is likely to be accumulated, the effect of reducing the proportion of substantial recording energy irradiation $(\Sigma\alpha_i)/n$, is large. Accordingly, it is possible to reduce the adverse effect to the medium even at a low linear velocity of at most 5 m/s where the medium is susceptible to a thermal damage.

In the present invention, the repetitive overwriting durability can be improved as described above, and it is possible to accomplish overwriting in a number of times larger by one figure over conventional overwriting.

Further, the recording layer is made of a thin film comprising, as a main component, a $Ge_x(Sb_yTe_{1-y})_{1-x}$ alloy (0.045≦x≦0.075, and 0.74≦y<0.8), and the recording pulse-dividing method is made variable depending upon the linear velocity, whereby it becomes possible to carry out overwriting at a linear velocity within a wide range including from 3 m/s to 8 m/s.

Namely, in the pulse-dividing method shown in FIG. 8, k in m=n−k is made constant, and either Pb/Pe or $\alpha_i$ is simply decreased, as the linear velocity at the time of overwriting is low.

Further, the clock period may be changed depending upon the linear velocity in order to maintain the recording density to be constant, or Pw and Pe may be changed to maintain the optimum conditions at the respective linear velocities.

The present invention further provides a method for recording a so-called EFM plus modulated signal wherein the shortest mark length will be from 0.35 to 0.45 µm, at both 1-time velocity and 2-times velocity of the standard retrieving linear velocity of DVD. Here, the standard retrieving linear velocity of DVD is 3.49 m/s.

Namely, this is an optical recording method, wherein recording or retrieving of data is carried out by focusing a laser beam having a wavelength of from 600 to 680 nm on the recording layer through an object lens having a numerical aperture NA of from 0.55 to 0.65, with the shortest mark length being within a range of from 0.35 to 0.45 μm, and wherein:

n is an integer of from 1 to 14,
m=n−1,
Pb is constant within a range of 0≦Pb≦1.5 (mW) irrespective of the linear velocity,
Pe/Pw is changeable depending upon the linear velocity within a range of from 0.4 to 0.6,
(i) within a linear velocity of from 3 to 4 m/s, the reference clock period T is To,
$\alpha_1$ 0.3 to 0.8,
$\alpha_1 \geq \alpha_i = 0.2$ to 0.4 and is constant irrespective of i (2≦i≦m),
$\alpha_2 + \beta_1 \geq 1.0$
$\alpha_i + \beta_{i-1} = 1.0$ (3≦i≦m),
$\beta_m = 0.3$ to 1.5, and
a recording laser beam having a writing power Pw1 is irradiated within the time of $\alpha_i T$ (1≦i≦m),
(ii) within a linear velocity of from 6 to 8 m/s, the reference clock period T is To/2,
$\alpha'_1 = 0.3$ to 0.8,
$\alpha'_1 \geq \alpha'_i = 0.3$ to 0.5 and is constant irrespective of i (2≦i≦m),
$\alpha'_1 + \beta'_{i-1} = 1.0$ (3≦i≦m),
$\beta'_m = 0$ to 1.0, and
a recording laser beam having a writing power Pw2 is irradiated within the time of $\alpha_i T$ (1≦i≦m),
wherein $\alpha'_1 \leq \alpha_i$ (2≦i≦m), and 0.8≦Pw1/Pw2≦1.2.

According to the test results obtained by the present inventors, so long as the pulse-dividing method as shown in FIG. 10 is employed, particularly good jitter was obtained by this setting.

Here, if $\alpha_2 + \beta_1 = 1.0$, independent parameters relating to the pulse width will be three i.e. $\alpha_1$, $\alpha_i$ and $\beta_m$, whereby the recording signal source can further be simplified, such being preferred.

Further, n may not necessarily take every integer of from 1 to 14, and in EFM plus modulation, n takes an integer of from 3 to 11 and 14. Further, (1,7)RLL-NRZI (Run Length Limited-Non Return To Zero Inverted) symbols, etc. may also be used.

Further, in order to make the recording density to be constant, it is common to set the clock period at the time of recording at 1-time velocity to be twice the clock period at the time of recording at 2-times velocity.

The present invention is effective not only for the system wherein recording is carried out over the entire record region while maintaining a constant linear velocity as described above (CLV (constant linear velocity) system) but also for a system wherein recording is carried out over the entire recording region at a constant rotational angular velocity (CAV (constant angular velocity) system). Or, it is effective also for a ZCLV (Zoned CLV) system wherein the radial direction is divided into a plurality of zones, and within the same zone, overwriting is carried out by the CLV system.

Optical disks have various diameters such as 86 mm, 90 mm (single CD size), 120 mm (CD size) and 130 mm, and the recording region ranges from a radius of from 20 to 25 mm to a largest radius of about 65 mm. Here, the difference in the linear velocity as between the inner and outer diameter becomes as large as three times at the maximum.

In general, in high density mark length recording, the linear velocity range wherein the phase-change medium exhibits good overwriting characteristics, is within a range of a linear velocity ratio of about 1.5 times. As the linear velocity increases, the cooling rate of the recording layer becomes high, whereby an amorphous mark will readily be formed. However, the time during which the temperature is maintained at a level of at least the crystallization temperature, becomes short, whereby erasing tends to be difficult. On the other hand, if the linear velocity decreases, erasing will be easy, but the cooling time of the recording layer will be slow, whereby recrystallization is likely to take place, and good amorphous marks tend to be hardly formed.

To solve this problem, the thickness of the reflective layer may be varied as between the inner and outer diameter, so that the degree of the heat dissipation effect by the reflective layer will be large at the inner periphery. Otherwise, it has also been proposed that the composition of the recording layer is modified so that the crystallization speed is increased at the outer diameter, or the critical cooling rate required for the formation of an amorphous state, is lowered at the inner diameter. However, it is not easy to prepare a disk having such a distribution.

Whereas, by the combination for the medium and the optical recording method of the present invention, so long as the linear velocity at the outer-most diameter of the disk, i.e. the maximum linear velocity, is at most 10 m/s, good recording is possible even by a CAV system or by a ZCLV system.

In order to apply the present invention to a medium wherein the linear velocity radially varies as mentioned above, it is preferred that the recording region is radially divided into a plurality of zones, so that the reference clock frequency of data and the pulse-dividing method may be changed from one zone to another.

Namely, this is a method for recording information by a plurality of mark lengths by rotating the optical information recording medium having a predetermined recording region at a constant angular speed, wherein the medium is rotated so that the linear velocity at the inner-most diameter of the recording region will be from 2 to 4 m/s, and the linear velocity at the outer-most diameter of the recording region will be from 6 to 10 m/s, and the recording region comprises a plurality of radially divided zones, and the reference clock period T is changed so that the recording density in each zone will be substantially constant depending upon the average linear velocity.

Here, the pulse-dividing number m is made constant irrespective of the zone, and the Pb/Pe ratio and/or $\alpha_i$ (i is at least one of 1≦i≦m) is simply decreased from the outer zone towards the inner zone, whereby it is possible to prevent the possibility that at the inner diameter portion with a low linear velocity, formation of amorphous marks becomes incomplete due to an insufficient cooling rate. Here, "$\alpha_i$ (i is at least one of (1≦i≦m) is simply decreased" means, for example, among $\alpha_1$, $\alpha_2$, . . . , $\alpha_m$, only $\alpha_2$ is decreased.

More specifically, it is preferred to employ a pulse-dividing method depending upon the linear velocity on the basis of the pulse-dividing method shown in FIG. 10, whereby the circuit for the variable pulse-dividing method can be simplified. At that time, it is convenient that the recording region is divided into p zones in the radial direction, and the clock period and the pulse- dividing method are changed for every zone, rather than they are continuously changed in the radial direction.

In the present invention, it is preferred that the record region is radially divided into p zones, and when the inner-most diameter side is referred to as the first zone, the outer-most diameter side is referred to as the p-th zone, and in the q-th zone (wherein q is an integer of 1≦q≦p), the angular velocity is represented by $\omega_q$, the average linear velocity is represented by $<V_q>_{ave}$, the maximum linear velocity is represented by $<V_q>_{max}$, the minimum linear velocity is represented by $<V_q>_{min}$, the reference clock period is represented by $T_q$, and the time length of the shortest mark is represented by $n_{min}T_q$.

$<V_p>_{ave}/<V_1>_{ave}$ is preferably within a range of from 1.2 to 3, and $<V_q>_{max}/<V_q>_{min}$ is at most 1.5. Within the same zone, the same clock period and the same pulse- dividing method are employed, but the linear velocity range which can be covered by the same pulse-dividing method, is usually up to about 1.5 times.

And, within the same zone, $\omega_q$, $T_q$, $\alpha_i$, $\beta_i$, Pe, Pb and Pw are constant, the physical length $n_{min}T_q<V_q>_{ave}$ of the shortest mark is at most 0.5 μm, $T_q<V_q>_{ave}$ is substantially constant with respect to all q of $1 \leq q \leq p$, and m=n−1 or m=n−2,
$\alpha_1$=0.3 to 1.5,
$\alpha_1 \geq \alpha_i$=0.2 to 0.8 ($2 \leq i \leq m$),
$\alpha_1 + \beta_{i-1}$=1.0 ($3 \leq i \leq m$),
$0 \leq Pb \leq 1.5$ (mW),
$0.4 \leq Pe/Pw \leq 0.6$.

Here, it is preferred that when m=n−1, $\alpha_1$=0.3 to 1.5, and $\alpha_i$=0.2 to 0.5, and when m=n−2, $\alpha_1$=0.5 to 1.5, and $\alpha_i$=0.4 to 0.8.

It is important that the pulse-diving method is changed in accordance with the following rule. For every zone, Pb, Pw, the Pe/Pw ratio, $\alpha_i$, $\beta_1$ and $\beta_m$ are variable, and recording is carried out by simply decreasing at least $\alpha_i$ ($\alpha_i$ is at least one of $2 \leq i \leq m$) from the outer zone towards the inner zone.

It is preferred that the change in $\alpha_i$ for every zone is by every 0.1T or by every 0.01T.

Here, by adding a high frequency base clock generating circuit with a frequency of about 1/100 relative to the reference clock period $T_p$ at the outer- most diameter zone, $T_q$ and the divided pulse length in every zone can be generated as multiples of this base clock.

With DVD, the reference clock frequency at 1-time velocity is about 26 MHz, and the base clock frequency may be about 2.6 GHz at the maximum, usually about 260 MHz i.e. one figure less than the maximum frequency.

Further, when $Pw_{max}$ is the maximum value and $Pw_{min}$ is the minimum value of Pw in the record region, it is possible to set $Pw_{max}/Pw_{min} \leq 1.2$, Pe=Pw=0.4 to 0.6 and $0 \leq Pb \leq 1.5$ (mW). The setting ranges of the three types of powers can thereby be defined, whereby the power- generating circuit can be simplified.

In the present invention, it is further possible to accommodate every linear velocity simply by changing only the pulse-dividing method while maintaining Pw, the Pe/Pw ratio and Pb to be constant. Further, $\beta_m$ may be made constant irrespective of the zone, and only $\alpha_1$ and $\alpha_m$ may be made zone-dependent parameters. This is extremely useful to simplify the recording pulse control circuit of the drive.

In the present invention, recording may be carried out by setting an imaginary zone on the recording medium from the radial positional information of the optical head during recording, or a zone structure may be physically provided on the disk in accordance with an address information or a zone information preliminarily recorded on the disk. Whether the zone is imaginary or physical, a recording pulse-dividing method suitable for the linear velocity determined by the zone, may be selected.

Now, another example in which the optical recording method of the present invention is applied to a ZCAV system, will be described.

The record region is radially divided into p zones, and the inner-most diameter side is referred to as the first zone, the outer-most diameter side is referred to as the p-th zone, and in the q-th zone (wherein q is an integer of $1 \leq q \leq p$), the angular velocity is represented by $\omega_q$, the average linear velocity is represented by $<V_q>_{ave}$, the maximum linear velocity is represented by $<V_q>_{max}$, the minimum linear velocity is represented by $<V_q>_{min}$, the reference clock period is represented by $T_q$, and the time length of the shortest mark is represented by $n_{min}T_q$.

In the ZCAV system, it is necessary to make the reference clock $T_q$ of recording data to be smaller towards the outermost peripheral zone to make the recording linear density to be substantially constant.

Namely, $T_q$ is changed depending upon the zone so that $T_q<V_q>_{ave}$ will be substantially constant with respect to all q of $1 \leq q \leq p$. Here, substantially constant includes an error of about ±1%.

Further, to bring the maximum linear velocity and the minimum linear velocity in the same zone within predetermined ranges, the width of the zone is determined to satisfy:

$$(<V_q>_{max} - <V_q>_{min})/(<V_q>_{max} + <V_q>_{min}) < 10\% \quad (2)$$

Namely, $(<V_q>_{max} - <V_q>_{min})$ is adjusted to be less than 10% of $(<V_q>_{max} + <V_q>_{min})$, and the width of the q-th zone may be up to a radial position less than ±10% of the average radius $<r_q>_{ave}$. More preferably, $(<V_q>_{max} - <V_q>_{min})$ is less than 5% of $(<V_q>_{max} + <V_q>_{min})$.

With respect to the widths of zones, the record region may be equally divided in radial direction, but so long as the above conditions are satisfied, the division may not be equal division. For example, a recording region with a width of from 30 to 40 mm may usually be divided into at least 10 zones, although the division may vary depending upon the width of the recording region.

According to the study by the present inventors, even with the shortest mark length of about 0.4 μm, the value of jitter is a practical level so long as the formula (2) is satisfied.

The foregoing two conditions are conditions to make the recording linear density to be constant and accordingly to make the physical length of marks for the channel bit length to be constant. Here, the channel bit length is a length per one channel bit along the track.

To secure the retrieving interchangeability with DVD, it is preferred to limit the variation of the channel bit length vT to be less than about ±1%, when the reference retrieving speed V is about 3.5 m/s and the reference clock period T is about 38.2 nsec.

To satisfy this condition with a ZCAV medium, the following formula (3) must be satisfied:

$$(<V_q>_{max} - <V_q>_{min})/(<V_q>_{max} + <V_q>_{min}) < 1\% \quad (3)$$

Namely, $(<V_q>_{max} - <V_q>_{min})$ is adjusted to be less than 1% of $(<V_{q-max}> + <V_q>_{min})$, and the width of the q-th zone may be up to a radial position less than ±1% of the average radius $<r_q>_{ave}$. For this purpose, the recording region is divided into at least 200 zones. And, $$T_q<V_q>_{ave} = vT \quad (4)$$

wherein $T_q<V_q>_{ave}$ is made to be substantially constant with respect to all q of $1 \leq q \leq p$. Here, substantially constant includes an error of about ±1%.

Thus, even with a ZCAV system, equal density recording irrespective of the radius, can be approximately attainable, whereby retrieving by a CLV system will be possible, and interchangeability with a DVD player of a CLV system will be increased.

The widths of zones may be made narrower, as the case requires.

Now, an optical recording method will be explained whereby a recording density equal to DVD can be obtained under the conditions as described above.

Namely, the present invention provides an optical recording method wherein recording or retrieving of data is carried out by focusing a laser beam having a wavelength of from 600 to 680 nm on the recording layer through the substrate by an object lens having a numerical aperture NA of from 0.55 to 0.65, and wherein:

the inner-most diameter of the record region is within a range of the radius being from 20 to 25 mm, the radius of the outer-most diameter is within a range of from 55 to 60 mm, and the average linear velocity in the inner-most diameter zone is from 3 to 4 m/s, when in the q-th zone (wherein q is an integer of $1 \leq q \leq p$), the angular velocity is represented by $\omega_q$, the average linear velocity is represented by $<V_q>_{ave}$, the maximum linear velocity is represented by $<V_q>_{max}$, the minimum linear velocity is represented by $<V_q>_{min}$, the reference clock period is represented by $T_q$, and the time length of the shortest mark is represented by $n_{min}T_q$, n is an integer of from 1 to 14, m=n−1, $\omega_q$, Pb and Pe/Pw are constant irrespective of the zone, $Tq<V_q>_{ave}$ is substantially constant with respect to all q of $1 \leq q \leq p$, and $(<V_q>_{max}-<V_q>_{min})/(<V_q>_{max}+<V_q>_{min})<10\%$, (i) in the first zone, $\alpha^1_{\ 1}$=0.3 to 0.8, $\alpha^1_{\ 1} \leq \alpha^1_{\ i}$=0.2 to 0.4 and is constant irrespective of i ($2 \leq i \leq m$), $\alpha^1_{\ 2}+\beta^1_{\ 1} \leq 1.0$, $\alpha^1_{\ i}+\beta^1_{\ i-1}=1.0$ ($3 \leq i \leq m$), (ii) in the p-th zone, $\alpha^p_{\ 1}$=0.3 to 0.8, $\alpha^p_{\ 1} \geq \alpha^p_{\ i}$=0.3 to 0.5 and is constant irrespective of i ($2 \leq i \leq m$), $\alpha^p_{\ i}+\beta^p_{\ i-1}=1.0$ ($2 \leq i \leq m$), and (iii) in other zones, $\alpha^1_{\ i} \leq \alpha^q_{\ i} \leq \alpha^p_{\ i}$ ($2 \leq i \leq m$), and $\alpha^q_{\ 1}$ is a value between $\alpha^1_{\ 1}$ and $\alpha^p_{\ 1}$.

When the inner-most diameter of the record region is within a range of the radius being from 20 to 25 mm and the radius of the outer-most diameter is within a range of from 55 to 60 mm, the radial width of the record region will be from about 30 to 40 mm. And, the disk is rotated at an equal angular velocity so that $<V_1>_{ave}$=3 to 4 m/s in the inner-most peripheral first zone.

With respect to the first zone and the p-th zone, recording is carried out under the above conditions, and with respect to other zones (the q-th zone of $2<q \leq p-1$), $\alpha^1_{\ i} \leq \alpha^q_{\ i} \leq \alpha^p_{\ i}$ ($2 \leq i \leq m$), and $\alpha^q_{\ 1}$ is a value between $\alpha^1_{\ 1}$ and $\alpha^p_{\ 1}$. Here, the value of a q is preferably set by every 0.1T or by every 0.01T.

Preferably, $\alpha^1_{\ 1} \geq \alpha^q_{\ 1} \geq \alpha^p_{\ 1}$ (provided $\alpha^1_{\ 1}>\alpha p_1$).

Further, Pb, Pe/Pw, $\beta_1$ and $\beta_m$ are constant irrespective of the zone, and it is possible to obtain good overwriting characteristics within a wide linear velocity range completely covering a linear velocity of from 3 to 8 m/s, by changing only $\alpha_1$ and $\alpha_i$ depending upon the zone.

Preferably, numerical values of these Pe/Pw, Pb, Pw, P, ($\alpha_1$, $\alpha^P_1$), and ($\alpha^1_c$, $\alpha^P_c$) are preliminarily recorded on the substrate by prepits or groove deformation, whereby it is possible to select the best pulse-dividing method and the best power for driving, for every recording medium or for every zone. Such numerical values may usually be recorded at positions adjacent to the inner-most peripheral edge or the outer-most peripheral edge of the record region. If bias power Pb is made to be the same as retrieving power Pr, bias power Pb may not necessarily be recorded in some cases. The groove deformation may specifically be, for example, groove wobbling (wobbles).

Otherwise, to an optical information recording medium having an address information preliminarily recorded on the substrate by prepits or groove deformation, an information relating to suitable $\alpha_1$ and $\alpha_i$ may be included in the address together with the address information.

It is thereby possible to read out the information relating to the pulse-dividing method together with the address information at the time of access and to change the pulse-dividing method, whereby it is possible to select a pulse-dividing method suitable for the recording medium or for the particular zone to which the address belongs, without necessity for any special correction.

The system of carrying out recording over the entire record region of a disk while changing the recording pulse-dividing system for every zone, as described above, is applicable also to a ZCLV system (Zoned CLV). Now, a specific example will be described.

The record region is divided into a plurality of zones in the radial direction, and in each zone, recording is carried out at a constant linear velocity, the ratio of the recording linear velocity $V_{out}$ in the outer-most diameter zone to the recording linear velocity $V_{in}$ in the inner-most diameter zone, i.e. $V_{out}/V_{in}$, is from 1.2 to 2, $\alpha_i$=0.3 to 0.6 ($2 \leq i \leq m$), and $\beta_m$=0 to 1.5, and m, $\alpha_i+\beta_{i-1}$ ($3 \leq i \leq m$), $\alpha_1 T$, Pe/Pw and Pb are constant irrespective of the linear velocity, and $\alpha_i$ ($2 \leq i \leq m$) and/or $\beta_m$ is changed depending upon the linear velocity.

The ZCLV system is the same as the ZCAV system so far as the division of the recording region radially into a plurality of zones is concerned, but within the same zone, recording is carried out by a CLV mode i.e. by rotating the disk at a constant linear velocity.

Therefore, when the recording method of the present invention is applied to this ZCLV system, the difference between $V_{in}$ and $V_{out}$ is made small, e.g. $V_{out}/V_{in}$ being from 1.2 to 2, whereby the load of the linear velocity dependency to the medium is reduced.

The medium of the present invention is recordable within a wide linear velocity range of from 3 to 8 m/s simply by slightly modifying the recording pulse-dividing method. Accordingly, the ZCLV system can be used, wherein the record region is divided into a relatively small number of zones.

At that time, in order to make the recording density to be equal irrespective of the zone, the linear velocity $V_q$ in each zone, and the reference clock period $T_q$ of record data in each zone are adjusted so that $T_q<V_q>_{ave}$ will be substantially constant irrespective q.

And, in each zone, the optimized recording pulse-dividing method is employed. Namely, $\alpha_i$=0.3 to 0.5 ($2 \leq i \leq m$), and $\beta_m$=0 to 1.5, and recording is carried out by changing $\alpha_1$ and/or $\beta_m$ depending upon the linear velocity while maintaining m, $\alpha_i+\beta_{i-1}$ ($3 \leq i \leq m$), $\alpha_1 T$, Pe/Pw and Pb to be constant irrespective of the linear velocity.

In the above described CLV system, ZCAV system or ZCLV system, the example for making the recording pulse-dividing method variable depending upon the linear velocity during overwriting is intended to simplify the pulse-generating circuit mainly by making $\beta_m$ to be constant irrespective of the linear velocity. Inversely, it is also possible to simplify the pulse-generating circuit by positively changing $\beta_m$.

Namely, the present invention provides an optical information recording method which comprises recording information by a plurality of record mark lengths, wherein the shortest mark length is at most 0.5 μm, and a crystal state is an unrecorded or erased state and an amorphous state is a recorded state, and wherein a recording laser beam having an erasing power Pe capable of crystallizing amorphous phase is applied between record marks, and when the time length of one record mark is represented by nT (wherein T is the reference clock period, and n is an integer of at least 2), the time length nT of the record mark is divided in the order of:

$\eta_1 T, \alpha_1 T, \beta_1 T, \alpha_2 T, \beta_2 T, \ldots,$
$\alpha_i T, \beta_i T, \ldots, \alpha_m T, \beta_m T, \eta_2 T$ wherein m is a pulse dividing number, and m=n–k, where k is an integer of $0 \leq k \leq 2$, $\Sigma_i(\alpha_i + \beta_i) + \eta_1 + \eta_2 = n$, $\eta_1$ is a real number of $\eta_1 \geq 0$, $\eta_2$ is a real number of $\eta_2 \geq 0$, provided $0 \leq \eta_1 + \eta_n \leq 2.0$, $\alpha_i (1 \leq i \leq m)$ is a real number of $\alpha_i > 0$, $\beta_i (1 \leq i \leq m)$ is a real number of $\beta_i > 0$, $\alpha_1 = 0.1$ to 1.5, $\beta_1 = 0.5$ to 1.0, $\beta_m = 0$ to 1.5, and when i is 2>i>m, $\alpha_i$ is within a range of from 0.1 to 0.8 and is constant irrespective of i, and when i is $3 \leq i \leq m$, $\alpha_i + \beta_{i-1}$ is within a range of from 0.5 to 1.5 and is constant irrespective of i, a recording laser beam having a writing power Pw of Pw>Pe, sufficient to melt the recording layer, is applied within the time of $\alpha_i T$ ($1 \leq i \leq m$), and a recording laser beam having a bias power Pb of 0<Pb≤0.2Pe is applied within the time of $\beta_i T$ ($1 \leq i \leq m$) (provided that within $\beta_m T$, the bias power may be 0<Pb<Pe), and while maintaining m, $\alpha_i + \beta_{i-1}$ ($3 \leq i \leq m$), $\alpha_1 T$ and $\alpha_i T$ ($2 \leq i \leq m$) to be constant irrespective of the linear velocity, $\beta_m$ is changed so that it simply increases as the linear velocity is small.

Firstly, in order to maintain the recording density to be constant, the above described ZCAV system or the ZCLV system is applied, so that the reference clock period T changes in inverse proportion to the linear velocity.

And when i is at least $3 \leq i \leq m$, preferably $2 \leq i \leq m$, $\alpha_i + \beta_{i-2}$ is made to be constant irrespective of the linear velocity and i, whereby the pulse-generating circuit can be simplified, and it is possible to increase the cooling rate of the recording layer simply by reducing $\alpha_i$ as the linear velocity is low. Usually, $\alpha_i + \beta_{i-1} = 1.0$.

In order to realize such a pulse-dividing method, referring to the view illustrating the timing for the gate generation in FIG. 11, one fixed length pulse with a width of $\alpha_1 T$ (Gate 1) and a plurality of subsequent fixed length pulses with a width of $\alpha_i T$ ($\alpha_c T$) (Gate 2) may be generated, while only Gate 3 determining the final off pulse length $\beta_m T$ may be changed depending upon the linear velocity.

Here, the following conditions are preferred:
$Pw_{max}/Pw_{min} \leq 1.2$,
Pe/Pw=0.4 to 0.6,
$0 \leq Pb \leq 1.5$ (mW)

where $Pw_{max}$ is the maximum recording power and $Pw_{min}$ is the minimum recording power, at each recording linear velocity.

Further, as described above, at least in a case where the linear velocity during overwriting is at most 5 m/s, in order to prevent a thermal damage during repetitive overwriting, it is preferred that $\Sigma \alpha_i < 0.4$ n when m=n–1, and $\Sigma \alpha_i < 0.5n$ when m=n–2.

Further, a recording method may be employed wherein when $\beta_m$ at the maximum recording linear velocity is represented by $\beta^H_m$ and $\beta_m$ at the minimum recording linear velocity is represented by $\beta^L_m$, $\beta_m$ at other recording linear velocities is a value between $\beta^L_m$ and $\beta^H_m$, and Pb and Pe/Pw are constant irrespective of the recording linear velocity.

In this case, it is preferred that numerical values of at least Pe/Pw ratio, Pb, Pw, $\alpha_1 T$, $\alpha_i T$, ($\beta^L_m$, $\beta^H_m$) are preliminarily recorded on the substrate of the medium by prepits or groove deformation, whereby an optimum pulse-dividing method can automatically be selected.

Furthermore, an optical recording method is also possible wherein $\beta_m$ is constant irrespective of the recording linear velocity, while maintaining adequately practical signal quality, if the maximum linear velocity is up to twice the minimum linear velocity.

For a read-only DVD drive of a CLV system, a system is available wherein rotation control is carried out by generating a data clock and a rotation synchronizing signal based on the reference clock period obtained by retrieving marks.

As described above, a medium on which marks are recorded by a ZCAV system so that the shortest mark length or the channel bit length is substantially constant irrespective of the recording radius, can be retrieved as it is by a read-only DVD drive of this system.

Namely, rotational synchronizing control can be made by a PLL (Phase Lock Loop) system so that the reference clock period $T_q'$ of data formed from the recorded marks will substantially agree with the reference data clock Tr of the drive, whereby even if slight sway of the linear velocity or the channel bit length is present, decoding can be made by the retrieving circuit as it is.

Especially, for EFM plus modulated data recorded so that the shortest mark length is substantially constant at 0.4 μm in all zones, CLV rotation synchronization by PLL control can be accomplished based on the rotation synchronizing signal formed from the recorded marks. At the same time, the reference data clock Tr having a frequency within a range of from 25 to 27 MHz will be generated, and based on this clock, retrieving can be made as a CLV recording medium without need to pay attention to the transfer among zones.

Of course, if rotation synchronization can be accomplished so that the standard data clock becomes Tr/2, retrieving at 2-times velocity will be possible. Such rotation synchronizing signal-generating circuit, etc., by PLL system may be those commonly used in conventional DVD players or DVD-ROM drives.

The medium of the present invention is able to secure retrieving interchangeability with DVD with respect to all signal characteristics except for the reflectance. For this purpose, in-groove recording is preferred, and the push-pull signal of the groove should preferably be small. If the push-pull signal of the groove is large, the tracking servo signal in the DPD method to be used for retrieving, tends to be small. Accordingly, the groove depth is required to be shallower than λ/(8 n) at which the push-pull signal becomes maximum. Here, λ is the wavelength of the retrieving laser beam in air, and n is the refractive index of the substrate. However, during recording, it is common to use a push-pull signal for tracking servo. Accordingly, it is not desirable that the signal is too small.

Further, with respect to the retrieving signal characteristics, the modulation Mod is preferably at least 0.5 in order to obtain a high CN ratio. Here, Mod is (amplitude of envelope of DC retrieving signal)/(top value of envelope of DC retrieving signal).

A preferred groove depth is d=λ/(20 n) to λ/(10 n).

If the depth is shallower than λ/(20 n), the push-pull signal during recording tends to be too small to be detected by a tracking servo. On the other hand, if it is deeper than λ/(10 n), tracking servo during retrieving can not be stabilized. For example, the groove depth is preferably within a range of from 25 to 40 nm, when the recording or retrieving wavelength is at a level of from 630 to 670 nm, and the numerical aperture NA of the object lens is from 0.6 to 0.65.

Further, in order to secure a capacity equivalent to DVD, the groove pitch is adjusted to be from 0.6 to 0.8 μm. Further, when the groove pitch is adjusted to be 0.74 μm, it is easy to secure interchangeability with DVD.

The groove width is preferably from 0.25 to 0.5 μm. If it is narrower than 0.25 μm, the push-pull signal tends to be too small. If it is wider than 0.5 μm, the width between grooves becomes narrow, whereby a resin tends to hardly penetrate during the injection molding of the substrate, and accurate transfer of the groove shape to the substrate tends to be difficult.

With the medium of the present invention, the reflectance decreases after recording. With such a recording medium, it is preferred to make the groove width narrower than the land width in order to make the reflectance in the groove to be low i.e. to attain RGa<RLa, where RGa is the average reflectance in the groove after recording, and RLa is the average reflectance of the land after recording.

For example, in order to secure interchangeability with DVD, if the groove pitch is adjusted to 0.74 μm, the groove width is preferably narrower than 0.37 μm which is one half of the groove pitch.

On the other hand, in a case where the average reflectance RGb in the groove before recording may be larger than the average reflectance RLb on the land before recording i.e. RGb>RLb, so long as the above RGa<RLa is satisfied, it may sometimes be possible to reduce jitter, to increase the modulation or to widen the width of amorphous marks to be recorded in the groove, by adjusting the groove width to be from 0.4 to 0.5 μm.

To such a groove, a periodical deformation may be provided to access an unrecorded specific track or to obtain a synchronizing signal for rotating the substrate at a constant linear velocity. Usually, a wobble may be provided, which wobbles in the transverse direction of the track. Namely, if the groove is wobbling at a certain constant frequency $f_{wo}$, by detecting the frequency, it is possible to take out the signal for rotation synchronization by the PLL system.

The amplitude of the groove wobbling is preferably from 40 to 80 nm (peak-to-peak value). If it is less than 40 nm, the amplitude is too small, and the SN ratio tends to be poor, and if it exceeds 80 nm, the upper and lower edges of the envelope of the recording signal shown in FIG. 6 contain many low frequency components attributable to the wobble signal, whereby the distortion of the retrieving signal tends to be large.

When the frequency of wobbling is close to the zone of the record data, its amplitude is preferably at most 80 nm.

Further, if wobbling is formed which is frequency modulated or phase modulated in accordance with a certain address information using the wobbling frequency $f_{wo}$ as a carrier wave, it is possible to obtain the address information by retrieving it.

If groove wobbling is formed with the wobbling frequency $f_{wo}$ being constant, it is possible to generate a reference clock signal for data from a reference period $T_w$ of the groove wobbling signal formed from $f_{wo}$ or from its multiple or divisor.

Usually, the wobbling period is set to have a sufficiently low frequency or high frequency than the frequency component of data to prevent mixing with the data signal component and to be able to readily separate by a zone filter or the like. Particularly, it has already been practiced for recordable CD that $f_{wo}$ is set to be lower by one of two figures than the reference clock period of data.

With a medium to be used for a CLV system, after accomplishing PLL rotation synchronization, a data reference clock is formed by multiplying $f_{wo}$ by about one to two figures. A data reference clock formed by such a method is usually likely to accompany fluctuation of the same order as the data reference clock (frequency), by the influence of the fluctuation of rotation synchronization (about 0.1 to 1% of $f_{wo}$). This tends to deteriorate the window margin for detecting data.

Therefore, it is also effective to insert a prepit or a special wobble having a large amplitude for every predetermined data length to correct the fluctuation of the data reference clock, separately from the groove wobbling signal. On the other hand, if $f_{wo}$ is at a level of the data reference clock frequency (1/T) or within a range of from 1/100 to 100 times thereof, even if the data reference clock is generated as it is on the basis of the wobbling signal taken out after rotation synchronization, an adequate degree of precision can be secured. Namely, $$100/T \geq f_{wo} \geq 1/(100T) \qquad (5)$$

Further, in the ZCAV method as described above, the reference clock period $T_q$ is preferably generated as a multiple or a divisor of the reference period $Tw_q$ of the groove wobbling in each zone. Namely, by forming a groove wobbling at a constant angular velocity while changing the frequency $f_{wo}$ for every zone, it is possible to generate a reference clock formed as $f_{wo}$ or its multiple frequency, as the reference clock $T_q$ for data.

At that time, if the groove wobbling is made to be a relatively high frequency wave to satisfy the formula (5), formation of the data reference clock for every zone will be easy. And, it is possible to change the reference clock $T_q$ for every zone and to generate a variable pulse-dividing method to synchronize with this signal, whereby the positional precision of each divided pulse can be improved, and fluctuation can be reduced, such being desirable.

As an example for division of zones for the ZCAV system, one round of the groove may be taken as one zone. Here, if the groove is wobbling with a constant period irrespective of the zone, and the following relation is approximately satisfied:

$$2\pi TP = a \cdot Tw_o \cdot V_o$$

where TP is the groove pitch, $Tw_o$ is the wobbling period, and a is a natural number, wobbling having a constant period $Tw_o$ will be formed over the entire record region, and for every one round of track, the number of wobbles will increase by a.

And, $Tw_0$ being a multiple of the reference clock period T, i.e. $Tw_0 = mT$ (where m is a natural number), means that a reference clock may be generated from $Tw_0$ simply by dividing it by the multiple, whereby the reference clock-generating circuit can be simplified, such being desirable. In such a case, m may not exactly be a natural number, and a deviation from a natural number to an extent of ±5% may be allowable.

Namely, when TP=0.74 μm if $v_0$=3.5 m/s, T=38.23 nsec, and n=1, m ≈0.34.7. If the wobbling period is approximately taken as $Tw_0$=35 T, the number of wobbles increases by one for every one round.

In such a case, wobble phases of adjacent tracks are always coherent even though wobbles are introduced by a CLV system. Thus, there is a merit that fluctuation in the retrieving amplitude of the wobbling signal due to interference (beat of wobbles) is small.

In the foregoing, some applications of the present invention have been described, and the present invention is effective to improve the recording power dependency and the linear velocity dependency in mark length recording of phase change media in general and is not limited to rewritable DVD.

For example, the medium and the recording method of the present invention are effective also in a case where mark length modulation recording with the shortest mark length being at most 0.3 μm is carried out by means of an optical system having NA at least 0.6 and a blue color laser beam with a wavelength of from 350 to 500 nm. The shortest mark length is preferably at least about 10 nm, taking the stability of mark into consideration.

In such a case, it is necessary to pay an attention to flatten the temperature distribution in the transverse direction of the track, and it is effective to reduce the thickness of the second protective layer to be very thin at a level of from 5 to 15 nm.

When a laser beam having a wavelength of 350 to 400 nm is employed, the thickness of the second protective layer is more preferably made to be at most 10 nm.

Further, the medium of the present invention may be applied to so-called land and groove recording wherein recording is carried out on both the land and the groove. Such a recording system is suitable for high density recording, since it is easy to make the track pitch narrower while maintaining the groove width broad, although there is a difficulty in satisfying equal recording characteristics in both the land and groove. By adjusting both the groove width GW and the land width LW to be from 0.2 to 0.4 μm, it is possible to obtain a constant tracking servo performance while attaining high density. If the ratio of GW/LW is from 0.8 to 1.2, signal qualities of both the land and groove can be maintained to be equivalent. To reduce cross talk, the groove depth d should preferably be from $\lambda/(7n)$ to $\lambda/(5n)$ or from $\lambda/(3.5n)$ to $\lambda/(2.5n)$.

EXAMPLES

Now, the present invention will be described in further detail with reference to Examples. However, it should be understood that the present invention is by no means restricted to such specific Examples.

In the following Examples, the substrate was prepared by injection molding. The substrate was an injection molded polycarbonate resin substrate having a thickness of 0.6 mm, and unless otherwise specified, a groove having a groove pitch of 0.74 μm, a width of 0.34 μm and a depth of 30 nm were spirally formed thereon.

Unless otherwise specified, the groove had a wobble having a frequency of 140 kHz at a linear velocity of 3.5 m/s, and the amplitude of the wobble was about 60 nm (peak-to-peak value).

The shape of the groove was measured by means of a U-groove approximate optical diffraction method. The shape of the groove may be actually measured by a scanning electron microscope or by a scanning probe microscope. In such a case, a groove width at the position corresponding to one half of the groove depth, is employed.

Unless otherwise specified, a four layer structure as shown in FIG. 5(a) was formed on the substrate, and then a protective layer made of an ultraviolet curable resin was formed thereon by spin coating. The laminate thereby obtained was bonded to another substrate of 0.6 mm in thickness having the same layer structure. In the following Examples and Comparative Examples, the first protective layer in FIG. 5(a) will be referred to as the lower protective layer, and the second protective layer will be referred to as the upper protective layer.

The recording layer immediately after the film formation was amorphous, and it was irradiated with light with an initializing power of from 500 to 700 mW by means of a laser beam with a wavelength of from 810 to 830 nm, focused to have a long axis of about 90 μm and a short axis of 1.3 μm and by selecting a proper linear velocity within a range of from 3.0 to 6.0 m/s, to melt and recrystallize the entire surface to an initial (unrecorded) state.

The compositions of the respective layers were confirmed by a combination of e.g. fluorescent X-ray analysis, atomic absorption analysis and X-ray-excited photoelectron spectrometry.

The film density of the recording layer or the protective layer was obtained from the weight change, when it was formed into a film as thick as a few hundreds nm on the substrate. The film thickness obtained from the fluorescent X-ray intensity was used by correcting it with the film thickness measured by a tracer.

The sheet resistivity of the reflective layer was measured by a four probe resistivity meter (Loresta FP, trade name, manufactured by Mitsubishi Petrochemical Co., Ltd. (presently Dia Instruments)).

The resistivity was measured with a reflective layer formed on glass or polycarbonate resin substrate as an insulator, or with a reflective layer constituting the uppermost layer after formation of the four layer structure (before protective coating with an ultraviolet curable resin) as shown in FIG. 5.

The upper protective layer was a dielectric thin film which is an insulator, and therefore even with the four layer structure, there is no influence over the measurement of the sheet resistivity of the reflective layer. Further, measurement was made in the form of a disk substrate having a diameter of 120 mm, which can be regarded substantially as having an infinite area. From the obtained resistance value R, the sheet resistivity ρs and the volume resistivity ρv were calculated by the following formulae:

$$\rho S = F \cdot R \tag{6}$$

$$\rho v = \rho s \cdot t \tag{7}$$

Here, t is the layer thickness, and F is a corrective factor determined by the shape of the thin film region and takes a value of from 4.3 to 4.5. Here, F was taken to be 4.4.

Unless otherwise specified, for the evaluation of recording and retrieving, DDU1000 evaluation machine, manufactured by Pulstec was employed. The wavelength of the optical head was 637 nm, and numerical aperture NA of the object lens was 0.6 or 0.63. The beam diameter was about 0.90 μm and about 0.87 μm, respectively. Here, the beam diameter corresponds to the region where by the Gaussian beam, the energy density becomes at least $1/e^2$ of the peak intensity.

For the recording, the pulse-dividing method shown in FIG. 10 was employed, wherein unless otherwise specified, m=n−1, and $\alpha_i+\beta_{i-1}=1.0$ (2≦i≦m). At every linear velocity, Pb was constant at 1.0 mW which was the same as the retrieving power. Pe/Pw was constant at 0.5, unless otherwise specified. Modulation and jitter were measured by changing Pw while maintaining Pb to be constant between 0.8 and 1.0 mW.

Signals to be recorded were 8–16 modulated (EFM plus modulation) random signals which are commonly used for DVD. Further, unless otherwise specified, measurement was carried out in a state where only one single track was recorded, and there was no influence of cross talk.

Recording was carried out at various linear velocities such as 1-time velocity and 2-times velocity, based on the standard linear velocity of 3.5 m/s for DVD being regarded as 1-time velocity.

Retrieving was always carried out at a linear velocity of 3.5 m/s, and jitter was measured after the retrieving signal after passed through an equalizer, was digitized. Here, the jitter means edge-to clock jitter and is represented by % based on reference clock period T. The characteristics of the equalizer were as prescribed in read-only DVD standard. It is desired to obtain a modulation of at least 50%, preferably at least 60% and jitter of less than 10% (preferably less than 8%) of reference clock period T=38.2 nsec. (26.16 MHz). Further, it is desired that there is little increase of jitter after repetitive overwriting, and less than 13% to T is maintained even after at least 100 times, preferably even after 1,000 times, of repetitive overwriting.

With a view to securing interchangeability with read-only DVD, measurement with a retrieving laser beam with a wavelength of from 650 to 660 nm is important. However, in the present invention, wavelength is not critical as it merely slightly influences over the shape of the focused laser beam. It was confirmed that the same level of jitter as attained by the 637 nm optical system as used in the present invention, can be obtained also with a 660 nm optical system.

Example 1 and Comparative Example 1

To compare, as recording layers, the conventional InAgSbTe four component system and the InGeSbTe system of the present invention, media were prepared as shown in Table 1, wherein the recording layer compositions and the layer structures were substantially strictly unified except that Ag and Ge were replaced.

With the two recording layers, the compositions were substantially equal within a range of measuring errors, except that Ag and Ge were replaced. The thicknesses of the lower protective layers were different, to adjust the reflectance Rtop of the media to be the same. Such correction is necessary since the refractive indices of the recording layers are delicately different. In order to compare by bringing the light absorbing efficiency of the recording layers to be the same and by bringing the influence of thermal damage due to the retrieving laser beam to be the same, this is a necessary correction. Since the recording layer thickness and the upper protective layer thickness are the same, they can be regarded as equal with respect to the heat dissipation effects and the thermal damages.

The substrate was a polycarbonate resin having a thickness of 0.6 mm, and was provided with a groove with a groove pitch of 0.74 $\mu$m, a groove width of 0.34 $\mu$m, a groove depth of 27 nm, a wobble frequency of 140 kHz (linear velocity: 3.5 m/s) and a wobble amplitude of 60 nm (peak-to-peak value), and recording was carried out in the groove.

To the above two types of media, EFM plus modulated recording was carried out at a recording linear speed of 3.5 m/s with T=38.2 nsec, whereby good overwrite recording characteristics were shown. The overwrite recording conditions were selected so that the characteristics of the two would be substantially equal as shown in Table 1 rather than the conditions under which the respective disk characteristics became best.

Namely, in a recording pulse-dividing method as shown in FIG. 10(a), m=n−1, $\alpha_i+\alpha_{i-1}=1.0$ (2≦i≦m), $\alpha_i=\alpha_c$=constant (2≦i≦m), $\alpha_i=0.5$, $\alpha_c=0.3$ and $\beta_m=0.5$, and Pw=13.5 mW, Pe=6.5 mW and Pb=0.8 mW.

Figure 12:
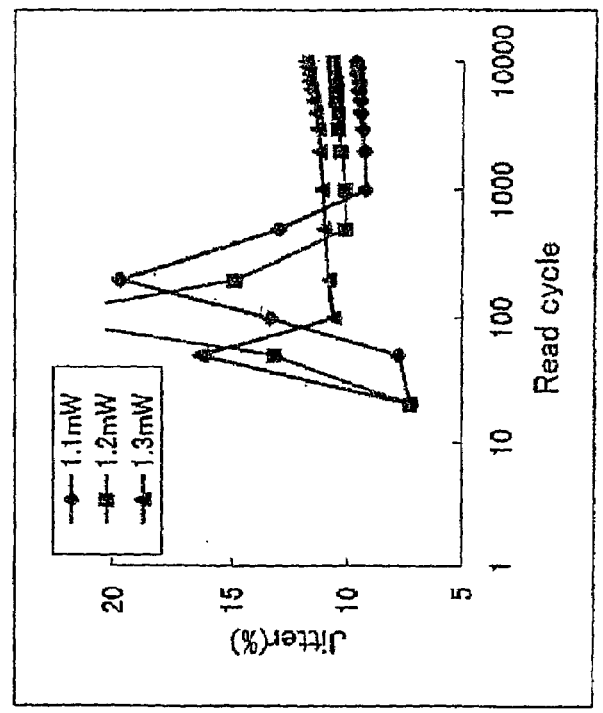
FIG. 12 are graphs showing the retrieving laser power dependency of jitter in Example 1 and Comparative Example 1.
Figure 12:
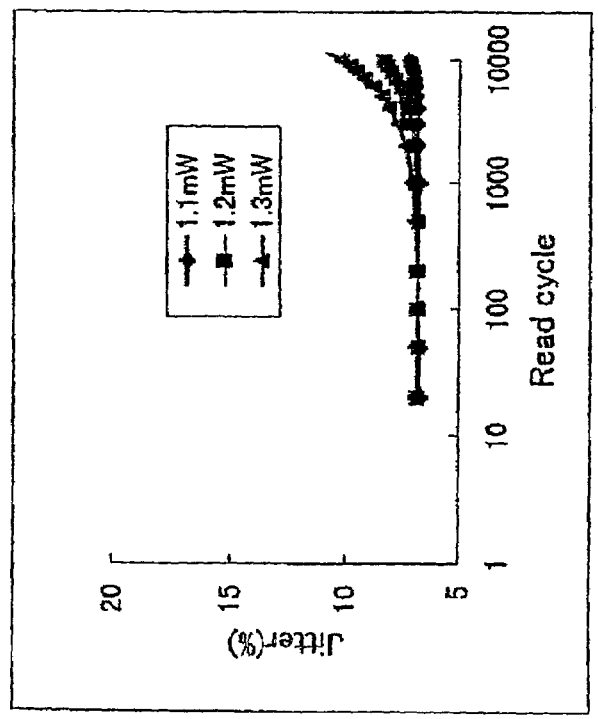

To the signals thus recorded, the retrieving laser beam was repeatedly applied to examine the retrieving laser beam stability. After irradiation with a predetermined retrieving laser power Pr for a predetermined number of times, jitter, etc., were measured while sufficiently lowering the retrieving power to a level of 0.5 mW. The results are shown in FIG. 12.

The medium of Example 1 showed no deterioration by the retrieving laser beam up to $10^6$ times with the retrieving laser power of 1 mW. When the power was increased stepwise by 0.1 mW every time, the deterioration was gradually quickened.

On the other hand, with the medium of Comparative Example 1, jitter increased sharply during the period from the initial 100 times to 1,000 times by retrieving laser beams with retrieving laser powers of at least 1 mW, and then gradually deteriorated. Jitter values are high as a whole, but the initial deterioration of jitter is fatal.

Further, in Comparative Example 1, the modulation decreased by the retrieving laser beam. It decreased by about 10% by irradiation of about 100 times, and then was stabilized. At the initial stage, it is considered that jitter increases sharply, and that the decrease of the modulation proceeds non-uniformly.

The recorded media of Example 1 and Comparative Example 1 were left to stand in an environment of 80° C./80% relative humidity to carry out accelerated tests. After 250 hours, the performance of the disk of Example 1 did not substantially change, while the recorded signals of the disk of Comparative Example 1 disappeared substantially completely. It is evident that with the recording layer material having the composition of Comparative Example 1, amorphous marks are extremely unstable.

As shown above, the disk of Example 1 is excellent not only in the initial overwrite recording performance but also in the stability against retrieving laser beam and the stability with time. This indicates that in the alloy system containing excess Sb in $Sb_{0.7}Te_{0.3}$, the addition of a suitable amount of Ge is very effective.

The medium of Example 1 was subjected to an accelerated test under an environment of 80° C./80% relative humidity. The accelerated test was carried out up to 200 hours. Deterioration of jitter of signals recorded before the acceleration test was only about 1%.

Further, the modulation was 64% at the initial stage, and showed no substantial change at 61% after 2,000 hours of the accelerated test. The reflectance was also not substantially changed. When recording was carried out anew to an unrecorded portion after 2,000 hours, deterioration of jitter was about 3%, but such a level is practically not problematic.

Further, with respect to the medium of Example 1, the recording pulse-dividing method dependency of jitter was studied in detail with respect to a case where m=n−1 and m=n−2.

Figure 13:
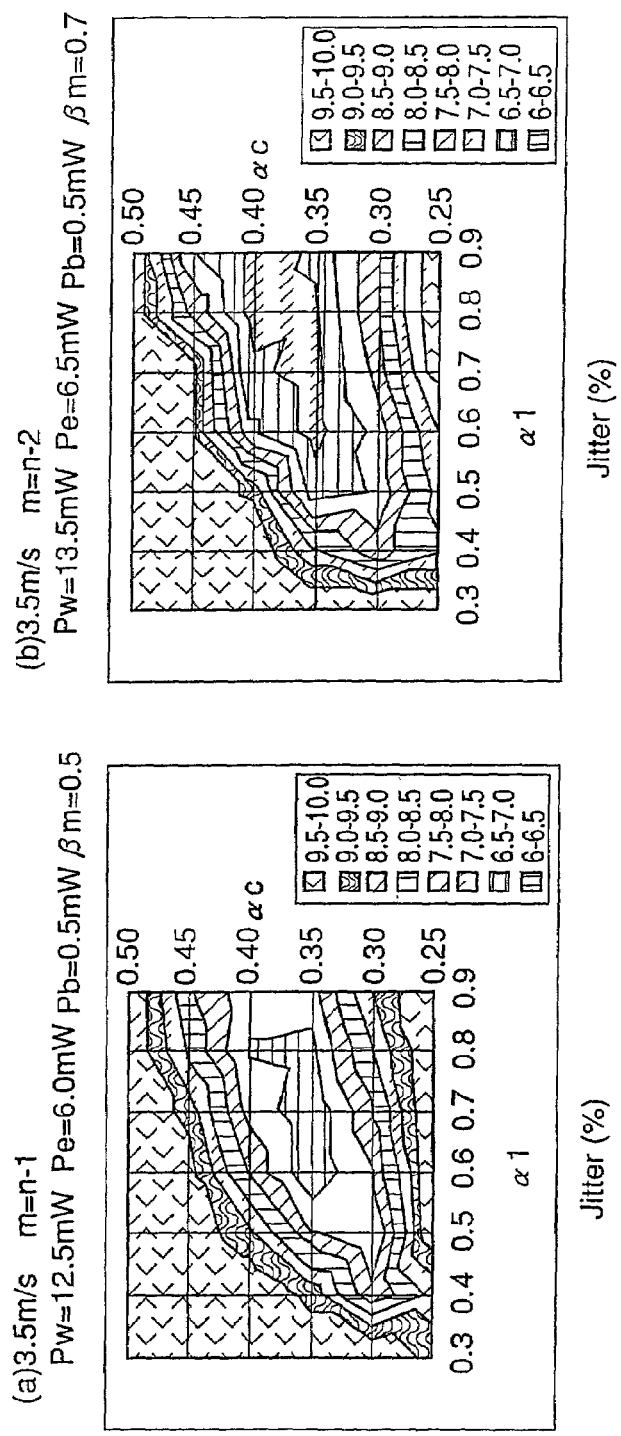
FIG. 13 are graphs showing the recording pulse- dividing method dependency of jitter in Example 1.

FIG. 13 is a contour map showing the $\alpha_i$ and $\alpha_c$ dependency of jitter when recording was carried out at a linear velocity of 3.5 m/s with (a) m=n−1 and (b) m=n−2.

Figure 14:
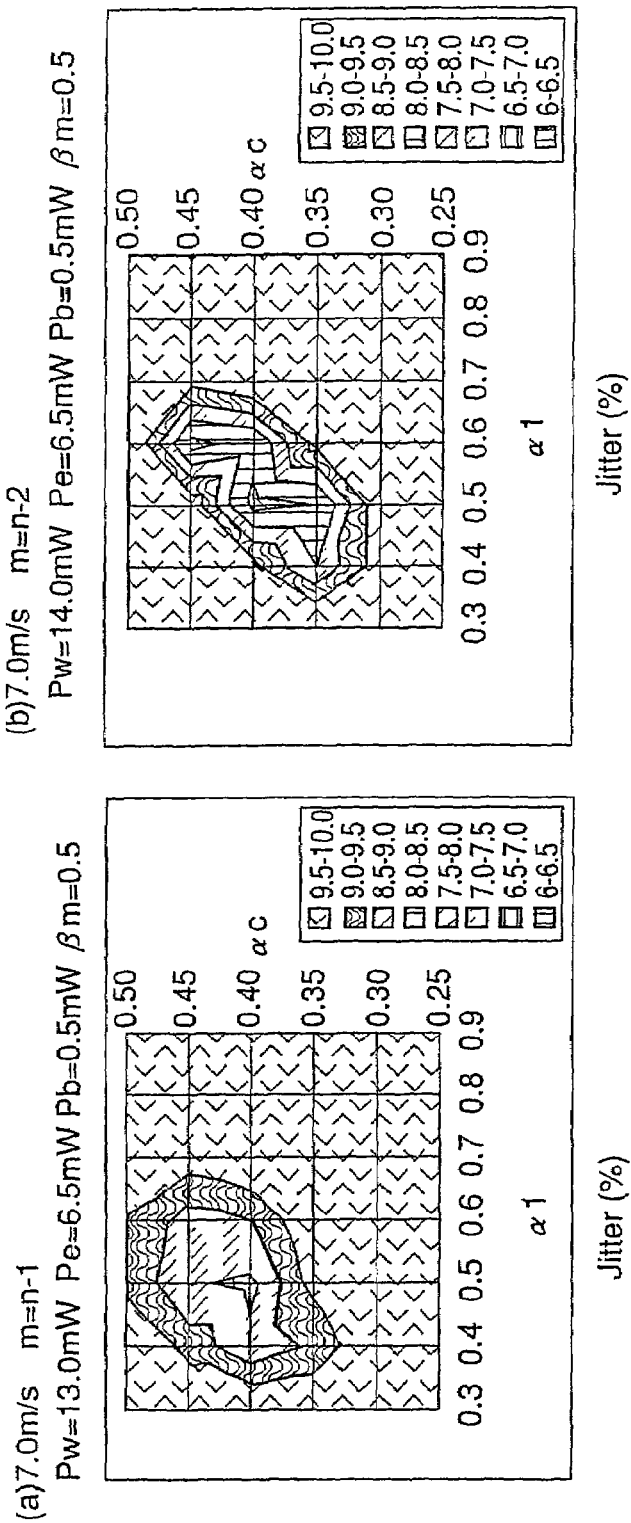
FIG. 14 are graphs showing the recording pulse- dividing method dependency of jitter in Example 1.

Further, FIG. 14 is a contour map showing the $\alpha_1$ and $\alpha_c$ dependency of jitter when recording was carried out at a linear velocity of 7.0 m/s with (a) m=n−1 and (b) m=n−2, respectively. Pw, Pe, Pb and $\beta_m$ used in the measurement of each Figure are shown above each Figure.

It is evident that at a linear velocity of 3.5 m/s, in either case of m=n−1 or m=n−2, the lowest jitter (about at most 7%) is obtained in the vicinity of $\alpha_1$=0.7 to 0.8 and $\alpha_c$=0.35 to 0.40.

At a linear velocity of 7.0 m/s, in either case of m=n−1 or m=n−2, the lowest jitter is obtained in the vicinity of $\alpha_1$=0.5 and $\alpha_c$=0.40. With respect to $\alpha_1$ and $\alpha_c$ in the vicinity of which the lowest jitter is obtainable, in each case, a condition of $\Sigma\alpha_i$<0.5n is satisfied.

In this Example, in either case of a linear speed of 3.5 m/s or 7.0 m/s, a lower jitter value is obtained by setting m=n−2, and as compared with the case of m=n−1, a low jitter value is obtained even with a large $\alpha_1$.

Further, the medium of Example 1 was subjected to evaluation of the linear velocity dependency of jitter by means of an evaluation machine with NA=0.63, by changing the recording pulse-dividing method as shown in Table 2. The reference clock period T was in inverse proportion to the linear velocity. The pulse-dividing method was such that m=n−1, $\alpha_i+\beta_{i-1}$=1.0 ($2\leq i\leq m$), and $\alpha_i=\alpha_c$=constant ($2\leq i\leq m$). Pw, Pb and Pe were constant irrespective of the linear velocity. Here, by the pulse-dividing method of Table 2, $\Sigma\alpha_i$<0.5n is satisfied at all linear velocities.

Good overwrite performance was obtained in a range of from 1-time velocity to 2.5-times velocity of the standard linear velocity of DVD. This medium shows good overwrite performance over the entire recording region even by a CAV system, by dividing the recording region into 3 or 4 zones and by slightly modifying the recording pulse strategy for every zone.

Further, similar results were obtained even when the recording and retrieving were conducted with a wavelength of 660 nm by means of an evaluation machine with NA=0.65.

Example 2

On the substrate, a lower protective layer $(ZnS)_{80}(SiO_2)_{20}$, a recording layer $Ge_{0.05}Sb_{0.73}Te_{0.22}$, an upper protective layer $(ZnS)_{80}(SiO_2)_{20}$ and a reflective layer $Al_{0.995}Ta_{0.005}$, were formed by changing the thicknesses of the respective layers variously. The thicknesses of the respective layers are shown in Table 1. All layers were prepared by a sputtering method without releasing vacuum.

The reflective layer was formed at a film-deposition rate of 1.3 nm/sec at a final vacuum pressure of not higher than $2\times10^{-4}$ Pa under an Ar pressure of 0.54 Pa.

The volume resistivity was 55 nΩ·m, and the sheet resistivity was 0.28 Ω/□.

Impurities such as oxygen, nitrogen, etc., were below the detective level by X-ray-excited photoelectron spectrometry, and the sum of all impurities can be regarded as substantially less than 1 atomic %. The film density of the protective layer $(ZnS)_{80}(SiO_2)_{20}$ was 3.50 g/cm³, which was 94% of the theoretical bulk density of 3.72 g/cm³. Further, the density of the recording layer was 90% of the bulk density. The thermal conductivity of the protective layer estimated from the thermal simulation was $3.5\times10^{-4}$ pJ/(μm·K·nsec).

On the medium thus prepared, recording (overwriting) was carried out at a speed of 1-time velocity and 2-times velocity of DVD, respectively, by using the pulse- dividing method shown in FIG. 10(a), as optimized for every layer structure of each medium. Thereafter, jitter was measured after overwriting once, 10 times and 1,000 times. For the measurement, an optical system with a wavelength of 637 nm and NA=0.63, was employed for both recording and retrieving.

In Table 3, the optimum pulse-dividing method for each layer structure, jitter, Rtop and the modulation were summarized.

In every case, at a speed of 1-time velocity, it was possible to conduct a mark length modulation recording with the shortest mark length of 0.4 μm and obtain a large initial modulation.

When the upper protective layer thickness was adjusted to be 20 nm, each of the initial jitter and the jitter after 1,000 times overwriting was less than 10%. When the upper protective layer thickness was adjusted to be 30 nm, although the initial jitter was good, the jitter a little increased by repetitive overwriting, for example, increased to from 10 to 12% after 1,000 times overwriting. When the upper protective layer thickness was 40 nm, initial jitter was at least 13% and rapidly deteriorated by repetitive overwriting to a level of at least 20%.

Further, as is evident from Example 2(h2), if the recording layer thickness was as thick as 30 nm, initial recording jitter was substantial at a level of at least 13%, and deterioration of jitter by repetitive overwriting was remarkable.

From Example 2(i2), it is evident that even if the lower protective layer thickness is thin at a level of 45 nm, the repetitive overwriting durability is poor.

Further, when the thickness of the reflective layer was 250 nm, jitter was better than the thickness being 200 nm. Namely, it is evident that in such high density mark length recording, it is preferred to adopt "ultra rapid cooling structure".

Then, with respect to the medium of Example 2(g1), the recording power Pw dependency of jitter was evaluated. Recording was carried out at 1-time velocity and 2-times velocity by employing the pulse-dividing method shown in FIG. 10 wherein m=n−1, Pw=14 mW, Pe/Pw=0.5 and $\beta_m$=0.5. Thereafter, the dependency of jitter on $\alpha_1$ and $\alpha_c=\alpha_i$ ($2\leq i\leq m$) was evaluated.

At 2-times velocity, $\alpha_1$=0.5, $\alpha_c$=0.4, $\beta_m=\beta_{n-1}$=0.5, Pw=14 mW, and at 1-time velocity, $\alpha_1$=0.7, $\alpha_c$=0.3, $\beta_m=\beta_{n-1}$=0.5 and Pw=14 mW. At that time, at 2-times velocity, $\Sigma\alpha_1$=0.3n (n=3), 0.33n (n=4), 0.34n (n=5) and at most 0.38n (n=6 to 14). At 1-time velocity, $\Sigma\alpha_1$=0.33n (n=3), 0.33n (n=4), 0.32n (n=5) and less than 0.32n (n=6 to 14).

Figure 15:
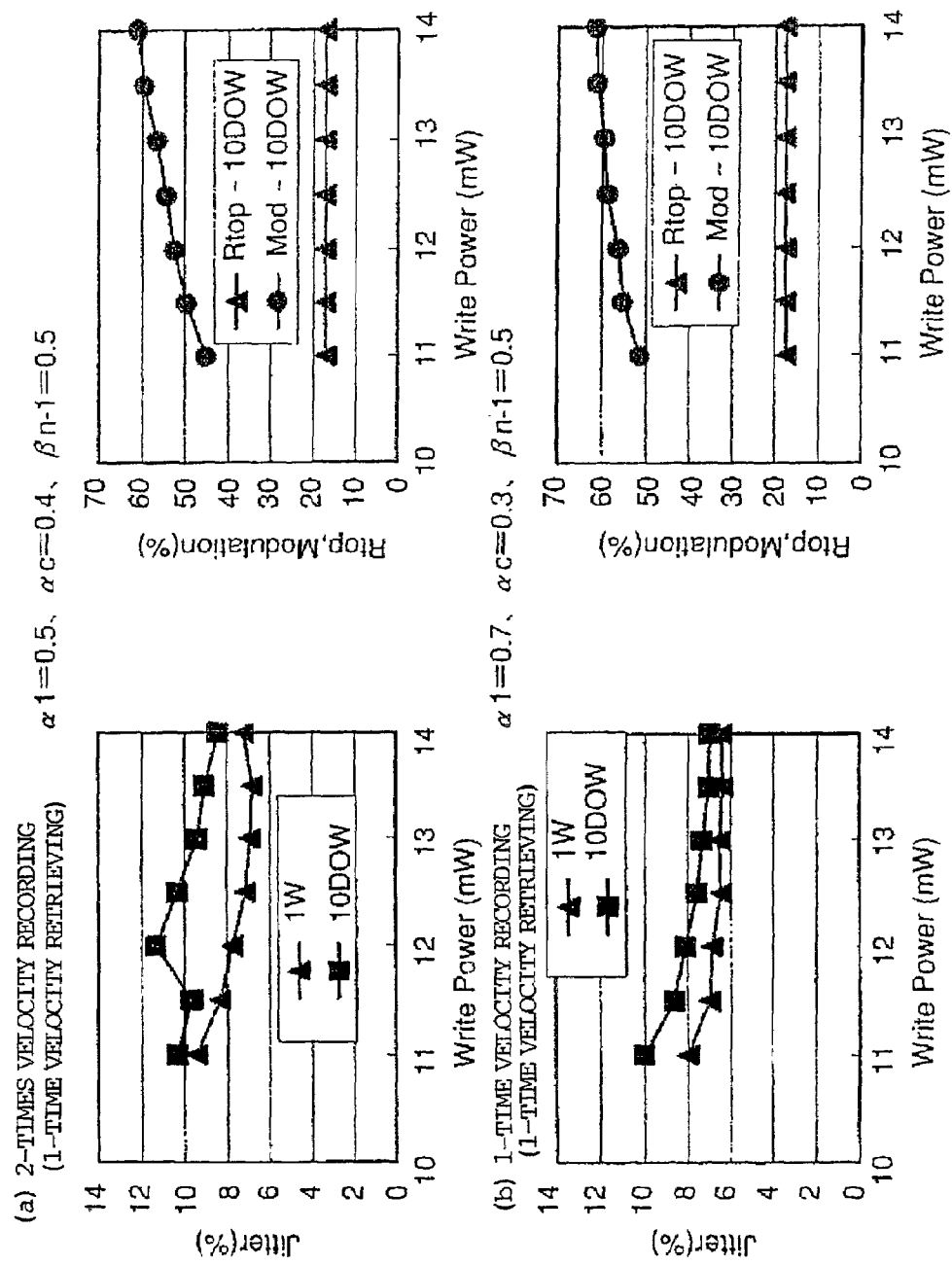
FIG. 15 are graphs showing the recording power dependency of jitter, reflectance and modulation in Example 2.

The results are shown in FIG. 15. The recording power Pw dependency of jitter after the first and 10 times of overwriting, and the recording power Pw dependency of reflectance Rtop and modulation Mod, after 10 times of overwriting, are shown. FIG. 15(a) shows the result of 2-times velocity recording, and FIG. 15(b) shows the result of 1-time velocity recording. Rtop corresponds to Itop in FIG. 6. Further, in the Figure, DOW (Direct Overwriting) indicates overwriting.

Figure 16:
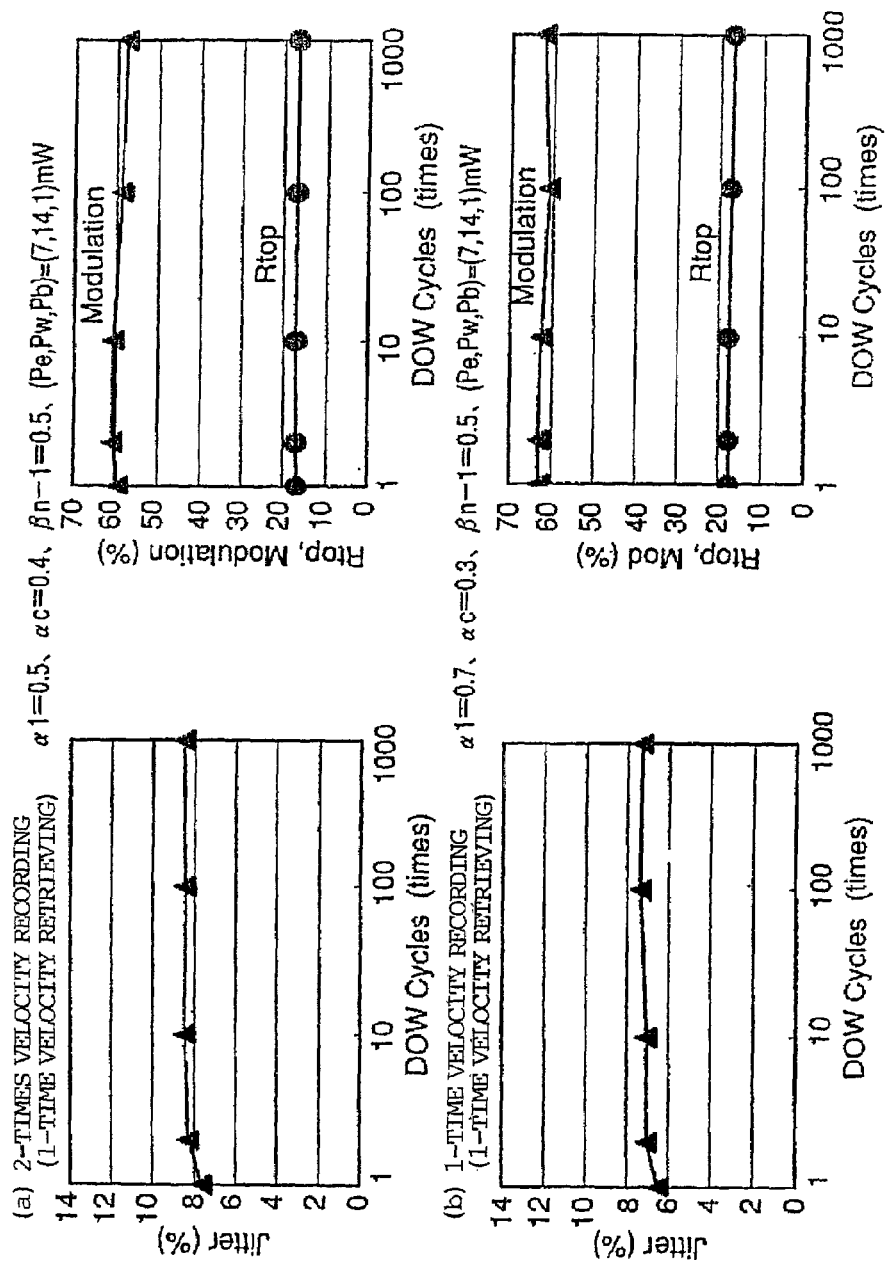
FIG. 16 are graphs showing the repetitive overwriting number of times dependency of jitter, the reflectance and the modulation in Example 2.

Then, the overwriting durability was evaluated. The results are shown in FIG. 16. With respect to jitter, the reflectance and the modulation, the respective values up to after 1,000 times of overwriting are shown. FIG. 16(a) shows the results of 2-times velocity recording, and FIG. 16(b) shows the results of 1-time velocity recording. In either case, jitter gradually increased up to about 10 times, but was stabilized after 10 times, and all of the jitter, the modulation and the reflectance did not substantially deteriorate up to 1,000 times.

Further, this medium was subjected to overwriting by the same pulse-dividing method as the above 2-times velocity (linear velocity of 7 m/s) with Pw=14 mW except that the linear velocity was 9 m/s, and the reference clock period was 14.9 nsec. The erasing ratio was adequate at a level of at least 30 dB. Further, jitter was good at a level of less than 11%.

With the medium of Example 2(g1), good jitter was obtained by changing only $\alpha_1$ and $\alpha_c$ while maintaining Pw=14 mW, Pb=1 mW, Pe/Pw=0.5 and $\beta_m$=0.5 to be constant within the linear velocity range of from 3 to 8 m/s. Namely, good jitter of less than about 9% was obtained by changing the conditions to three steps such that at a linear velocity of from 3 to 5 m/s, $\alpha_1$=0.7 and $\alpha_c$=0.35, at a linear velocity of from 5 to 7 m/s, $\alpha_1$=0.65 and $\alpha_c$=0.4 and at a linear velocity of from 7 to 8 m/s, $\alpha_1$=0.55 and $\alpha_c$=0.45. It is believed that better jitter can be obtained by changing $\alpha_1$ and $\alpha_c$ more finely for every 1 m/s at each linear velocity.

Further, with Pw=11 to 14 mW, the best jitter was obtained at a ratio of Pe/Pw of from 0.4 to 0.5. Further, when Pb exceeds 1.5 mW, jitter abruptly deteriorated. Here, with Pe/Pw=0.5, the Pb dependency was examined, whereby substantially the best jitter was obtained when Pb was less than 1.0 mW. Namely, Pb/Pe must be less than 0.2.

Now, Example 2(g1) wherein the upper protective layer thickness was 20 nm and Example 2(d2) wherein the upper protective layer thickness was 40 nm, will be compared. With respect to both media, the recording mark length dependency was measured as follows at 1-time velocity.

Employing an optical system with NA=0.6, the length of 3T mark as the shortest mark was decreased from 0.5 μm in EFM plus modulation, whereby the mark length dependency of jitter was evaluated. The recording linear velocity was constant at 3.5 m/s, and the pulse-dividing method was constant as described above. By changing the reference clock period, the mark length was changed. However, in the case where the shortest mark length was at least 0.46 μm, from the restriction from the apparatus, CLV control tends to be difficult at a retrieving velocity of 3.5 m/s, and the retrieving velocity was adjusted to be 5 m/s. Further, the shortest mark length of 0.4 μm corresponds to read-only DVD standard.

Figure 17:
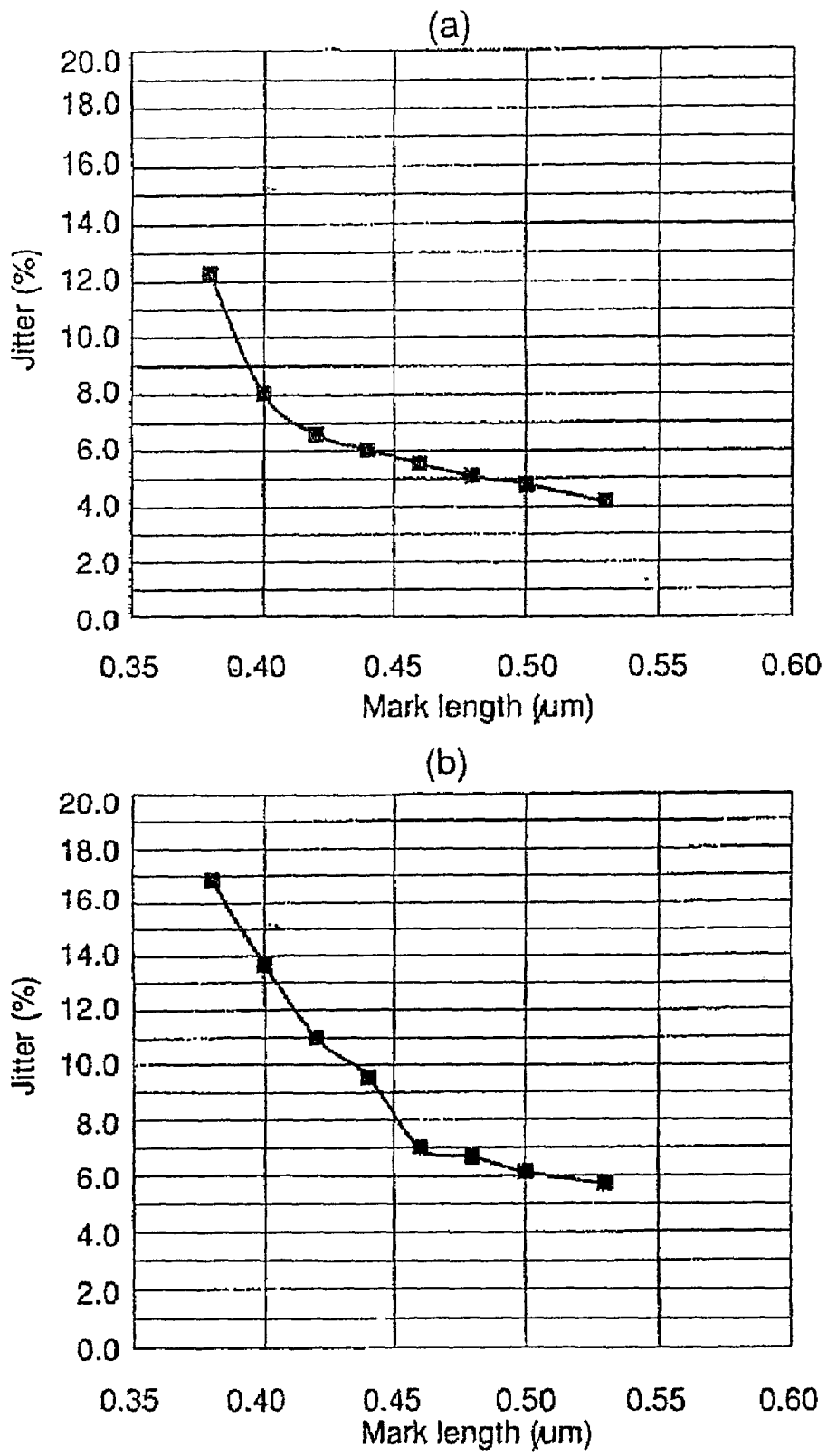
FIG. 17 are graphs showing the mark length dependency of jitter in Example 2(g1) and Example 2(d2).

The results are shown in FIG. 17. FIG. 17(a) represents the medium of Example 2(g1), and FIG. 17(b) represents the medium of Example 2(d2).

It is evident that the medium of Example 2(g1) is useful as the jitter is less than 13% up to the shortest mark length of about 0.38 μm.

Further, when an optical system with NA=0.63 was employed, it was possible to reduce jitter to a level of about 2%. Further, when the equalizer at the time of retrieving was optimized, it was again possible to reduce the jitter to a level of about 2%. In addition, it is believed that if an optical system with NA=0.65 is employed, sufficiently good jitter may be obtained even with 0.35 μm.

With the medium of Example 2(d2), jitter was no problematic level with a mark length of at least 0.45 μm. However, with a mark length of less than 0.45 μm, jitter abruptly increased, and with a mark length of 0.40 μm, jitter became at least 13%, and such was practically useless.

Figure 18:
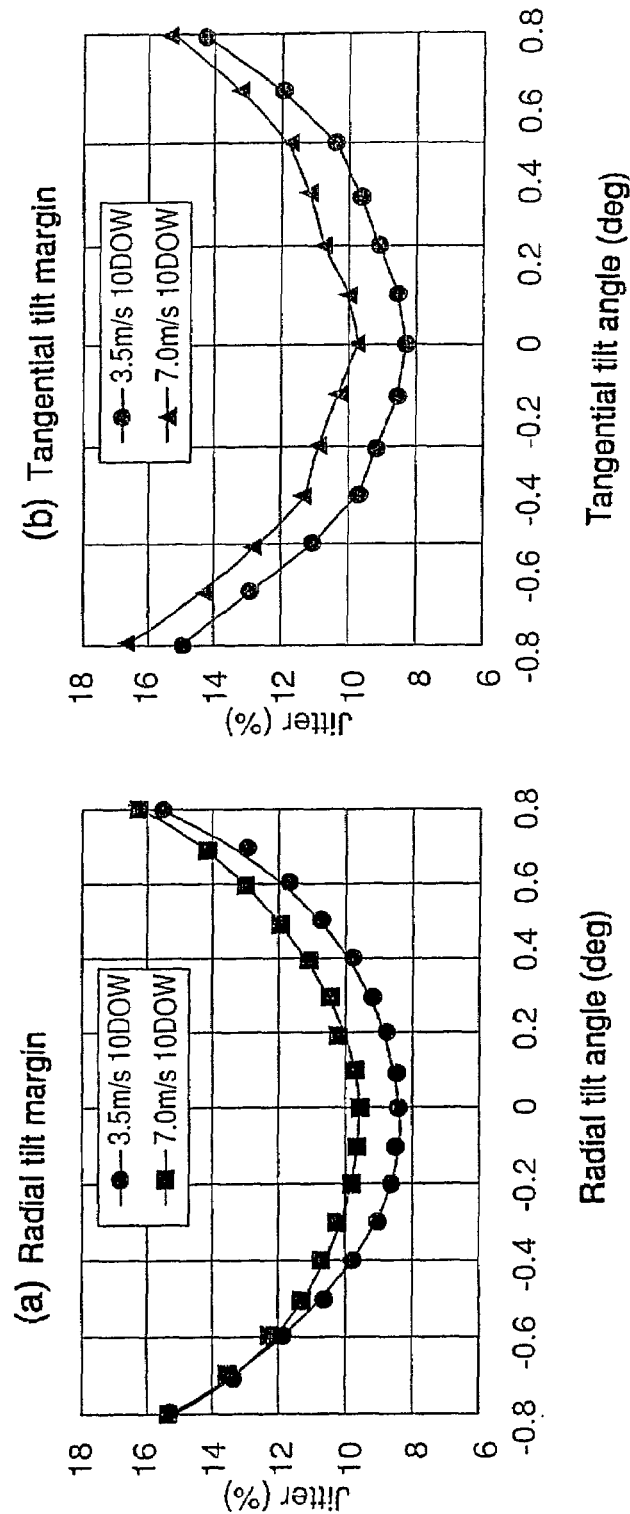
FIG. 18 are graphs showing the substrate tilt angle dependency of jitter in Example 2.

Then, to evaluate so-called tilt margin, EFM plus- modified random pattern signals were recorded on the medium of Example 2(g1) over a plurality of tracks, and then the substrate was intentionally inclined to the optical axis of the retrieving laser beam, whereby the change of jitter during retrieving was measured. The optical system for recording and retrieving had NA=0.6, the recording linear velocity was 1-time velocity or 2-times velocity, and in each case, retrieving was carried out after 10 times of overwriting. The measured results are shown in FIG. 18. The tilt margin was ±0.7 to 0.8 degree in the radial direction, and ±0.5 to 0.6 degree in the circumferential direction, which were no problematic level for usual drive.

Accelerated Test

EFM plus-modified random pattern was recorded on a part of the track of the medium of Example 2(g1) with Pw=13 mW employing the above-mentioned optimum pulse- dividing method. Thereafter, this medium was subjected to an accelerated test under a high temperature high humidity condition of 80° C./80% relative humidity. After 500 hours and 1,000 hours of the accelerated test, the jitter of the track was measured again, whereby jitter was found to have deteriorated only by 1% after the 1,000 hours.

Further, after 1,000 hours of the accelerated test, the random pattern was recorded on another track under the same conditions as above, whereupon jitter was measured, whereby deterioration at a level of 2% was observed, but such a level is practically no problematic.

Furthermore, recording was carried out similarly at a speed of 1-time velocity and 2-times velocity, and modulations before and after accelerated test for 1,000 hours under a high temperature high humidity condition of 80°C/80% relative humidity were evaluated. At the speed of 1-time velocity, the initial modulation was 61% and the modulation after the accelerated test was 58%. At the speed of 2-times velocity, the initial modulation was 60% and the modulation after the accelerated test was 58%.

Stability Against Retrieving Laser Beam

The retrieving laser beam was applied to the medium of Example 2(g1) by increasing the power to 1.2 mW, but no deterioration was observed at a level of 10 minutes. Then, with the power of 1.0 mW, the retrieving laser beam was repeatedly irradiated up to 1,000,000 times, but increase of jitter was less than 2%.

Example 3

A medium was prepared with the same layer structure as in Example 2 except that the composition of the recording layer was changed to $Ge_{0.05}Sb_{0.71}Te_{0.24}$. The thicknesses of the respective layers and the evaluation results are shown in Table 4. For the measurement, an optical system with NA=0.63 was used.

Like in Table 3, in the respective layer structures, $\alpha_1$, $\alpha_c$ and $\beta_{n-1}$ were optimized, and Pw and Pe were set so that jitter would become minimum, whereupon jitter was evaluated.

Like in Example 3(a), in Example 2(a1), good performance was obtained at the recording linear velocity of 1-time velocity and 2-times velocity. However, at 9 m/s, jitter was higher by from 1 to 2% than Example 2(a1).

Further, in Examples 3(a) to 3(f) wherein the upper protective layer thickness was 30 nm, jitter of less than 10% was obtained, and even after 100 times of overwriting, jitter was less than 13%. In Examples 3(g) to 3(i) wherein the upper protective layer thickness was as thick as 40 nm, jitter was always larger than 13%.

Example 4

The layer structure was such that a lower protective layer $(ZnS)_{80}(SiO_2)_{20}$ was 215 nm in thickness, a recording layer $Ge_{0.05}Sb_{0.69}Te_{0.26}$ was 18 nm, an upper protective layer $(ZnS)_{80}(SiO_2)_{20}$ was 18 nm, and a reflective layer $Al_{0.995}Ta_{0.005}$ was 200 nm. The composition of the recording layer was one whereby good characteristics were obtainable by recording at a linear velocity of from 3 to 5 m/s and was one for so-called 1-time velocity. However, the amount of excess Sb is slightly smaller than Examples 1 and 2, and it is therefore excellent in archival life and is preferred when an emphasis is placed on the storage stability of recorded information or the durability against deterioration by repetitive retrieving, i.e. durability against retrieving laser beam.

Figure 19:
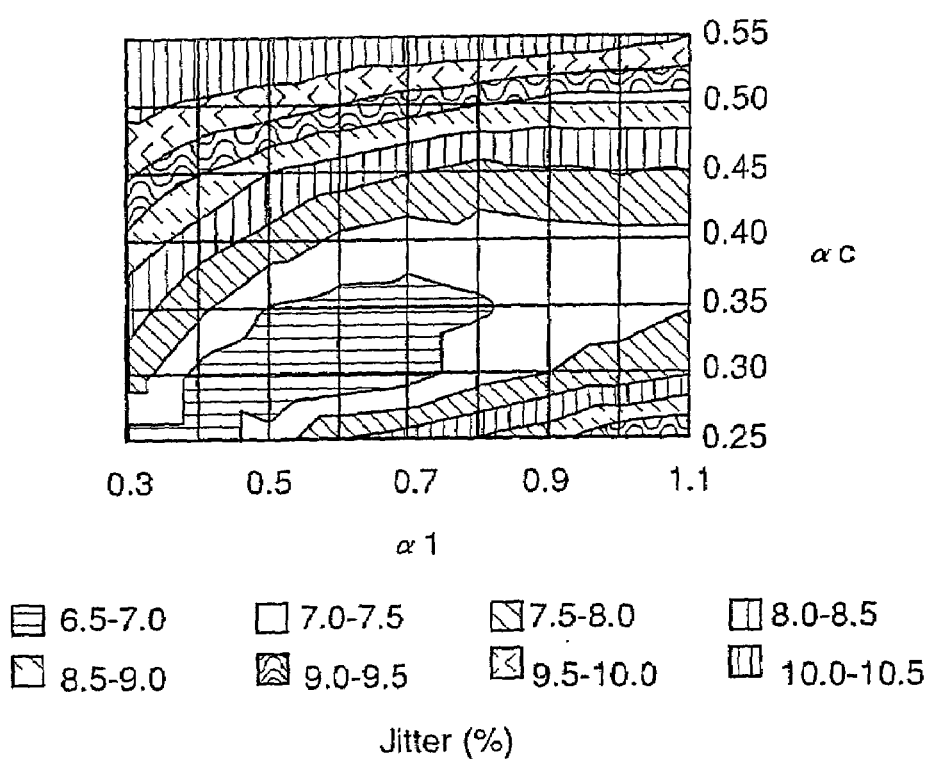
FIG. 19 is a graph showing the $\alpha_1$ and $\alpha_c$ dependency of jitter after ten times of overwriting in Example 4.

The following evaluation was carried out by an optical system with NA=0.6. Determination of the optimum pulse-dividing method was carried out as follows. At a recording linear velocity of 3.5 m/s, Pw=13 mW and Pe/Pw=0.5, and in FIG. 10, $\alpha_1$ and $\alpha_c$ were changed while maintaining $\beta_m=0.5$ to be constant, whereby a pulse-dividing method whereby the minimum jitter was obtainable, was selected. In FIG. 19, the $\alpha_1$ and $\alpha_c$ dependency of jitter after 10 times of overwriting is shown as a contour map of jitter. By setting $\alpha_1=0.4$ to 0.8 and $\alpha_c=0.3$ to 0.35, substantially the best jitter was obtained. Accordingly, based thereon, $\alpha_1=0.6$ and $\alpha_c=0.35$ were selected. At that time, $\Sigma\alpha_i=0.32n$ (n=3), 0.33n (n=4), 0.3n (n=5) and less than 0.35n (n=6 to 14).

The modulation was 65%, which is a value comparable to read-only DVD. Rtop was at a level of 23%, but if it is practically at least 15%, retrieving by a conventional read-only drive may be possible.

Therefore, an image data was recorded on the recording medium of the present invention with Pw=12.5 mW at a linear speed of 3.5 m/s, and retrieving was driven by a commercially available read-only DVD player, whereby with respect to the focus servo, tracking servo signal and jitter, characteristics equivalent to usual read-only DVD, were obtained.

Repetitive Overwriting Durability

Figure 20:
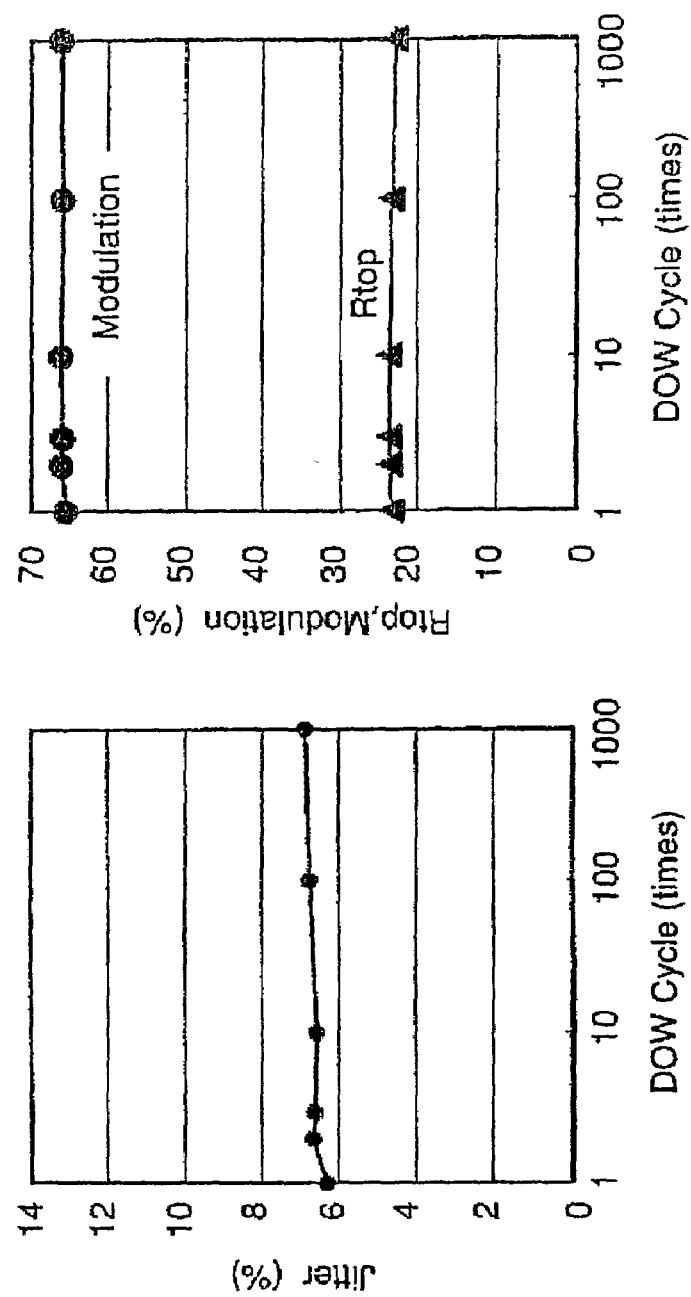
FIG. 20 are graphs showing the repetitive overwriting number of times dependency of jitter, Rtop and the modulation in Example 4.

FIG. 20 shows the dependency of jitter, Rtop and modulation on the number of times of repetitive overwriting with Pw=12.5 mW. It shows sufficiently stable characteristics even after at least 1,000 times of overwriting.

Accelerated Test

EFM plus modified random pattern was recorded on a part of the track of the medium with Pw=13 mW employing the above described optimum pulse-dividing method, and jitter was measured. Thereafter, this medium was subjected to an accelerated test under a high temperature high humidity condition of 80° C./80% relative humidity. After 500 hours and 1,000 hours of the accelerated test, jitter of this track was measured again, whereby jitter was found deteriorated only by less than 0.5% after 1,000 hours.

Further, after 1,000 hours of the accelerated test, the random pattern was recorded on another track under the same conditions as above, and jitter was measured, whereby deterioration at a level of 1% was observed, but such a level is practically not problematic.

Stability Against Retrieving Laser Beam

The retrieving laser beam was applied to this medium by increasing the power to 1.3 mW, but no deterioration was observed at a level of 10 minutes. Then, with the power of 1.0 mW, the retrieving laser beam was irradiated up to 1,000,000 times, but increase of jitter was less than 1%.

Example 5

In the layer structure of Example 2(a1), the recording layer was changed to $Ge_{0.05}Sb_{0.75}Te_{0.20}$. The evaluation was carried out by an optical system with NA=0.6.

The best jitter was obtained with $\alpha_1=0.4$, $\alpha_c=0.3$, $\beta_m=0.5$, Pw=14 mW and Pe/Pw=0.5. Jitter after ten times of overwriting was slightly less than 10%, and even after 1,000 times, jitter of less than 13% was maintained.

Accelerated Test

EFM plus-modified random pattern was recorded on a part of the track of this medium with Pw=14 mW employing the above described optimum pulse-dividing method, and jitter was measured. Thereafter, this medium was subjected to an accelerated test under a high temperature high humidity condition of 80° C./80% relative humidity. After 500 hours of the accelerated test, jitter of the track was measured again, but jitter was found deteriorated only by 2%.

Further, after 500 hours of the accelerated test, the random pattern was recorded on another track under the same conditions as above, and jitter was measured, whereby deterioration of a level of about 3% was observed, but such a level is practically not problematic.

Stability Against Retrieving Laser Beam

The retrieving laser beam was applied to this medium by increasing the power to 1.0 mW, but no deterioration was observed at a level of 10 minutes with the power of 1.0 mW. The retrieving laser beam was repeatedly irradiated up to 1,000,000 times, but increase of jitter was less than 3%, and jitter of less than 13% was maintained.

Example 6

In the layer structure of Example 4, the recording layer was changed to $Ag_{0.05}Ge_{0.05}Sb_{0.67}Te_{0.23}$. Evaluation was carried out by an optical system with NA=0.6.

Figure 21:
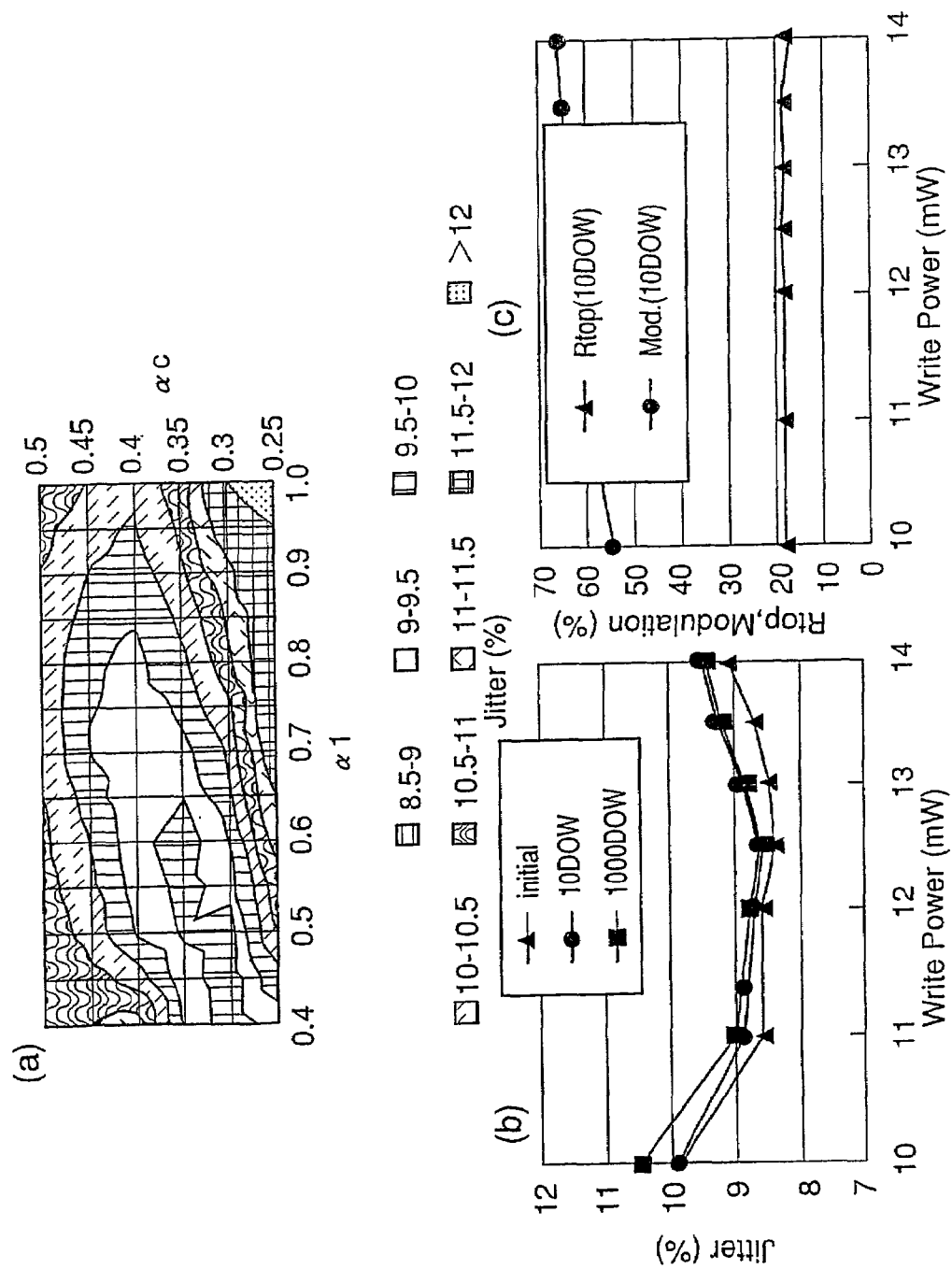
FIG. 21(a) is a graph showing the pulse-dividing method dependency of jitter in Example 6.
FIG. 21(b) is a graph showing the writing power dependency of jitter.
FIG. 21(c) is a graph showing the writing power dependency of the modulation and Rtop after ten times of overwriting.

At a linear velocity of 3.5 m/s, the pulse-dividing method dependency ($\alpha_1$ and $\alpha_c$) of jitter was measured with Pw=13 mW, Pe/Pw=0.5, m=n−1 and $\beta_m=0.5$, whereby a contour map as shown in FIG. 21(*a*) was obtained. The best result was obtained with $\alpha_1=0.6$, and $\alpha_c=0.35$. In this case, $\Sigma\alpha_i=0.32n$ (n=3), 0.33n (n=4), 0.33n (n=5) and less than 0.35n (n=6 to 14).

FIG. 21(*b*) shows the power dependency of jitter after once, ten times and 1,000 times of overwriting, and FIG. 21(*c*) shows the power dependency of Rtop and modulation after ten times of overwriting. Good jitter was maintained within a wide recording power range up to after 1,000 times of overwriting. Further, Rtop of 18% and a modulation of at least 60% were accomplished.

Figure 22:
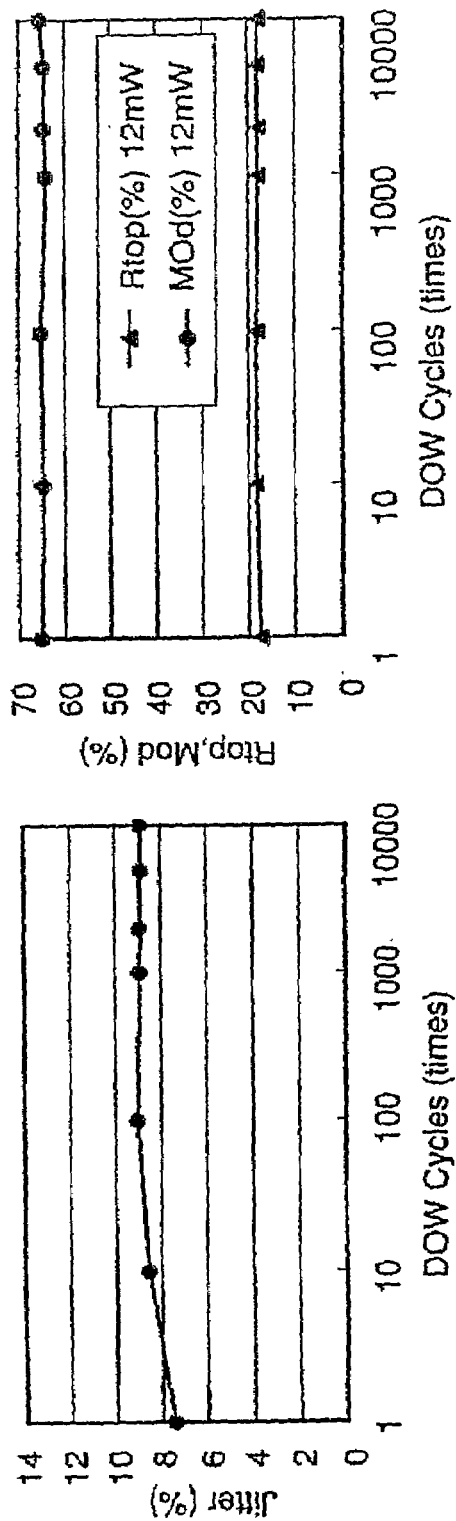
FIG. 22 are graphs showing the repetitive overwriting number of times dependency of jitter, Rtop and the modulation in Example 6.

FIG. 22 shows the changes in jitter, Rtop and modulation after 1,000 times of overwriting with Pw=13 mW. No deterioration was observed except that jitter increased about 1% at the initial stage.

Figure 23:
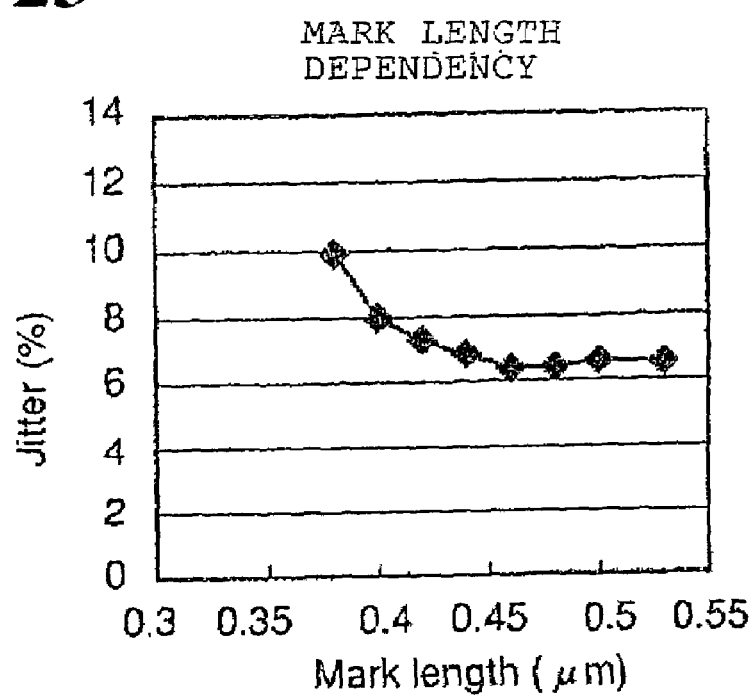
FIG. 23 is a graph showing the mark length dependency of jitter in Example 6.

Further, in the same manner as in Example 1, the shortest mark length dependency of jitter was measured, and the results are shown in FIG. 23. With the shortest mark length of 0.38 μm, jitter was extremely good at a level of less than 10%.

Further, with respect to this medium, evaluation was carried out on a pulse-dividing method where m=n−2, whereby characteristics similar to FIG. 21 were obtained with $\alpha_1=1.0$, $\alpha_c=0.5$ and $\beta_m=0.5$. At n=3, $\Sigma\alpha_i=0.48n$, at n=4, $\Sigma\alpha_i=0.48n$ and at n≧5, $\Sigma\alpha_i=0.46n$ to 0.47n.

Comparative Example 2

In the layer structure of Example 6, the recording layer was changed to $Ag_{0.05}In_{0.05}Sb_{0.63}Te_{0.27}$.

Figure 24:
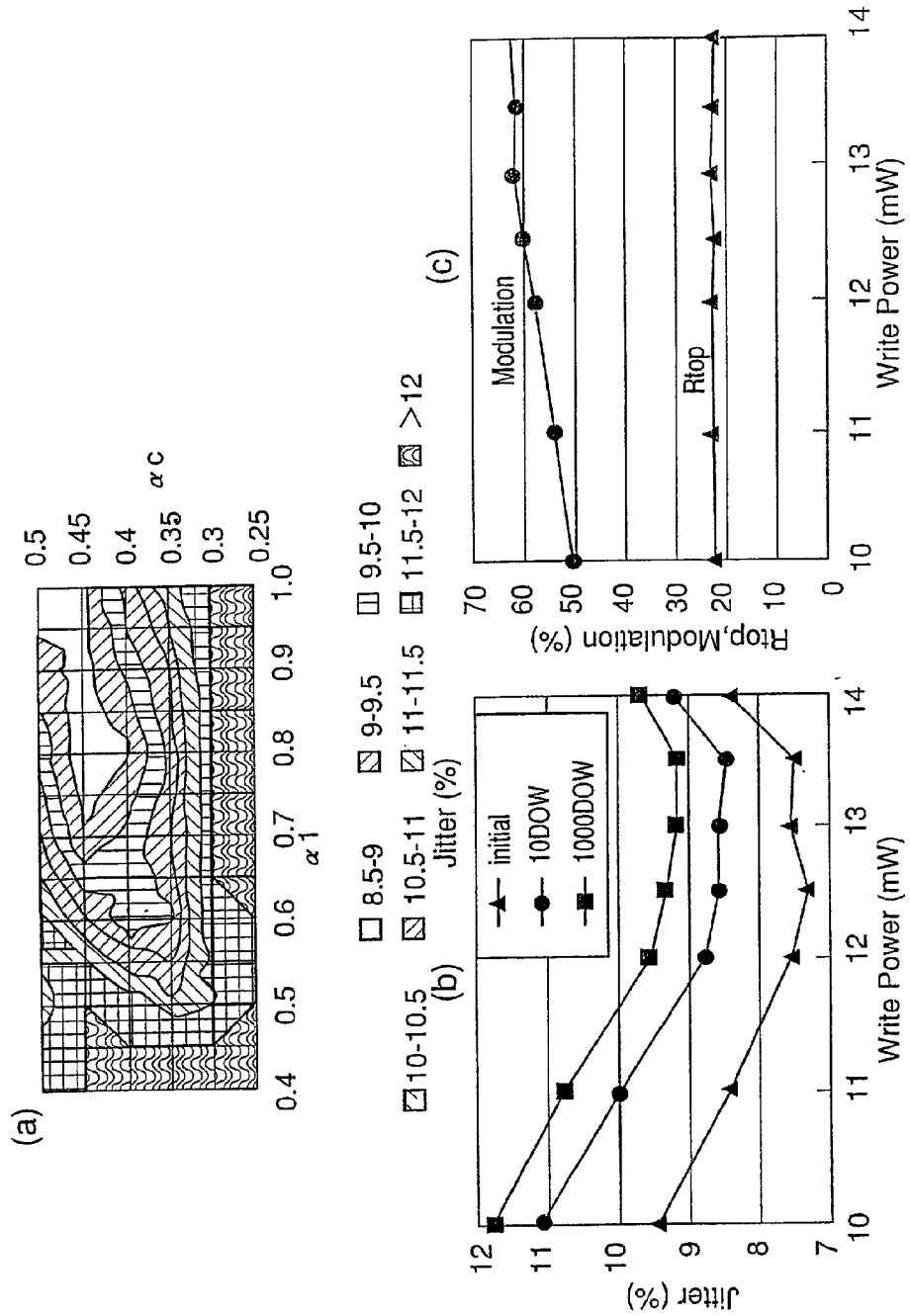
FIG. 24(a) is a graph showing the pulse-dividing method dependency of jitter in Comparative Example 2.
FIG. 24(b) is a graph showing the writing power dependency of jitter.
FIG. 24(c) is a graph showing the writing power dependency of the modulation and Rtop after ten times of overwriting.

The pulse-dividing method dependency of jitter was evaluated with Pw=13 mW, Pe/Pw=0.5 and $\beta_m$ 0.5, whereby a contour map as shown in FIG. 24(a) was obtained. The best results were obtained at $\alpha_1$=1.0 and $\alpha_c$=0.5. In this case, $\Sigma\alpha_i$ was constant at 0.5n irrespective of n.

The recording power dependency and repetitive overwriting characteristics up to 1,000 times are shown in FIGS. 24(b) and (c). Jitter after first recording and the power margin were better than in Example 5, but deteriorated by repetitive overwriting. After 1,000 times, jitter was rather poor.

Further, the retrieving laser power was raised to 1 mW, whereby jitter deteriorated in five minutes and increased to ten and a few %. This difference can not be explained by the difference of the recording sensitivity from 0.5 to 1 mW. The main factor for the deterioration by the retrieving laser beam is that the temperature rises to a level of from 50 to 100° C., and it is evident that addition of Ge of the present invention is effective for the improvement of the thermal stability of amorphous marks.

Comparative Example 3

The layer structure was such that a lower protective layer $(ZnS)_{80}(SiO_2)_{20}$ was 90 nm in thickness, a recording layer $Ge_2Sb_2Te_5$ was 21 nm, an upper protective layer $(ZnS)_{80}(SiO_2)_{20}$ was 23 nm, and a reflective layer $Al_{0.995}Ta_{0.005}$ was 200 nm.

For the recording, on the basis of the pulse- dividing method shown in FIG. 10(a), fine adjustments were carried out so that the best jitter was obtainable with respect to each mark length and each linear velocity.

Figure 25:
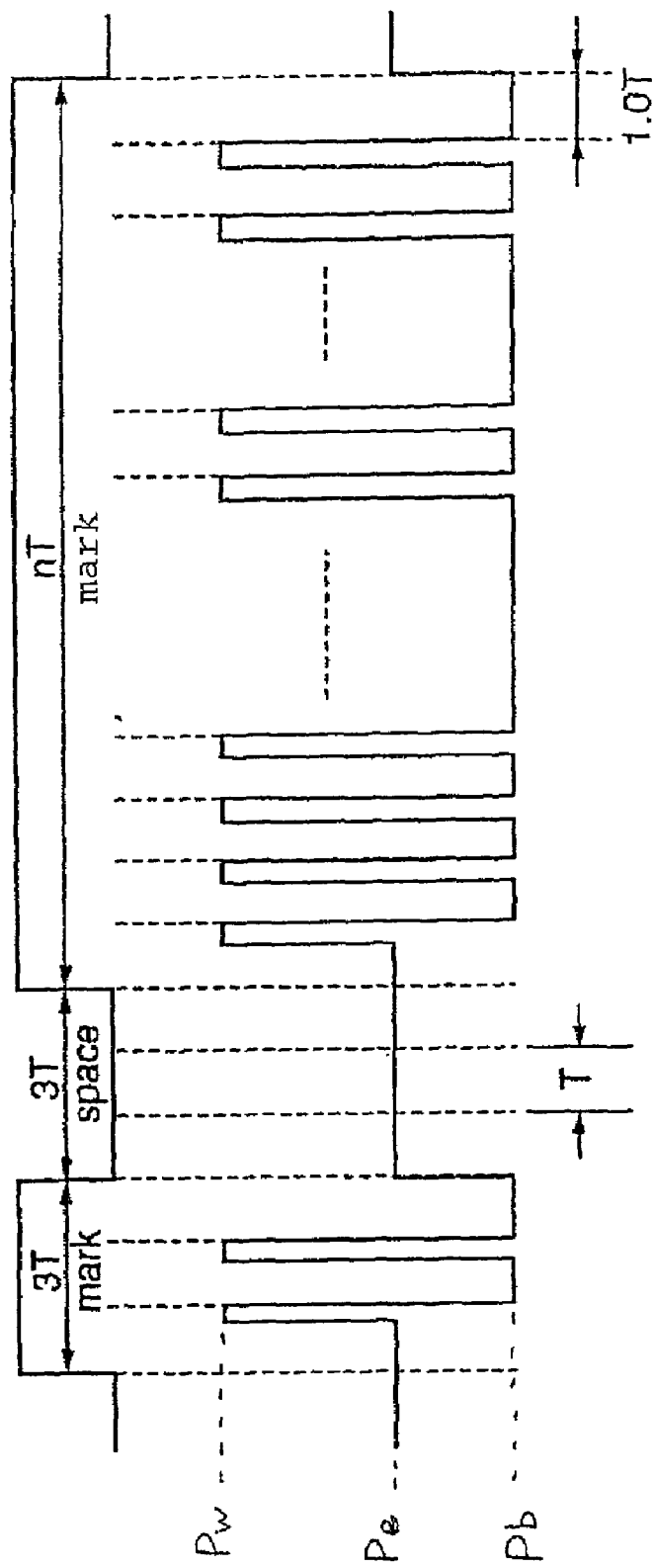
FIG. 25 is a view illustrating the pulse-dividing method in the recording method employed in Comparative Example 3.

With this medium, as shown in FIG. 25, the best jitter was obtained with a strategy such that $\alpha_1=\alpha_c=\alpha_{0=0.3}$ to 0.4 and constant, and $\beta_m$=1.0. Further, Pw=13 mW, Pe/Pw=0.4 (Pe=5 mW) and Pb=2.0 mW were the optimum powers. The ratio of Pb/Pe=0.4 is slightly high, but with the recording layer of this Cooperative Example, this is necessary to maintain TL in FIG. 9 at a high level to some extent.

When Pb was less than 1 mW, jitter was poor, but also when Pb was at least 3 mW, jitter again deteriorated.

Figure 26:
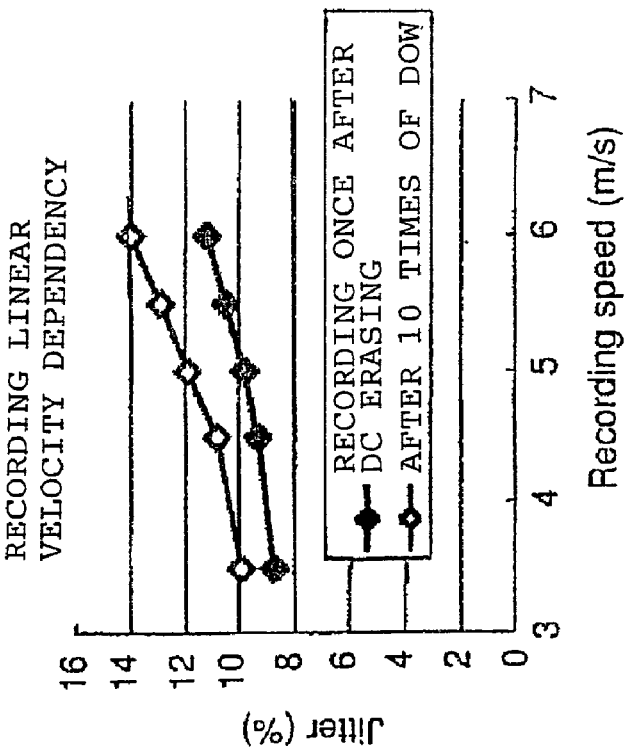
FIG. 26 are graphs showing the mark length dependency and the linear velocity dependency of jitter in Comparative Example 3.
Figure 26:
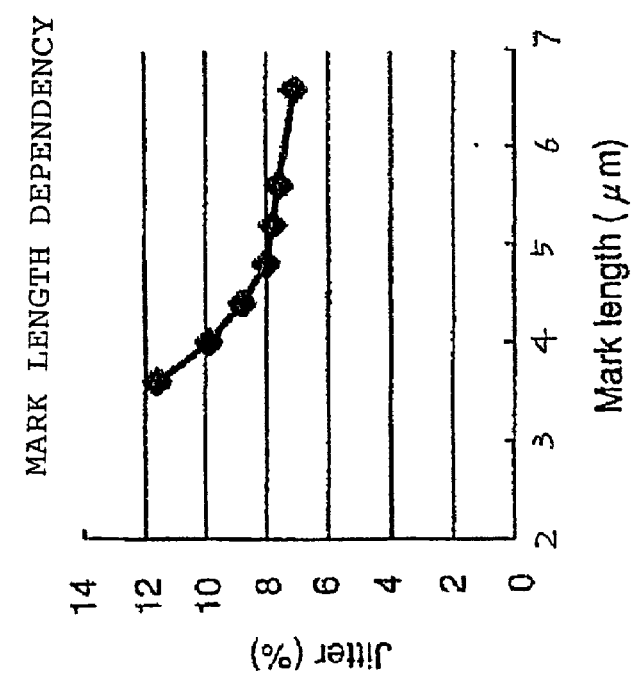

On the basis of this pulse-dividing method, the mark length dependency was measured in the same manner as in Example 2 by carrying out a precise pulse width adjustment at a level of 0.02 to $\alpha_0$ depending upon the mark length. The results are shown in FIG. 26(a). Further, the linear velocity dependency during overwriting was measured. The results are shown in FIG. 26(b).

For the linear velocity dependency, the reference clock period was changed depending upon the linear velocity, so that the shortest mark length became 0.4 μm, and retrieving was carried out always at 3.5 m/s. With respect to the linear velocity dependency, jitter after ten times of overwriting and jitter after erasing DC, followed by one overwriting operation, were recorded.

As shown in FIG. 26(a), at the shortest mark length of 0.4 μm, jitter was 10%, and when the shortest mark length became shorter, jitter deteriorated abruptly.

Further, as shown in FIG. 26(b), jitter deteriorated at a recording linear velocity of at least 5 m/s. However, in the recording after DC erasing, jitter is lower by from 2 to 3%. This indicates that due to non-uniformity in the temperature rise due to difference in absorptivity between the so-called crystal state and the amorphous state, failure in erasing or distortion of the amorphous mark shape resulted, whereby jitter deteriorated.

After overwriting at a linear velocity of 7 m/s, jitter was at least 20%, but in recording after DC erasing, it was about 15%. Accordingly, the reason for the high jitter at a high linear velocity is considered to be not attributable that a proper pulse-dividing method was not selected.

This recording layer contained coarse grains, and therefore, jitter was high. In addition, at a linear velocity of at least 5 m/s, erasing of the previous marks during overwriting tends to be inadequate, and its influence clearly appears as a difference in jitter from recording after DC erasing.

Further, the difference in jitter as between a case where overwriting was carried out at 7 m/s on the above medium of Example 2(g1) and a case where recording was carried out after DC erasing, was less than 0.5%.

In the case of a recording medium employing a recording layer of a $GeTe$—$Sb_2Te_3$ pseudo binary alloy such as $Ge_2Sb_2Te_5$, with the four layer structure comprising protective layer/recording layer/protective layer/reflective layer, at a high linear speed of from 5 to 6 m/s, there is no problem in recording after DC erasing, as mentioned above, but jitter deteriorates during overwriting. Therefore, to reduce jitter, it is necessary to take a additional measure such as to correct absorptivity by adding a light absorptive layer.

Comparative Example 4

In Example 2(g1), recording layer was changed to $Ge_{0.15}Sb_{0.64}Te_{0.21}$. Initial crystallization was very difficult, and the initialization beam was irradiated a plurality of times for initialization, and then subjected to overwriting, whereupon jitter was measured. However, even if the pulse-dividing method was changed within the range of FIG. 10, it was not possible to obtain jitter of 13% or lower. Further, if repetitive overwriting was continued, jitter increased by a few % between ten times and 100 times.

Comparative Example 5

In the layer structure of Example 2(g1), the recording layer was changed to $Ge_{0.05}Sb_{0.80}Te_{0.15}$. At 7 m/s, substantially the best jitter was obtained with $\alpha_1$=0.4, $\alpha_c$=0.3, $\beta_m$=0.5, Pw=14 mW, Pe/Pw=0.5, but jitter was slightly below 11% after ten times of overwriting, and increased to at least 13% after 1,000 times.

Accelerated Test

EFM plus modified random pattern was recorded on a part of the track of this medium with Pw=14 mW employing the above-mentioned optimum pulse-dividing method, and jitter was measured. Thereafter, this medium was subjected to an accelerated test under a high temperature high humidity condition of 80° C./80% relative humidity. After 500 hours of the accelerated test, jitter of this track was measured again, whereby jitter was found deteriorated by about 3% and became at least 13%.

Further, after 500 hours of the accelerated test, the random pattern was recorded on another track under the same conditions as above, and jitter was measured, whereby a deterioration of about 5% was observed, and thus the deterioration was quick.

Stability Against Retrieving Laser Beam

To this medium, the retrieving laser beam was applied by increasing the power up to 1.0 mW, whereby jitter increased by 3% after 10 minutes and was very unstable. Further, the modulation decreased, and there was a tendency that the marks disappeared.

Example 7

To the medium of Example 2(a1), EFM plus signals were recorded at a speed of from 1-time velocity (3.5 m/s, reference clock period T=38.2 nsec) to 2.25-times velocity (7.9 m/s, T=17 nsec) by maintaining $\alpha_1 T=\tau_1$=19 nsec and $\alpha_c T = \tau_c 6 = 11$ nsec to be constant at every linear velocity and changing only T in inverse proportion to the linear speed. Further, $\beta_i$ which will be constant in $\alpha_i + \beta_{i-1} = 1.0$, was determined. Further, only the final off pulse section $\beta_m$ was changed so that it became long as the linear velocity was slow.

In such a pulse-dividing method, in the view illustrating the gate-generation timing in FIG. 11, one fixed length pulse of $\tau_1 = 19$ nsec (Gate 1) and n–2 fixed pulses of $\tau_c = 11$ nsec (Gate 2) may be generated by synchronizing to the reference clock period T (a predetermined delay may be added), and further only Gate 3 for determining the final off pulse length may be changed depending upon the linear velocity, such being preferred as the pulse-generating circuit can be simplified. Further, in this Example, recording power Pw=13.5 mW, Pe=5 mW and Pb=0.5 mW are constant at these levels, whereby the pulse-generating circuit can be very simplified. Here, if the linear velocity is at most 5 m/s, $\Sigma \alpha_i < 0.47n$ is satisfied. Thus, thermal damage was sufficiently suppressed.

In Table 5, values of jitter obtained by changing $\beta_m$ at various linear velocities, are summarized. In the Table, v indicates a standard velocity of 3.5 m/s. The wavelength of the pickup was 637 nm and NA=0.63. The values of jitter themselves are, as in Example 2, slightly poor as compared with the case where the pulse- dividing method was varied more flexibly, but values of substantially less than 10% are obtained from 1-time velocity to 2.25-times velocity.

Here, if $\beta_m$ is changed in reverse proportion to the linear velocity by setting $\beta^H_m = 0.3$ at the 2-times velocity and $\beta^L_m = 0.6$ at the 1-time velocity (the point surrounded by square), it is evident that jitter of less than 10% is obtainable from 1-time velocity to 2-times velocity. Further, in this Example, the margin of $\beta_m$ is small, but even if $\beta_m$ is set to be constant at 0.2, jitter of less than 10% can be obtained from 1-time velocity to 2.25-times velocity. Also in this manner, a pulse-generating circuit variable by the linear velocity can be simplified.

Further, if Pb, Pe/Pw, Pw, $\tau_0$, $\tau_c$ and ($\beta^L_m$, $\beta^H_m$) are preliminarily recorded on the recording medium by prepits or by modulated groove wobbling signals, optimum recording conditions can be automatically determined depending on the linear velocity at the time of overwriting.

Example 8

The layer structure was such that a lower protective layer $(ZnS)_{80}(SiO_2)_{20}$ was 215 nm in thickness, a recording layer $Ge_{0.05}Sb_{0.69}Te_{0.26}$ was 19 nm, an upper protective layer $(ZnS)_{80}(SiO_2)_{20}$ was 20 nm, and a reflective layer $Al_{0.995}Ta_{0.005}$ was 200 nm.

At a linear velocity of 3.5 m/s, recording was carried out by a pulse-dividing method being $\alpha_1 = 0.5$, $\alpha_c = 0.35$, $\beta_m = 0.5$, Pw=11 mW, Pe=6.0 mW, Pb=0.5 mW and by changing the reference clock period T to change the shortest mark length (3T mark length) from 0.4 µm to 0.25 µm. When the mark length of 3T mark was 0.4 µm, T=38.2 nsec, and when it was 0.2 µm, T=19.1 nsec. The wavelength of the recording laser was 637 nm, and NA=0.63.

This focused laser beam had a Gaussian distribution, whereby it is possible to record at a high density of at least the optical resolution by utilizing only the high temperature portion at the center.

The recorded portion was retrieved by a blue laser beam having a wavelength of 432 nm with a power of 0.5 mW and NA=0.6. This laser beam was one generated from a laser beam with a wavelength of about 860 nm by a non- linear optical effect. With this layer structure, a large modulation at a level of at least 50% was obtained even with 432 nm.

Figure 28:
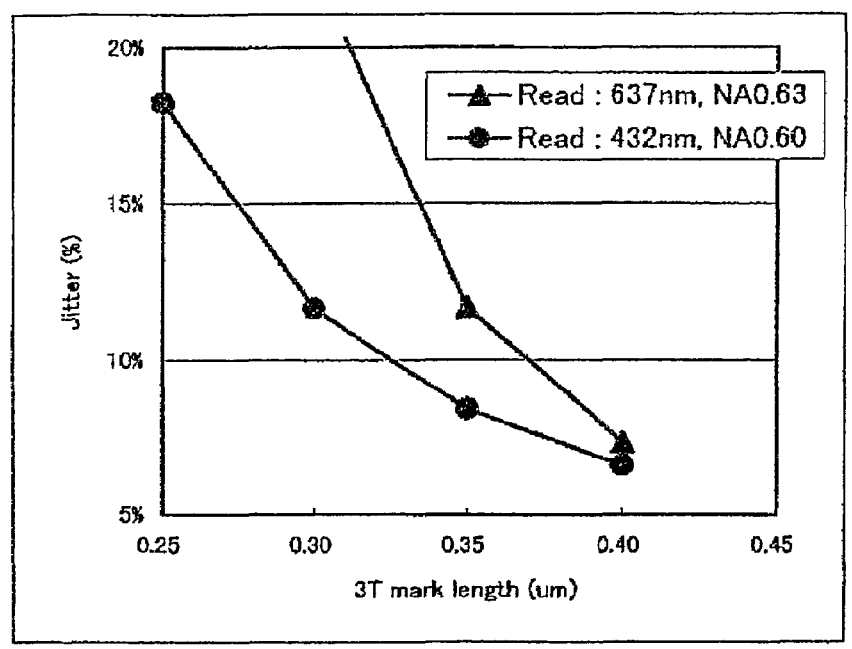
FIG. 28 is a graph showing the shortest mark length dependency of jitter in Example 8.

Further, in FIG. 28, jitter in a case where retrieving was carried out by an optical system with 637 nm and NA=0.63, which was employed for a recording and jitter in a case where retrieving was carried out by an optical system with 432 nm and NA=0.6, were shown as the shortest mark length dependency. In the measurement, the set values of the equalizer were optimized as far as possible at each measuring point. It is evident that with this recording medium, in the blue laser beam retrieving, good jitter of less than 13% is obtained even with the shortest mark length of 0.3 µm.

Comparative Example 6

In the layer structure of Example 2(a1), the recording layer was changed to $Ge_{0.05}Sb_{0.64}Te_{0.31}$.

Figure 27:
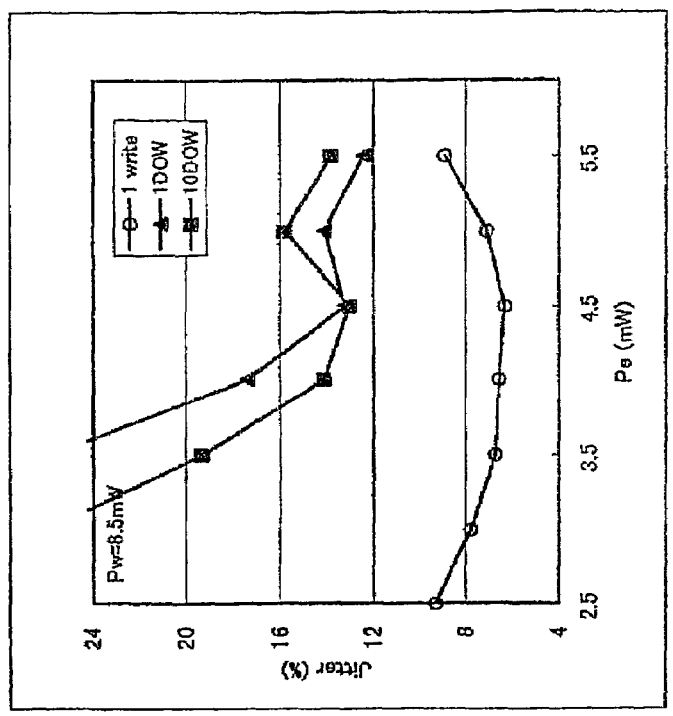
FIG. 27 are graphs showing the Pw and Pe dependency of jitter in Comparative Example 6.
Figure 27:
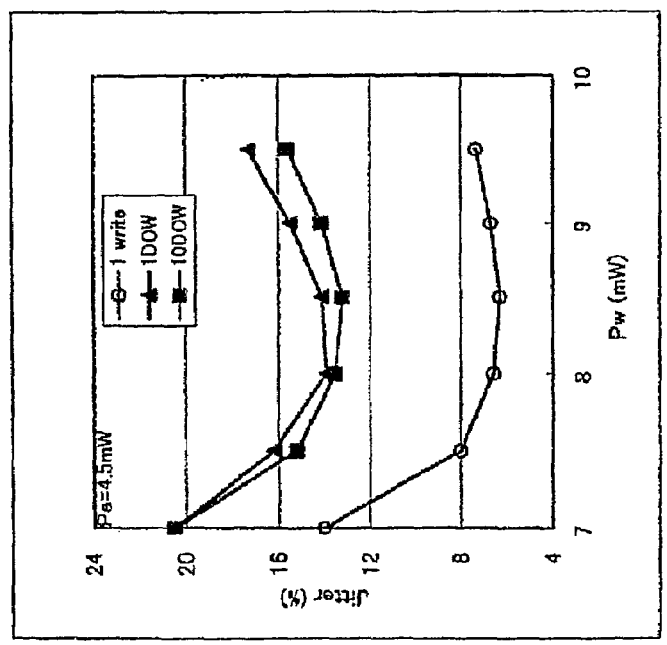

Recording evaluation was carried out by an optical system with a wavelength of 637 nm and NA=0.63. At a linear velocity of 3.5 m/s, overwriting recording was carried out up to ten times by changing only Pw while maintaining m=n–1, $\alpha_1 = 0.4$, $\alpha_c = 0.4$, $\beta_m = 0.4$, Pb=0.5 mW and Pe=4.5 mW to be constant. The recording power dependency of jitter at that time, is shown in FIG. 27(a). In this Figure, 1 write indicates the first recording of an unrecorded disk, 1 DOW indicates the first overwriting, and 10 DOW indicates 10th times overwriting.

Then, overwrite recording was carried out up to ten times by changing only Pe while maintaining Pw=8.5 mW to be constant. The erasing power dependency of jitter at that time is shown in FIG. 27(b).

In each case, in the first recording (1 write), good jitter was obtained, but when overwriting was carried out even only once, jitter deteriorated abruptly. The composition of the recording layer in this Comparative Example is a Te-rich composition than linear line A in FIG. 3, and it is considered that as the crystallization speed is slow, no adequate erasing ratio was obtained, and accordingly no adequate overwriting performance was obtained.

Example 9 and Comparative Example 7

In the layer structure of Example 2(a1), the composition of the recording layer was changed as shown in Table 6. By cosputtering a $Ge_{0.05}Sb_{0.73}Te_{0.22}$ target and Ge, the amount of Ge was changed.

Using an optical system with a wavelength of 637 nm and NA=0.63, the conditions under which jitter after ten times of overwriting becomes minimum, were investigated by changing $\alpha_1$, $\alpha_c$, Pw and Pe while maintaining m=n–1, Pb=0.5 mW and $\beta_m = 0.5$.

The minimum jitter obtained by the composition of each recording layer was as shown in Table 6. As the amount of Ge increased, jitter increased, and when Ge was 10 atomic % or more, jitter at 2-times velocity became very high at a level of 14%.

Further, this medium was subjected to an accelerated test under conditions of 80° C./80% relative humidity, whereby Examples 9(b) and (c) were slightly better than Example 9 (a). Namely, signals recorded before the accelerated test were retrieved after 2,000 hours of the accelerated test, whereby in either case of Examples 9(a) to (c), the jitter deteriorated only by 1%.

Further, in Examples 9(a) to (c), the initial modulation was from 61% to 63% and, even after the accelerated test of 2,000 hours, the modulation obtained was from 58% to 59%. The reflectance were not substantially changed. Especially, in Examples 9(b) and (c), there was an increase within 0.5%.

Then, by cosputtering a $Ge_{0.05}Sb_{0.73}Te_{0.22}$ target and Ta, the amount of Ta was added. As a result, optimum jitter was obtained when from 1 to 2 atomic % of Ta was added to GeSbTe.

Example 10 and Comparative Example 8

In the layer structure of Example 2(g1), the recording layer was changed to GeSbTe having In added. In was added by cosputtering InSbTe to a GeSbTe target. The compositions of the respective recording layers were $Ge_{0.05}Sb_{0.74}Te_{0.21}$ in Example 10 (a), $In_{0.023}Ge_{0.048}Sb_{0.719}Te_{0.21}$ in Example 10 (b), $In_{0.053}Ge_{0.044}Sb_{0.688}Te_{0.215}$ in Example 10(c), and $In_{0.188}Ge_{0.041}Sb_{0.617}Te_{0.224}$ in Comparative Example 8.

Figure 29:
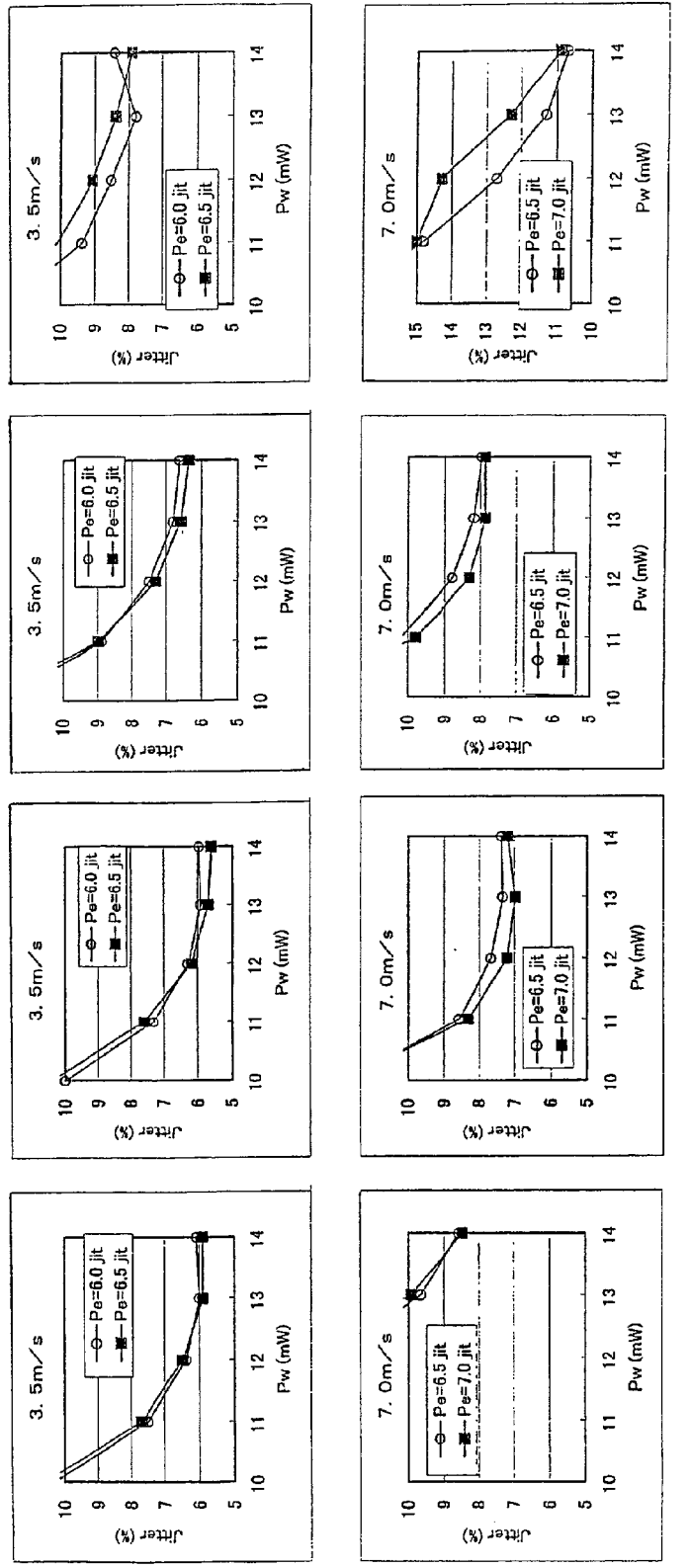
FIG. 29 are graphs showing the Pw dependency of jitter in Example 10 and Comparative Example 8.

The power dependency of jitter of the respective media was evaluated, and the results are shown in FIGS. 29(*a*), (*b*), (c) and (d). The upper section represents a case where the recording linear velocity was 3.5 m/s, and the lower section represents a case where it was 7.0 m/s.

In each case, the optical system employed had 637 nm and NA=0.63. In the case of a linear velocity of 3.5 m/s, $\alpha_1=0.6$, $\alpha_c=0.35$ and $\beta_m=0.5$, and in the case of 7.0 m/s, $\alpha_1=0.4$, $\alpha_c=0.4$ and $\beta_m=0.5$. Pb was constant at 0.5 mW. Pe was constant at two levels, and only Pw was changed to measure the Pw dependency of jitter. By the addition of In in an amount of from 2 to 5 atomic %, the Pw margin was improved to a large extent. However, when it exceeded 10 atomic %, jitter became poorer than a case where In was not added.

Further, the jitter after 1,000 times of overwriting was less than 10% at both linear velocities in Examples 10(a) to (c), but it was higher than 13% at both linear velocities in Comparative Example 8.

Accelerated Test

The medium of Example 10(b) was subjected to an accelerated test under an environment of 80° C./80% relative humidity. The accelerated test was carried out until 2,000 hours. Deterioration of jitter of signals recorded before the accelerated test was only about 1%.

Further, the initial modulation was 61%, and even after 2,000 hours of accelerated test, the modulation obtained was 57%. The reflectance was not substantially changed.

After 2,000 hours, recording was carried out anew on an unrecorded portion, whereby deterioration of jitter was about 3%, but such a level is not practically problematic.

Example 11

In the layer structure of Example 2(g1), the recording layer was changed to $In_{0.03}Ge_{0.05}Sb_{0.71}Te_{0.21}$, and such a disk was formed on a polycarbonate resin substrate having the groove shape as identified in Table 7. In each case, the groove pitch was 0.74 μm.

Figure 30:
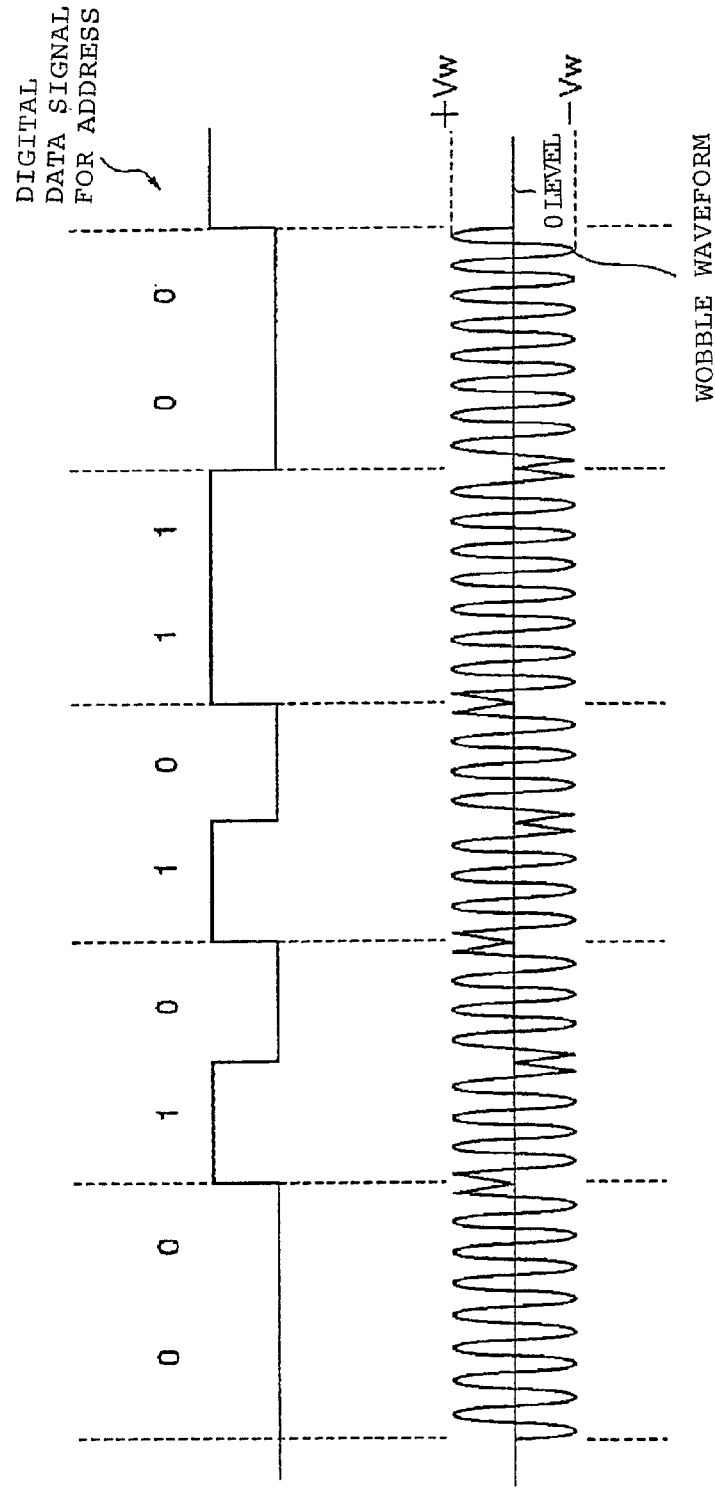
FIG. 30 is a view illustrating the relation between the digital data signal and the wobble waveform.

As a wobble-modulated system, a binary phase modulation was employed wherein the period $T_w$ of a carrier wave was 32 times of reference data clock period T=38.2 nsec. Here, the phase modulated wobble is such that as shown in FIG. 30, the phase of the wobble wave is shifted by π in correspondence with 0 or 1 of a digital data signal.

Namely, a non-modulated carrier wave (cosine wave or sine wave) having a frequency $f_c=1/T_w=1/(32T)$ will shift by a phase π by switching a digital data for address from 0 to 1 or from 1 to 0. The switching period $T_d$ Of digital data 0 and 1 is of a low frequency than $T_w$, and Td is a divisor of $T_w$, and accordingly, even if the phase has shifted, the wobble wave form is continuously changed.

This modulation method is preferred in that as is different from frequency (FM) modulation to be employed for ATIP (Absolute Time in Pregroove), the wobbling frequency is constant, and as the period is modulated with a high frequency of 32T, it is possible to establish rotational synchronization of the disk with reference to the wobbling clock and at the same time to form a data clock directly in synchronization with the wobbling clock.

Figure 31:
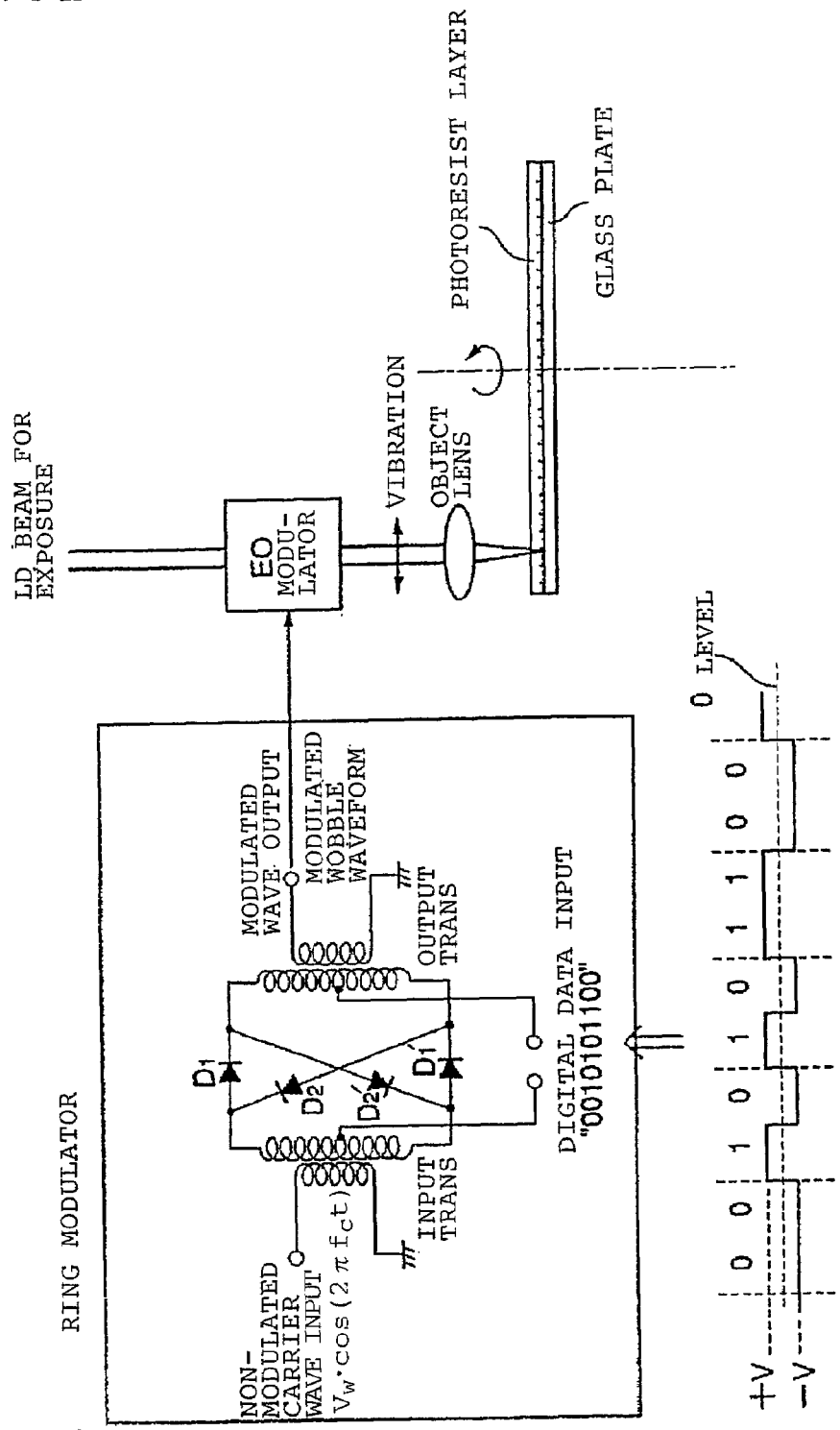
FIG. 31 is a view illustrating the mechanism for modulating the wobble waveform by a digital data signal.

To change the phase by modulation of a digital data like this, a ring modulator as shown, for example, in FIG. 31, may be employed. For the digital data, a positive or negative voltage ±V is applied in correspondence with 0 or 1. At the time of preparing a stamper, exposure is carried out while a laser beam for exposure of a photoresist is wobbled in the radial direction in accordance with a wobble wave form binary phase modulated between voltages of $\pm V_w$. At that time, by applying the output wave of a ring modulator to an EO modulator, the exposure beam can be wobbled.

Now, this will be described in further detail. In the Figure, if a signal of $V_w \cdot \cos(2\pi f_c t)$ having a frequency of $\cos(2\pi f_c t)$ is input to the non-modulated carrier wave input terminal, two carrier wave signals of $V_w \cdot \cos(2\pi f_c t)$ and $-V_w \cdot \cos(2\pi f_c t)$ will appear as output of the input transformer. If the digital data input is positive (+V), $D_1$ and $D_1'$ are conducted, and the carrier wave $V_w \cdot \cos(2\pi f_c t)$ passes through $D_1$, and modulation appears at the output terminal. The carrier wave of $-V_w \cdot \cos(2\pi f_c t)$ passes through $D_1'$, then is inverted by a transformer on the output side and becomes $V_w \cdot \cos(2\pi f_c t)$, and it is then added to the output passed through $D_1$, to obtain an output of $V_w \cdot \cos(2\pi f_c t)$.

If the digital data input is negative (−V), i.e. if $D_2$ and $D_2'$ are conducted, the signal of $V_w \cdot \cos(2\pi f_c t)$ is led to a lower side of an output side transformer via diode $D_2$, whereby at the output terminal, the modulation is inverted and becomes $-V_w \cdot \cos(2\pi f_c t)$.

On the other hand, the carrier wave which was $-V_w \cdot \cos(2\pi f_c t)$ at the output side of the input side transformer will be added to the common mode input of the output side transformer via diode $D_2'$, and it thus appears with the same polarity (as $-V_w \cdot \cos(2\pi f_c t)$) at the modulated wave output terminal. Accordingly, the carrier waves passed through the passages of diodes $D_2$ and $D_2'$ will be combined as $-V_w \cdot \cos(2\pi f_c t)$, and the modulation appears at the output end.

In the case of a ring modulator, $V_w \cdot \cos(2\pi f_c t)$ or $-V_w \cdot \cos(2\pi f_c t)$ will be output at the output terminal depending upon whether the digital data input is positive or negative.

The wobble waveform thus modulated will be input to an EO modulator, whereby the exposure beam can be wobbled.

In this Example, the wobble amplitude was 60 nm (peak-to-peak value) in all cases.

In the case of a medium wherein recording is carried out only in a groove, the recording or retrieving laser wavelength λ=637 nm and the refractive index of the substrate n=1.56, whereas a preferred range of the groove depth is such that lower limit is λ/(20 n)=20.5 nm, and the upper limit is λ/(10 n)=40.8 nm.

For the evaluation of this medium, an optical system with a wavelength of 637 nm and NA=0.63 was used.

As in Example 2, by a recording pulse-dividing method with m=n−1, $\alpha_i+\beta_{i-1}=1.0$ (2≦i≦m) and $\alpha_i=\alpha_c$=constant (2≦i≦m), at a linear velocity of 3.5 m/s, $\alpha_i=0.5$, $\alpha_c=0.3$, $\beta_m=0.5$, Pw=13 mW and Pe=6 mW, and at a linear velocity of 7 m/s, $\alpha_i=0.4$, $\alpha_c=0.35$, $\beta_m=0.5$, Pw=14 mW and Pe=7 mW.

Firstly, recording was carried out in a groove at a linear velocity of 3.5 m/s, and Rtop and the modulation were measured. Further, jitter of the recording signal was measured at 3.5 m/s and at 7 m/s. The results are shown in Table 8.

Firstly, Comparative Example 11(k) had a very shallow groove with a depth of 18 nm, but the push-pull signal was not substantially detected, and it was impossible to apply a tracking servo. Further, preparation of a stamper will be very difficult to form such a shallow groove uniformly. In fact, substantial non-uniformity was observed in the tracking servo signals.

Figure 32:
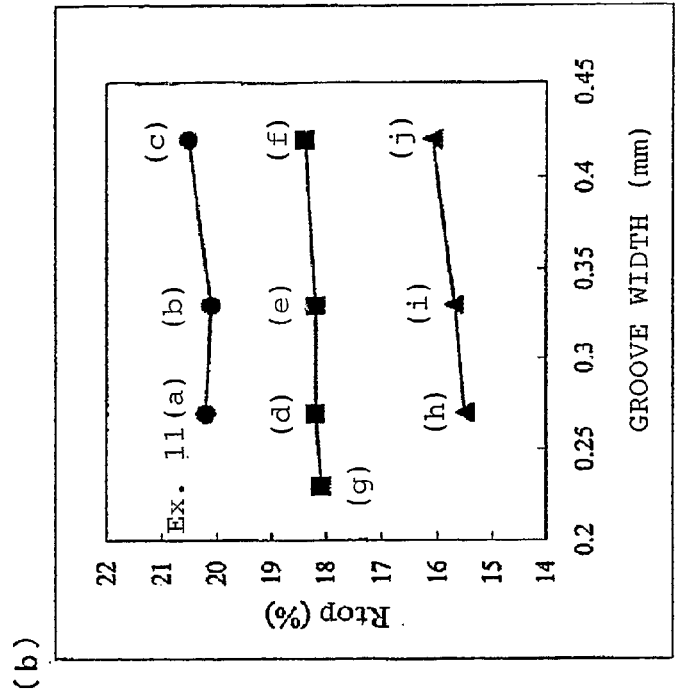
FIG. 32 are graphs showing the groove width dependency of the modulation and Rtop in Example 11.
Figure 32:
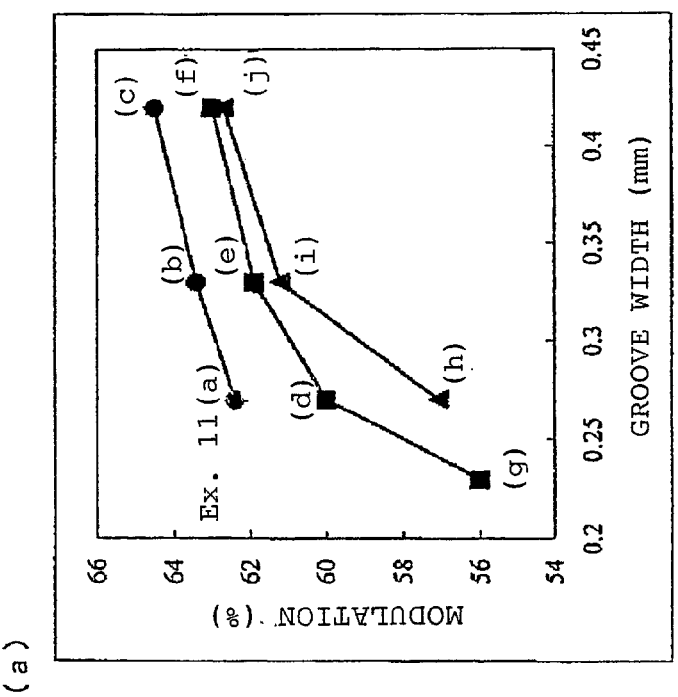

In FIGS. 32(*a*) and (*b*), the groove shape dependency of modulation and Rtop is shown. Examples 11 (h) to (j) have a groove with a depth of 42 nm, but as compared with the case where the depth is 27 nm, the reflectance was substantially low, i.e. lower by at least 5%, such being undesirable. The modulation is low especially in a case where the groove is narrow, and when the width was 0.23 μm, deterioration of the modulation was remarkable even if the depth was 35 nm.

In this Example, the layer structure was the same. However, if, in the case of a depth 42 nm, in order to supplement the deterioration of the reflectance, a layer structure having a high reflectance is adopted, the deterioration of the modulation will be more remarkable. Namely, a groove with a depth of 42 nm is not suitable for recording in a groove.

If the groove depth is at least 40 nm, when the groove width is less than 0.3 μm, wobble signals will substantially leak into recording data signals. As compared with a case where the groove width is at least 0.3 μm, at a linear velocity of 3.5 m/s, jitter deteriorates by at least 1 to 2%, and at a linear velocity of 7 m/s, jitter deteriorates by 2 to 3%.

Example 12

The layer structure was such that a lower protective layer $(ZnS)_{80}(SiO_2)_{20}$ was 65 nm in thickness, a recording layer $Ge_{0.05}Sb_{0.73}Te_{0.22}$ was 16 nm, an upper protective layer $(ZnS)_{80}(SiO_2)_{20}$ was 20 nm, a first reflective layer $Al_{0.995}Ta_{0.005}$ was 40 nm and a second reflective layer Ag was 70 nm.

From the lower protective layer to the first reflective layer, were prepared by sputtering without releasing vacuum. After forming the first reflective layer, vacuum was released and left to stand for a few minutes, and then the second reflective layer was formed by sputtering again in vacuum.

After forming the second reflective layer, an ultraviolet-curable resin was laminated in a thickness of 4 μm as a overcoating layer by spin coating. Two disks obtained in such a manner were bonded so that the overcoating layers faced each other.

Film forming of the first reflective layer was carried out under a final vacuum pressure of at most $4 \times 10^{-4}$ Pa under an Ar pressure of 0.55 Pa. The volume resistivity was 55 nΩ·m. Impurities such as oxygen, nitrogen, etc., were below the detectable level by X-ray excited photoelectron spectrometry. The sum of all impurities can be regarded as not higher than about 1 atomic %.

Film forming of the second reflective layer was carried out under a final vacuum pressure of at most $4 \times 10^{-4}$ Pa under an Ar pressure of 0.35 Pa. The volume resistivity was 32 mΩ·m. Impurities such as oxygen, nitrogen, etc. were below the detectable level by X-ray excited photoelectron spectrometry. The sum of all impurities can be regarded as not higher than about 1 atomic %.

Using an optical system with a wavelength of 637 nm and NA of 0.60, jitter after ten times of overwriting was measured by means of a pulse-dividing method at a linear velocity of 3.5 m/s, with $\alpha_1=0.4$, $\alpha_c=0.35$ and $\beta_m=0.5$, whereby the minimum jitter of 6.5% was obtained with Pw=11 mW, Pe=6.0 mW, and Pb=0.5 mW.

This medium was left to stand for 500 hours under a high temperature high humidity condition of 80° C./80% relative humidity, and then recording was carried out in the same manner, whereby no deterioration was observed.

Example 13

A stamper provided with a spiral groove having a wobble and having a groove pitch of 0.74 μm, a groove width of 0.3 μm and a groove depth of 40 nm, was prepared, and based thereon, a polycarbonate resin substrate having a diameter of 120 mm and a thickness of 0.6 mm was formed by injection molding.

As shown in Table 9, 36 mm of a record region was formed from a radius of 22.5 mm to a radius of 58.5 mm, and the record region was divided into 255 bands (zones). Each band contained 191 tracks.

The band widths are set so that the final end of each band will be exactly the 191-st track. Therefore, each band width is not accurately 36/255. Accordingly, the outer most final end of the record region is 58.54 mm.

The channel bit length was 0.133 μm, and at a linear velocity of 3.49 m/s, a reference clock of 26.16 MHz (T=38.23 nsec) is obtainable. The wobble period was set so that it became nine times the channel bit length at the center radius of each band. Its physical period is 1.2 μm.

The total number of channel bit lengths and the total number of wobbles at the center radius of each band are calculated first, and in the same band, the number of channel bits or the number of wobbles contained in one revolution is set to be constant.

As shown in Table 9, the number of channel bits or the number of wobbles is constant with a precision of ±1% at the first and final ends of the band. Namely, by a ZCAV system, recording with a constant linear density which is not different from a CLV system, can be accomplished by a ZCAV system, and the specifications for read-only DVD can be fully satisfied.

With the foregoing prerequisites, when the disk is rotated so that a linear speed of 3.49 m/s is obtainable at the center radius of each band, the wobble period will be exactly nine times of the reference clock period T=38.23 nsec of DVD data.

This medium is rotated so that the linear velocity becomes 3.49 m/s at the center radius of the band of the inner-most band of Table 9, and used as a medium for a ZCAV system. The period of a carrier wave retrieved from a wobble of each band under CAV rotation, is multiplied by ⅑ to obtain a data reference clock $T_q$ for each band and recording of EFM plus modified data is carried out based on the clock.

At the time of retrieving, if rotational synchronization can be accomplished so that the data reference clock frequency formed from the recorded data, will be 26.16 MHz, fluctuation in the channel bit length in each zone will be less than ±1%, whereby retrieving can be carried out substantially in a CLV mode without any trouble.

Namely, the above reference clock of 26.16 MHz (T=38.23 nsec) is generated by a quartz oscillator, and this phase is compared with the phase of the data reference clock formed from recorded data, and the rotational speed is finely controlled by a usual PLL (Phase Locked Loop) so that the two will synchronize.

Such a rotation control by PLL control is practically employed for retrieving of DVD-ROM, and it is advantageous that such a system can be used as it is.

Example 14

In the layer structure of Example 2(a1), the reflective layer was changed to $Al_{0.975}Ta_{0.025}$. The volume resistivity was 220 nΩ·m. A plurality of samples were prepared by changing the film thickness from 200 nm to 400 nm, and jitter was measured in the same manner as the measurement shown in Table 3 using the respectively optimum pulse-dividing method among FIG. 10 (a). At the film thickness of about 300 nm, the best jitter of a level of 12% was obtained. When the reflective layer was made thicker or thinner than about 300 nm, jitter deteriorated.

Example 15

In the layer structure of Example 11(a), the thickness of the upper protective layer was changed to 23 nm.

In-groove recording was carried out to this medium. Using an optical system with a wavelength of 405 nm and NA=0.65, a beam having a substantially circular cross-sectional shape with a spot diameter of about 0.5 μm (diameter at the 1/e² intensity of Gaussian beam) was formed, and recording and retrieving were carried out via the substrate having a thickness of 0.6 mm.

At a linear velocity of 4.86 m/s, EFM plus modulated signals were recorded with the shortest mark (3T mark) length of 0.25 μm.

Overwriting was carried out ten times by the same recording pulse-dividing method as in Example 2 with m=n−1, $\alpha_1$=0.5, $\alpha_c$=0.38 and $\beta_m$=0.67, and with Pw=9.5 mW, Pb=0.5 mW and Pe=4.0 mW, whereby jitter was 10%.

It was found that in recording and retrieving with a blue laser, recording of higher quality is possible even when compared with Example 7. Further, a medium designed to meet the current red laser, may be used as it is for recording and retrieving with a blue laser, whereby a high densification can be attained.

Example 16

A medium was prepared with the same layer structure as in Example 2(a1) except that the composition of the recording layer was changed to $Ga_{0.05}Ge_{0.05}Sb_{0.68}Te_{0.22}$. Initialization was carried out in the same manner as in Example 2 (a1). For the measurement, an optical system with a wavelength of 637 nm and NA=0.63 was used.

At a linear velocity of 3.5 m/s, EFM plus modulated signals were recorded with the shortest mark (3T mark) length of 0.4 μm. Overwriting characteristics were evaluated with the same recording pulse strategy as in Example 2 except that m=n−1, $\alpha_i+\beta_{i-1}$=1.0(2≦i≦m), $\alpha_i=\alpha_c$=constant (2≦i≦m) wherein $\alpha_1$=0.5, $\alpha_c$0.3, $\beta_m$=0.5, Pw=13.5 mW, Pe=6.0 mW and Pb=0.5 mW. Jitters were as good as 6.9%, 6.7%, 7.0% and 7.3% at the initial recording (non-overwrite), after 10 times overwrite, after 100 times overwrite and after 1,000 times overwrite, respectively.

Further, at a linear velocity of 7.0 m/s, overwriting characteristics were evaluated similarly with $\alpha_1$=0.4, $\alpha_c$=0.35, $\beta_m$=0.5, Pw=14.0 mW, Pe=7.0 mW, Pb=0.5 mW. The jitters were as good as 7.4%, 7.7%, 8.0% and 8.5% at the initial recording (non-overwrite), after 10 times overwrite, after 100 times overwrite and after 1,000 times overwrite, respectively.

As the modulation, a value of from 55 to 60% was obtained in each case.

This medium was left to stand for 1,000 hours under an accelerated test condition of 80° C./80% relative humidity. Before the test, recording was carried out. The jitter of signals recorded before the accelerated test was worsened by less than 1%. Further, as the modulation, a value of from 52 to 57% was obtained.

Example 17

As in Example 2, on a polycarbonate resin substrate having a thickness of 0.6 mm, which was provided with a groove with a pitch of 0.74 μm, a rejective layer, a second protective layer, a recording layer and a first protective layer were formed in this order as shown in FIG. 5(b).

These layers were formed by a sputtering method to a thickness of 165 nm for the reflective layer $Al_{0.995}Ta_{0.005}$, a thickness of 20 nm for the second protective layer $(ZnS)_{80}(SiO_2)_{20}$, a thickness of 16 nm for the recording layer $In_{0.03}Ge_{0.05}Sb_{0.70}Te_{0.22}$ and a thickness of 68 nm for the first protective layer $(ZnS)_{80}(SiO_2)_{20}$, respectively.

Then, against the first protective layer, a glass plate having a thickness of 0.6 mm was closely adhered. Intialization was carried out by irradiating a laser beam of about 500 mW at a linear velocity of 5 m/s through a glass substrate.

Through this glass substrate, using an optical system with a wavelength of 637 nm and NA=0.6, recording and retrieving was carried out by irradiating a laser beam to the recording layer. The recording was carried out at a side of unevenness distant from the laser beam incident side. This corresponds to the inside of groove in Example 2.

At a linear velocity of 3.5 m/s, EFM plus modulated signals with the shortest mark 3T length of 0.4 μm was carried out. With the same recording pulse strategy as in Example 2, overwriting characteristics were evaluated provided that m=n−1, $\alpha_i+\beta_{i-1}$=1.0 (2≦i≦m), $\alpha_i=\alpha_c$=constant (2≦i≦m) wherein $\alpha_1$=0.9, $\alpha_c$=0.35 and $\beta_m$=0.5, Pw=12.0 mW, Pe=6.0 mW and Pb=0.5 mW. After 10 times overwriting, the jitter was 10.5% and the modulation was 61%.

Further, at a linear velocity of 7.0 m/s, overwriting characteristics were similarly evaluated provided that $\alpha_1$=0.55, $\alpha_c$=0.40, $\beta_m$=0.5, Pw=13.0 mW, Pe=5.5 mW and Pb=0.5 mW. After 10 times overwriting, the jitter was 11.2% and the modulation was 61%.

INDUSTRIAL APPLICABILITY

According to the present invention, it is possible Ato obtain an optical information recording medium having excellent stability of the formed mark with the lapse of time, by which a high speed overwriting can be made and a high density mark length modulation recording with a small jitter of mark edge can be made.

Further, by choosing adequate recording layer composition and layer structure, it is possible to obtain a phase change recording medium which is excellent in the retrieving interchangeability with a read-only medium and high in the durability in repetitive overwriting.

More specifically, it is possible to provide an optical information recording medium which has retrieving interchangeability with a DVD disk and is one beam overwritable within a wide linear velocity range including a standard retrieving velocity of 3.5 m/s to its double velocity of 7 m/s and which shows no deterioration even after at least 10,000 times of overwriting, and an optical recording method.

Further, the medium of the present invention has a wide linear velocity margin, and even in a case where recording is carried out by rotating the medium at a constant angular velocity by a CAV system or a ZCAV system, the problem of the difference in the recording performance due to the difference in the linear velocity between the inner and outer diameter of the medium, can be overcome. If the CAV system is employed, it is not required to change the rotational speed of the disk for every radial position, and it is possible to shorten the access time.

TABLE 1

| | | Example 1 | Comparative Example 1 |
|---|---|---|---|
| Recording layer material | | $In_{0.035}Ge_{0.055}Sb_{0.70}Te_{0.21}$ | $In_{0.04}Ag_{0.05}Sb_{0.69}Te_{0.22}$ |
| Sb/Te | | 3.3 | 3.1 |
| Thickness (nm) | Lower protective layer | 68 | 74 |
| | Recording layer | 16 | 16 |
| | Upper protective layer | 20 | 20 |
| | Reflective layer | 250 | 250 |

TABLE 1-continued

|  | Example 1 | Comparative Example 1 |
|---|---|---|
| Recording optical system | 637 nm, NA = 0.63 | |
| Recording power, etc. | Pw = 13.5 mW, Pe = 6.5 mW, Pb = 0.8 mW | |
| Recording pulse strategy | $\alpha_1 = 0.5, \alpha_c = 0.3, \beta_m = 0.5$ | |
| Rtop (%) | 18.8 | 18.3 |
| Modulation (%) | 64.6 | 65.4 |
| Jitter (%) | 6.7 to 7.0% | 6.9 to 7.2% |

TABLE 2

| Linear velocity | $\alpha_1/\alpha_c/\beta_m$ | Pw/Pe (mW) | Jitter (%) |
|---|---|---|---|
| 1.0 × (3.5 m/s) | 0.6 T/0.35 T/0.5 T | 13.5 mW/7.0 mW | 5.95 |
| 1.5 × (5.2 m/s) | 0.4 T/0.35 T/0.5 T | 13.5 mW/7.0 mW | 6.31 |
| 2.0 × (7.0 m/s) | 0.4 T/0.4 T/0.5 T | 13.5 mW/7.0 mW | 7.57 |
| 2.4 × (8.4 m/s) | 0.5 T/0.4 T/0.5 T | 13.0 mW/7.0 mW | 8.81 |

TABLE 3

| Ex. 2 | Lower protective layer (nm) | Recording layer (nm) | Upper protective layer (nm) | Reflective layer (nm) | Recording pulse strategy $\alpha_1$ | $\alpha_c$ | $\beta_{n-1}$ | Pw (mW) | Pe (mW) | Rtop (%) | Modulation (%) | Jitter after 1st recording (%) | Jitter after 10 times of DOW (%) | Jitter after 100 times of DOW (%) |
|---|---|---|---|---|---|---|---|---|---|---|---|---|---|---|
| (a1) | 64 | 18 | 20 | 200 | 0.5 | 0.4 | 0.5 | 14 | 7 | 17 | 61 | 6.9 | 7.9 | 8.7 |
| (b1) | 64 | 18 | 20 | 200 | 0.5 | 0.4 | 0.5 | 14 | 7 | 18 | 60 | 7.1 | 8.3 | 8.9 |
| (c1) | 64 | 20 | 20 | 200 | 0.5 | 0.4 | 0.5 | 14 | 7 | 16 | 57 | 7.6 | 9.8 | 9.8 |
| (d1) | 64 | 16 | 30 | 200 | 0.3 | 0.3 | 0.6 | 13.5 | 6.7 | 15 | 65 | 8.2 | 9.3 | 10.2 |
| (e1) | 64 | 18 | 30 | 200 | 0.3 | 0.3 | 0.6 | 13.5 | 6.7 | 16 | 62 | 8.2 | 9.9 | 10.5 |
| (f1) | 64 | 20 | 30 | 200 | 0.3 | 0.3 | 0.6 | 13.5 | 6.7 | 17 | 60 | 8.2 | 11.1 | 11.6 |
| (a2) | 64 | 16 | 40 | 200 | 0.3 | 0.25 | 0.9 | 12 | 6 | 12 | 54 | >13 | >13 | >13 |
| (b2) | 64 | 18 | 40 | 200 | 0.3 | 0.25 | 1.3 | 12.5 | 6.2 | 14 | 51 | >13 | >13 | >13 |
| (c2) | 64 | 20 | 40 | 200 | 0.3 | 0.25 | 1.3 | 13.5 | 6.7 | 15 | 50 | >13 | >13 | >13 |
| (g1) | 64 | 16 | 20 | 250 | 0.5 | 0.4 | 0.5 | 14 | 7 | 17 | 61 | 6.9 | 7.5 | 7.4 |
| (h1) | 64 | 18 | 20 | 250 | 0.5 | 0.4 | 0.6 | 14 | 7 | 18 | 61 | 6.9 | 7.8 | 7.9 |
| (i1) | 64 | 20 | 20 | 250 | 0.5 | 0.4 | 0.6 | 14 | 7 | 19 | 59 | 6.8 | 8.7 | 8.8 |
| (j1) | 64 | 16 | 30 | 250 | 0.3 | 0.3 | 0.6 | 13.5 | 6.7 | 14 | 66 | 7.5 | 8.9 | 9.8 |
| (k1) | 64 | 18 | 30 | 250 | 0.3 | 0.3 | 0.6 | 13.5 | 6.7 | 15 | 65 | 7.1 | 9 | 9.6 |
| (l1) | 64 | 20 | 30 | 250 | 0.3 | 0.3 | 0.6 | 13.5 | 6.7 | 16 | 59 | 7.3 | 10.6 | 11.6 |
| (d2) | 64 | 16 | 40 | 250 | 0.3 | 0.25 | 0.8 | 12.5 | 6.2 | 12 | 61 | >13 | >13 | >13 |
| (e2) | 64 | 18 | 40 | 250 | 0.3 | 0.25 | 0.6 | 13.5 | 6.7 | 14 | 61 | 10.9 | >13 | >13 |
| (f2) | 64 | 20 | 40 | 250 | 0.3 | 0.25 | 1.3 | 13 | 6.5 | 15 | 54 | >13 | >13 | >13 |
| (m1) | 58 | 18 | 20 | 200 | 0.5 | 0.4 | 0.5 | 14 | 7 | 18 | 61 | 6.6 | 8.2 | 9.1 |
| (n1) | 58 | 20 | 20 | 200 | 0.6 | 0.4 | 0.5 | 14 | 7 | 19 | 59 | 8.2 | 10.1 | 10.6 |
| (o1) | 58 | 18 | 30 | 200 | 0.3 | 0.3 | 0.8 | 12 | 6 | 16 | 58 | 8.9 | 11.7 | 13 |
| (g2) | 58 | 18 | 40 | 200 | 0.3 | 0.25 | 1.3 | 12.5 | 6.2 | 14 | 53 | >13 | >13 | >13 |
| (p1) | 70 | 16 | 20 | 200 | 0.5 | 0.4 | 0.5 | 14 | 7 | 17 | 58 | 7.2 | 7.9 | 8.3 |
| (q1) | 70 | 18 | 30 | 200 | 0.5 | 0.4 | 0.5 | 14 | 7 | 18 | 60 | 6.7 | 7.8 | 8.3 |
| (r1) | 70 | 20 | 40 | 200 | 0.5 | 0.4 | 0.5 | 14 | 7 | 19 | 57 | 6.9 | 8.5 | 9 |
| (s1) | 70 | 23 | 20 | 200 | 0.5 | 0.35 | 0.5 | 14 | 7 | 24 | 59 | 9 | 9.7 | 10.5 |
| (h2) | 70 | 30 | 20 | 200 | 0.5 | 0.35 | 0.7 | (14) | (7) | 27 | 50 | >13 | >13 | >13 |
| (i2) | 45 | 18 | 20 | 200 | 0.5 | 0.4 | 0.5 | 14 | 7 | 19 | 60 | 7.2 | 10.5 | >13 |

TABLE 4

| Ex. 3 | Lower protective layer (nm) | Recording layer (nm) | Upper protective layer (nm) | Reflective layer (nm) | Recording pulse strategy $\alpha_1$ | $\alpha_c$ | $\beta_{n-1}$ | Pw (mW) | Pe (mW) | Rtop (%) | Modulation (%) | Jitter after 1st recording (%) | Jitter after 10 times of DOW (%) | Jitter after 100 times of DOW (%) |
|---|---|---|---|---|---|---|---|---|---|---|---|---|---|---|
| (a) | 64 | 18 | 20 | 200 | 0.4 | 0.4 | 0.4 | 14 | 7 | 17 | 61 | 8.7 | 9.3 | 9.2 |
| (b) | 64 | 18 | 20 | 200 | 0.4 | 0.4 | 0.4 | 14 | 7 | 18 | 60 | 8.9 | 9 | 9 |
| (c) | 64 | 20 | 20 | 200 | 0.5 | 0.4 | 0.4 | 14 | 7 | 18 | 62 | 7.9 | 8.8 | 9.1 |
| (d) | 64 | 16 | 30 | 200 | 0.3 | 0.35 | 0.5 | 11.5 | 5.7 | 15 | 62 | 8 | 9.3 | 9.7 |
| (e) | 64 | 18 | 30 | 200 | 0.3 | 0.35 | 0.6 | 12 | 6 | 16 | 62 | 8.4 | 9.6 | 10.6 |
| (f) | 64 | 20 | 30 | 200 | 0.3 | 0.35 | 0.6 | 12.5 | 6.2 | 16 | 59 | 8.1 | 10.4 | 11.1 |
| (g) | 64 | 18 | 40 | 200 | 0.3 | 0.25 | 0.9 | 11 | 5.5 | 12 | 55 | >13 | >13 | >13 |

TABLE 4-continued

| Ex. 3 | Lower protective layer (nm) | Recording layer (nm) | Upper protective layer (nm) | Reflective layer (nm) | Recording pulse strategy $\alpha_1$ | $\alpha_c$ | $\beta_{n-1}$ | Pw (mW) | Pe (mW) | Rtop (%) | Modulation (%) | Jitter after 1st recording (%) | Jitter after 10 times of DOW (%) | Jitter after 100 times of DOW (%) |
|---|---|---|---|---|---|---|---|---|---|---|---|---|---|---|
| (h) | 64 | 18 | 40 | 200 | 0.3 | 0.25 | 1.3 | 12 | 6 | 14 | 52 | >13 | >13 | >13 |
| (i) | 64 | 20 | 40 | 200 | 0.3 | 0.25 | 1.3 | 12 | 6 | 14.5 | 51 | >13 | >13 | >13 |

TABLE 5

| | Jitter (%) | | | |
|---|---|---|---|---|
| $\beta_m$ | 2.25-times velocity | 2.0-times velocity | 1.5-times velocity | 1-time velocity |
| 0 | 10.2 | 11.9 | 14.8 | 18.4 |
| 0.1 | 9.7 | 10.6 | 11.4 | 12.5 |
| 0.2 | 9.8 | 8.9 | 9.0 | 10.0 |
| 0.3 | 11.2 | 9.5 | 8.4 | 8.9 |
| 0.4 | 12.5 | 10.3 | 8.2 | 8.7 |
| 0.5 | 13.7 | 11.1 | 8.3 | 8.7 |
| 0.6 | >13 | >13 | 8.7 | 8.7 |
| 0.7 | >13 | >13 | >13 | 9.5 |

TABLE 6

| | Recording linear velocity (m/s) | $\alpha_1$ | $\alpha_c$ | Pw | Pe | Minimum jitter (%) |
|---|---|---|---|---|---|---|
| Example 9(a) $Ge_{0.05}Sb_{0.73}Te_{0.22}$ | 3.5 | 0.7 | 0.35 | 13.5 | 6.0 | 6.0 |
|  | 7.0 | 0.5 | 0.4 | 13.5 | 7.0 | 8.1 |
| Example 9(b) $Ge_{0.067}Sb_{0.717}Te_{0.216}$ | 3.5 | 0.6 | 0.35 | 13.5 | 6.5 | 6.2 |
|  | 7.0 | 0.4 | 0.4 | 13.0 | 6.5 | 8.2 |
| Example 9(c) $Ge_{0.098}Sb_{0.693}Te_{0.209}$ | 3.5 | 0.4 | 0.3 | 13.5 | 6.5 | 6.6 |
|  | 7.0 | 0.3 | 0.3 | 14.0 | 6.5 | 9.9 |
| Comparative Example 7 $Ge_{0.115}Sb_{0.68}Te_{0.205}$ | 3.5 | 0.4 | 0.3 | 13.0 | 6.5 | 8.1 |
|  | 7.0 | 0.3 | 0.3 | 14.0 | 8.5 | 14.1 |

TABLE 7

| | Groove depth (nm) | Groove width (μm) |
|---|---|---|
| Example 11 (a) | 27 | 0.27 |
| Example 11 (b) | 27 | 0.33 |
| Example 11 (c) | 27 | 0.42 |
| Example 11 (d) | 35 | 0.27 |
| Example 11 (e) | 35 | 0.33 |
| Example 11 (f) | 35 | 0.42 |
| Example 11 (g) | 35 | 0.23 |
| Example 11 (h) | 42 | 0.27 |
| Example 11 (i) | 42 | 0.33 |
| Example 11 (j) | 42 | 0.42 |
| Example 11 (k) | 18 | 0.27 |

TABLE 8

| | Jitter (%) 3.5 m/s | Jitter (%) 7 m/s |
|---|---|---|
| Example 11 (a) | 6.49 | 7.80 |
| Example 11 (b) | 5.97 | 7.62 |
| Example 11 (c) | 5.52 | 7.35 |
| Example 11 (d) | 7.26 | 8.42 |
| Example 11 (e) | 6.85 | 8.39 |
| Example 11 (f) | 6.05 | 7.84 |
| Example 11 (g) | 7.70 | 8.90 |
| Example 11 (h) | 9.14 | 10.49 |
| Example 11 (i) | 7.66 | 10.01 |
| Example 11 (j) | 6.59 | 9.01 |
| Example 11 (k) | Not measurable | |

TABLE 9

| Band | Radius (mm) First end of the band | Radius (mm) Final end of the band | Radius at the center of the band | Circumferential length at the center of the band (mm) | Total number of channel bits at the center of the band | Difference in the channel bit length between the first end and the center of the band Bit length in the first end track | Error (nm) | Error (%) | Difference in the channel bit length between the final end and the center of the band Bit length in the final end track | Error (nm) | Error (%) | Number of tracks at the final end of the band | Wobble frequency in each band (MHz) |
|---|---|---|---|---|---|---|---|---|---|---|---|---|---|
| 0 | 22.5000 | 22.6413 | 22.57067 | 141.8157 | 1063530 | 132.9268 | −0.4065 | −0.305% | 133.7618 | 0.4285 | 0.321% | 190 | 2.9067 |
| 1 | 22.6413 | 22.7827 | 22.71201 | 142.70377 | 1070010 | 132.9518 | −0.3815 | −0.286% | 133.7818 | 0.4484 | 0.336% | 381 | 2.9249 |

TABLE 9-continued

| Band | Radius (mm) First end of the band | Radius (mm) Final end of the band | Radius at the center of the band | Circum-ferential length at the center of the band (mm) | Total number of channel bits at the center of the band | Difference in the channel bit length between the first end and the center of the band | | | Difference in the channel bit length between the final end and the center of the band | | | Number of tracks at the final end of the band | Wobble frequency in each band (MHz) |
|---|---|---|---|---|---|---|---|---|---|---|---|---|---|
| | | | | | | Bit length in the first end track | Error (nm) | Error (%) | Bit length in the final end track | Error (nm) | Error (%) | | |
| 2 | 22.7827 | 22.9240 | 22.85335 | 143.59183 | 1077300 | 132.8765 | −0.4568 | −0.343% | 133.7008 | 0.3675 | 0.276% | 572 | 2.9431 |
| 3 | 22.9240 | 23.0654 | 22.99469 | 144.4799 | 1083780 | 132.9014 | −0.4319 | −0.324% | 133.7208 | 0.3875 | 0.291% | 763 | 2.9613 |
| 4 | 23.0654 | 23.2067 | 23.13603 | 145.36796 | 1090260 | 132.926 | −0.4073 | −0.305% | 133.7406 | 0.4073 | 0.305% | 954 | 2.9795 |
| 5 | 23.2067 | 23.3480 | 23.27737 | 146.25603 | 1096740 | 132.9504 | −0.3829 | −0.287% | 133.7601 | 0.4268 | 0.320% | 1145 | 2.9977 |
| 6 | 23.3480 | 23.4894 | 23.41871 | 147.14409 | 1103220 | 132.9744 | −0.3589 | −0.269% | 133.7794 | 0.4461 | 0.335% | 1336 | 3.0159 |
| 7 | 23.4894 | 23.6307 | 23.56005 | 148.03216 | 1110510 | 132.9012 | −0.4321 | −0.324% | 133.7009 | 0.3676 | 0.276% | 1527 | 3.0341 |
| 8 | 23.6307 | 23.7721 | 23.70139 | 148.92023 | 1116990 | 132.9253 | −0.4080 | −0.306% | 133.7203 | 0.3870 | 0.290% | 1718 | 3.0523 |
| 9 | 23.7721 | 23.9134 | 23.84273 | 149.80829 | 1123470 | 132.949 | −0.3843 | −0.288% | 133.7395 | 0.4062 | 0.305% | 1909 | 3.0705 |
| 10 | 23.9134 | 24.0547 | 23.98407 | 150.69636 | 1129950 | 132.9725 | −0.3608 | −0.271% | 133.7585 | 0.4252 | 0.319% | 2100 | 3.0887 |
| ↓ | | | | | | | | | | | | | |
| 100 | 36.6340 | 36.7753 | 36.70467 | 230.62224 | 1729350 | 133.101 | −0.2323 | −0.174% | 133.6145 | 0.2812 | 0.211% | 19290 | 4.7269 |
| 101 | 36.7753 | 36.9167 | 36.84601 | 231.51031 | 1736640 | 133.0536 | −0.2797 | −0.210% | 133.565 | 0.2317 | 0.174% | 19481 | 4.7451 |
| 102 | 36.9167 | 37.0580 | 36.98735 | 232.39837 | 1743120 | 133.0685 | −0.2646 | −0.199% | 133.578 | 0.2447 | 0.183% | 19672 | 4.7633 |
| 103 | 37.0580 | 37.1994 | 37.12869 | 233.28644 | 1749600 | 133.0832 | −0.2501 | −0.188% | 133.5908 | 0.2575 | 0.193% | 19863 | 4.7815 |
| 104 | 37.1994 | 37.3407 | 37.27003 | 234.1745 | 1756080 | 133.0978 | −0.2355 | −0.177% | 133.6036 | 0.2703 | 0.203% | 20054 | 4.7997 |
| 105 | 37.3407 | 37.4820 | 37.41137 | 235.06257 | 1763370 | 133.0512 | −0.2821 | −0.212% | 133.5548 | 0.2215 | 0.166% | 20245 | 4.8179 |
| 106 | 37.4820 | 37.6234 | 37.55271 | 235.95064 | 1769850 | 133.0659 | −0.2674 | −0.201% | 133.5676 | 0.2343 | 0.176% | 20436 | 4.8361 |
| 107 | 37.6234 | 37.7647 | 37.69405 | 236.8387 | 1776330 | 133.0804 | −0.2529 | −0.190% | 133.5803 | 0.2470 | 0.185% | 20627 | 4.8543 |
| 108 | 37.7647 | 37.9061 | 37.83539 | 237.72677 | 1782810 | 133.0943 | −0.2385 | −0.179% | 133.5929 | 0.2596 | 0.195% | 20818 | 4.8725 |
| 109 | 37.9061 | 38.0474 | 37.97673 | 238.61483 | 1789290 | 133.1091 | −0.2242 | −0.168% | 133.6054 | 0.2721 | 0.204% | 21009 | 4.8907 |
| 110 | 38.0474 | 38.1887 | 38.11807 | 239.5029 | 1796580 | 133.0633 | −0.2700 | −0.203% | 133.5576 | 0.2243 | 0.168% | 21200 | 4.9089 |
| ↓ | | | | | | | | | | | | | |
| 200 | 50.7680 | 50.9093 | 50.83867 | 319.42878 | 2395980 | 133.1333 | −0.2000 | −0.150% | 133.504 | 0.1707 | 0.128% | 38390 | 6.547 |
| 201 | 50.9093 | 51.0507 | 50.98001 | 320.31685 | 2402460 | 133.1439 | −0.1894 | −0.142% | 133.5135 | 0.1802 | 0.135% | 38581 | 6.5652 |
| 202 | 51.0507 | 51.1920 | 51.12135 | 321.20492 | 2408940 | 133.1544 | −0.1789 | −0.134% | 133.523 | 0.1897 | 0.142% | 38772 | 6.5834 |
| 203 | 51.1920 | 51.3334 | 51.26269 | 322.09298 | 2415420 | 133.1648 | −0.1685 | −0.126% | 133.5325 | 0.1992 | 0.149% | 38963 | 6.6016 |
| 204 | 51.3334 | 51.4747 | 51.40403 | 322.98105 | 2422710 | 133.1307 | −0.2026 | −0.152% | 133.4972 | 0.1639 | 0.123% | 39154 | 6.6198 |
| 205 | 51.4747 | 51.6160 | 51.54537 | 323.86911 | 2429190 | 133.1411 | −0.1922 | −0.144% | 133.5067 | 0.1734 | 0.130% | 39345 | 6.636 |
| 206 | 51.6160 | 51.7574 | 51.68671 | 324.75718 | 2435670 | 133.1515 | −0.1818 | −0.136% | 133.5161 | 0.1828 | 0.137% | 39536 | 6.6563 |
| 207 | 51.7574 | 51.8987 | 51.82805 | 325.64524 | 2442150 | 133.1618 | −0.1715 | −0.129% | 133.5255 | 0.1922 | 0.144% | 39727 | 6.6745 |
| 208 | 51.8987 | 51.0401 | 51.96939 | 326.53331 | 2448630 | 133.1721 | −0.1612 | −0.121% | 133.5348 | 0.2015 | 0.151% | 39918 | 6.6927 |
| 209 | 52.0401 | 52.1814 | 52.11073 | 327.42137 | 2455920 | 133.1384 | −0.1949 | −0.146% | 133.5 | 0.1667 | 0.125% | 40109 | 6.7108 |
| 210 | 52.1814 | 52.3227 | 52.25207 | 328.30944 | 2462400 | 133.1487 | −0.1846 | −0.138% | 133.5094 | 0.1761 | 0.132% | 40300 | 6.7291 |
| ↓ | | | | | | | | | | | | | |
| 245 | 57.1283 | 57.2696 | 57.19897 | 359.39173 | 2695680 | 133.1566 | −0.1767 | −0.132% | 133.4861 | 0.1528 | 0.115% | 46985 | 7.3661 |
| 246 | 57.2696 | 57.4110 | 57.34031 | 360.27979 | 2702160 | 133.166 | −0.1673 | −0.125% | 133.4946 | 0.1613 | 0.121% | 47176 | 7.3843 |
| 247 | 57.4110 | 57.5523 | 57.48165 | 361.67862 | 708640 | 133.1753 | −0.1580 | −0.119% | 133.5031 | 0.1695 | 0.127% | 47367 | 7.4025 |
| 248 | 57.5523 | 57.6937 | 57.62299 | 362.05592 | 2715120 | 133.1845 | −0.1488 | −0.112% | 133.5116 | 0.1783 | 0.134% | 47553 | 7.4207 |
| 249 | 57.6937 | 57.8350 | 57.76433 | 362.94399 | 2722410 | 133.1541 | −0.1792 | −0.134% | 133.4803 | 0.1470 | 0.110% | 47749 | 7.4389 |
| 250 | 57.8350 | 57.9763 | 57.90567 | 363.83205 | 2728890 | 133.1633 | −0.1700 | −0.127% | 133.4887 | 0.1554 | 0.117% | 47940 | 7.4571 |
| 251 | 57.9763 | 58.1177 | 58.04701 | 364.72012 | 2735370 | 133.1725 | −0.1608 | −0.121% | 133.4972 | 0.1639 | 0.123% | 48131 | 7.4753 |
| 252 | 58.1177 | 58.2590 | 58.16835 | 365.60819 | 2741850 | 133.1817 | −0.1516 | −0.114% | 133.5056 | 0.1723 | 0.129% | 48322 | 7.4935 |
| 253 | 58.2590 | 58.4004 | 58.32969 | 366.49625 | 2748320 | 133.1908 | −0.1425 | −0.107% | 133.5139 | 0.1806 | 0.135% | 48513 | 7.5117 |
| 254 | 58.4004 | 58.5417 | 58.47103 | 367.38432 | 2755620 | 133.1607 | −0.1726 | −0.129% | 133.483 | 0.1497 | 0.112% | 48704 | 7.5299 |

What is claimed is:

1. An optical information recording medium for recording information by a plurality of record mark lengths, wherein the shortest mark length is at most 0.5 μm, and a crystal state is an unrecorded or erased state and an amorphous state is a recorded state, which has, on a substrate, at least a phase change recording layer, wherein erasing of information is made by recrystallization which substantially proceeds by crystal growth from a boundary between a peripheral crystal portion and an amorphous portion or a melt portion and wherein the phase change recording layer is made of a thin film comprising Ge, Sb and Te as main components.

2. An optical information recording medium for recording information by a plurality of record mark lengths, wherein the shortest mark length is at most 0.5 μm, and a crystal state is an unrecorded or erased state and an amorphous state is a recorded state, which has, on a substrate, a phase change recording layer which is made of a thin film comprising Ge, Sb and Te as main components, wherein said medium will be crystallized when the recording layer is continuously irradiated at a constant linear velocity with a recording laser beam having a writing power Pw sufficient to melt the recording layer, and an amorphous mark will be formed when the recording layer is irradiated at a constant linear velocity with a recording laser beam having a writing power Pw sufficient to melt the recording layer, and then the recording laser beam is cut off, and wherein when recording of signals is carried out by a plurality of record mark lengths of which the shortest mark length is at most 0.5 μm, the recording is made under the following condition:

$$M_1/M_0 \geq 0.9$$

wherein $M_0$ represents a modulation of signals retrieved immediately after the recording, and $M_1$ represents a modulation of signals retrieved after the recording medium is kept for 1,000 hours under a condition of 80° C. and 80% relative humidity after the recording.

3. The optical information recording medium according to claim 1, wherein when recording of random signals of EFM plus modulation system is carried out by a plurality of record mark lengths of which the shortest mark length is at most 0.4 μm, the recording is made under the following condition:

$$M_1/M_0 \geq 0.9$$

wherein $M_0$ represents a modulation of signals retrieved immediately after the recording, and $M_1$ represents a modulation of signals retrieved after the recording medium is kept for 1,000 hours under a condition of 80° C. and 80% relative humidity after the recording.

4. An optical information recording medium for recording information by a plurality of record mark lengths, which comprises a substrate, and a first protective layer, a phase change recording layer, a second protective layer and a reflective layer, formed on the substrate sequentially from the incident direction of a recording or retrieving laser beam, wherein the shortest mark length is at most 0.5 μm, and a crystal state is an unrecorded or erased state and an amorphous state is a recorded state, wherein the phase change recording layer is made of a thin film having a thickness of from 5 nm to 25 nm and comprising, as a main component, a GeSbTe alloy having a composition represented by a region (except for the boundary lines) defined by four linear lines, i.e. linear line A connecting ($Sb_{0.7}Te_{0.3}$) and Ge, linear line B connecting ($Ge_{0.03}Sb_{0.68}Te_{0.29}$) and ($Sb_{0.95}Ge_{0.05}$), linear line C connecting ($Sb_{0.9}Ge_{0.1}$) and ($Te_{0.9}Ge_{0.1}$) and linear line D connecting ($Sb_{0.8}Te_{0.2}$) and Ge, in the GeSbTe ternary phase diagram, and the second protective layer has a thickness of from 5 nm to 30 nm and wherein the reflective layer has a thickness of from 40 nm to 300 nm and a volume resistivity of from 20 nΩ·m to 150 nΩ·m.

5. The optical information medium according to claim 4, wherein the recording layer is made of a thin film comprising, as a main component, a GeSbTe alloy having a composition represented by a region (except for the boundary lines) defined by four linear lines, i.e. linear line A connecting ($Sb_{0.7}Te_{0.3}$) and Ge, linear line B' connecting ($Ge_{0.03}Sb_{0.68}Te_{0.29}$) and ($Sb_{0.9}Ge_{0.1}$), linear line C connecting ($Sb_{0.9}Ge_{0.1}$) and ($Te_{0.9}Ge_{0.1}$) and linear line D connecting ($Sb_{0.8}Te_{0.2}$) and Ge, in the GeSbTe ternary phase diagram.

6. The optical information recording medium according to claim 4, wherein the recording layer is made of a thin film comprising, as a main component, a $Ge_x(Sb_yTe_{1-y})_{1-x}$ alloy, wherein $0.04 \leq x < 0.10$ and $0.72 \leq y < 0.8$.

7. The optical information recording medium according to claim 4, wherein the recording layer is made of a thin film comprising, as a main component, a $Ge_x(Sb_yTe_{1-y})_{1-x}$ alloy, wherein $0.045 \leq x \leq 0.075$ and $0.74 \leq y < 0.8$.

8. The optical information recording medium according to claim 4, wherein the recording layer further contains at least one element selected from the group consisting of O, N and S, and the total content of such elements is from 0.1 atomic % to 5 atomic %.

9. The optical information recording medium according to claim 4, wherein the recording layer further contains at least one element selected from the group consisting of V, Nb, Ta, Cr, Co, Pt and Zr, and the total content of such elements is at most 8 atomic %, and the total content of such elements and Ge is at most 15 atomic %.

10. The optical information recording medium according to claim 4, wherein the recording layer further contains at least one element selected from the group consisting of Al, In and Ga, and the total content of such elements is at most 8 atomic %, and the total content of such elements and Ge is at most 15 atomic %.

11. The optical information recording medium according to any one of claims 4 to 7, wherein the recording layer has a thickness of from 10 nm to 20 nm.

12. The optical information recording medium according to any one of claims 4 to 7, wherein the second protective layer has a thickness of from 10 nm to 25 nm.

13. The optical information recording medium according to any one of claims 4 to 7, which is a medium for recording or retrieving information by applying a recording or retrieving laser beam through the substrate, and wherein the first protective layer has a thickness of at least 50 nm.

14. The optical information recording medium according to claim 4, wherein the reflective layer has a thickness of from 150 nm to 300 nm and is made of an Al alloy containing from 0.2 atomic % to 2 atomic % of at least one member selected from the group consisting of Ta, Ti, Co, Cr, Si, Sc, Hf, Pd, Pt, Mg, Zr, Mo and Mn.

15. The optical information recording medium according to claim 4, wherein the reflective layer has a thickness of from 40 nm to 150 nm and is made of a Ag alloy containing from 0.2 atomic % to 5 atomic % of at least one member selected from the group consisting of Ti, V, Ta, Nb, W, Co, Cr, Si, Ge, Sn, Sc, Hf, Pd, Rh, Au, Pt, Mg, Zr, Mo and Mn.

16. The optical information recording medium according to any one of claims 4 to 7, wherein the reflective layer is a multilayer reflective layer made of a plurality of metal films and at least 50% of the total thickness of the multilayer reflective layer has a volume resistivity of from 20 nΩ·m to 150 nΩ·m.

17. The optical information recording medium according to any one of claim 4, 14 or 15, wherein an interfacial layer having a thickness of from 5 nm to 100 nm is formed between the second protective layer and the reflective layer.

18. The optical information recording medium according to claim 4, wherein an interfacial layer having a thickness of from 1 nm to 100 nm is formed between the second protective layer and the reflective layer, the interfacial layer is made of an Al alloy containing from 0.2 atomic % to 2 atomic % of at least one member selected from the group consisting of Ta, Ti, Co, Cr, Si, Sc, Hf, Pd, Pt, Mg, Zr, Mo and Mn, and the reflective layer is made of Ag or a Ag alloy containing from 0.2 atomic % to 5 atomic % of at least one member selected from the group consisting of Ti, V, Ta, Nb, W, Co, Cr, Si, Ge, Sn, Sc, Hf, Pd, Rh, Au, Pt, Mg, Zr, Mo and Mn.

19. The optical information recording medium according to claim 18, wherein a layer made of an oxide of the above Al alloy and/or Ag alloy, is present between the interfacial layer and the reflective layer, and the thickness of the oxide layer is from 1 nm to 10 nm.

20. The optical information recording medium according to any one of claims 4–7 or 14–15, wherein the substrate has a groove for recording the information, with a pitch of at most 0.8 μm.

21. The optical information recording medium according to claim 20, which is a medium for recording data only in the groove, wherein the depth of the groove is within a range of from $\lambda/(20\,n)$ to $\lambda/(10\,n)$, where $\lambda$ is the wavelength of the retrieving laser beam, and n is the refractive index of the substrate at the wavelength.

22. The optical information recording medium according to claim 21, which is a medium for recording or retrieving data by focusing a laser beam having a wavelength of from 630 to 670 nm on the recording layer through the substrate by an object lens having a numerical aperture NA of from 0.6 to 0.65, wherein the groove has a groove pitch of from 0.6 to 0.8 μm, a groove depth of from 25 to 40 nm and a groove width of from 0.25 to 0.5 μm, and the groove is wobbling with a period which is from 30 to 40 times the reference clock period T of data, the amplitude of the wobbling (peak-to-peak) being from 40 to 80 nm.

23. The optical information recording medium according to claim 20, which is a medium for recording data both in the groove and on the land, wherein the groove is present on the substrate, the depth of the groove is from $\lambda/(7n)$ to $\lambda/(5n)$ or from $\lambda/(3.5\,n)$ to $\lambda/(2.5\,n)$, where $\lambda$ is the wavelength of the retrieving laser beam, and n is the refractive index of the substrate at the wavelength, both the groove width GW and the land width LW are from 0.2 μm to 0.4 μm, and the ratio of GW/LW is from 0.8 to 1.2.

24. The optical information recording medium according to any one of claims 1, 2 and 4, wherein a recording laser beam having an erasing power Pe capable of crystallizing amorphous phase is applied between record marks, and when the time length of one record mark is represented by nT (wherein T is the reference clock period, and n is an integer of at least 2), the time length nT of the record mark is divided in the order of:

$\eta_1 T$, $\alpha_1 T$, $\beta_1 T$ $\alpha_2 T$, $\beta_2 T$, . . . ,
$\alpha_i T$, $\beta_i T$, . . . , $\alpha_m T$, $\beta_m T$, $\eta_2 T$ wherein m is a pulse dividing number, and m=n−k, where k is an integer of $0 \leq k \leq 2$, $\Sigma_i(\alpha_i+\beta_i)+\eta_1+\eta_2=n$, $\eta_1$ is a real number of $\eta_1 \geq 0$, $\eta_2$ is a real number of $\eta_2 \geq 0$, provided $0 \leq \eta_1+\eta_2 \leq 2.0$, $\alpha_i(1 \leq i \leq m)$ is a real number of $\alpha_i > 0$, $\beta_i(1 \leq i \leq m)$ is a real number of $\beta_i > 0$, $\Sigma\alpha_i < 0.5n$, $\alpha_1=0.1$ to 1.5, $\beta_i=0.3$ to 1.0, $\beta m=0$ to 1.5, $\alpha_i=0.1$ to 0.8 $(2 \leq i \leq m)$, and when i is $3 \leq i \leq m$, $\alpha_i+\beta_{i-1}$ is within a range of from 0.5 to 1.5 and is constant irrespective of i, a recording laser beam having a writing power Pw of Pw≧Pe, sufficient to melt the recording layer, is applied within the time of $\alpha_i T$ $(1 \leq i \leq m)$, and a recording laser beam having a bias power Pb of $0<Pb \leq 0.2Pe$ is applied within the time of $\beta_i T(1 \leq i \leq m)$ (provided that within $\beta_m T$, the bias power may be $0<Pb \leq Pe$).

25. The optical information recording medium according to claim 24, whereby when recording or retrieving of data is carried out by focusing a laser beam having a wavelength of from 350 to 680 nm on the recording layer through an object lens having a numerical aperture of from 0.55 to 0.9, the recording is carried out under the following conditions:

m=n−1 or m=n−2,
$\alpha_1=0.3$ to 1.5,
$\alpha_1\alpha_i=0.2$ to 0.8 $(2 \leq i \leq m)$,
$\alpha_i+\beta_{i-1}=1.0$ $(3 \leq i \leq m)$,
$0<Pb \leq 1.5$ (mW),
$0.3 \leq Pe/Pw \leq 0.6$.

26. The optical information recording medium according to claim 24, whereby when recording or retrieving of data is carried out by focusing a laser beam having a wavelength of from 600 to 680 nm on the recording layer through the substrate by an object lens having a numerical aperture of from 0.55 to 0.65, with the shortest mark length being within a range of from 0.35 to 0.45 μm, the recording is carried out under the following conditions:

n is an integer of from 1 to 14,
m=n−1,
Pb is constant irrespective of the linear velocity,
Pe/Pw is changeable depending upon the linear velocity within a range of from 0.4 to 0.6, (i) within a linear velocity of from 3 to 4 m/s, the reference clock period T is To,
$\alpha_i=0.3$ to 0.8,
$\alpha_1 \leq \alpha_i=0.2$ to 0.4 and is constant irrespective of i $(2 \leq i \leq m)$,
$\alpha_2+\beta_1 \geq 1.0$,
$\alpha_i+\beta_{i-1}=1.0(3 \leq i \leq m)$,
$\beta_m=0.3$ to 1.5, and
a recording laser beam having a writing power Pw1 is irradiated within the time of $\alpha_i T(1 \leq i \leq m)$, (ii) within a linear velocity of from 6 to 8 m/s,
the reference clock period T is To/2,
$\alpha'_1=0.3$ to 0.8,
$\alpha'_1 \leq \alpha'_i=0.3$ to 0.5 and is constant irrespective of i $(2 \leq i \leq m)$
$\alpha'_i+\beta'_{i-1}=1.0$ $(3 \leq i \leq m)$,
$\beta'_m=0$ to 1.0, and
a recording laser beam having a writing power Pw2 is irradiated within the time of $\alpha_i T(1 \leq i \leq m)$, wherein $\alpha'_1 > \alpha_i$ $(2 \leq i \leq m)$, and $0.8 \leq Pw1/Pw2 < 1.2$.

27. The optical information recording medium according to claim 24, having a predetermined record region, whereby recording is carried out by rotating the medium at a constant angular velocity so that the linear velocity at the inner-most diameter of the record region will be from 2 to 4 m/s, and the linear velocity at the outer-most diameter of the record region will be from 6 to 10 m/s, wherein the record region comprises a plurality of radially divided zones, and when recording is carried out by changing the reference clock period T so that the recording density becomes substantially constant depending upon the average linear velocity within each zone, m is made constant irrespective of the zone, and Pb/Pe and/or $\alpha_i$ (where i is at least one of $1 \leq i \leq m$) is simply decreased from the outer zone towards the inner zone.

28. The optical information recording medium according to claim 27, wherein the record region is radially divided into p zones, and when the inner-most diameter side is referred to as the first zone, the outer-most diameter side is referred to as the p-th zone, and in the q-th zone (wherein q is an integer of $1 \leq q \leq p$), the angular velocity is represented by $\omega_q$, the average linear velocity is represented by $<V_q>_{ave}$, the maximum linear velocity is represented by $<V_q>_{max}$, the minimum linear velocity is represented by $<V_q>_{min}$, the reference clock period is represented by $T_q$, and the time length of the shortest mark is represented by $n_{min}T_q$, $<V_p>_{ave}/<V_1>_{ave}$ is within a range of from 1.2 to 3, and
$<V_q>_{max}/<V_q>_{min}$ is at most 1.5, (i) within the same zone, $\omega_q$, $T_q$, $\alpha_i$, $\beta_i$, Pe, Pb and Pw are constant, the physical length $n_{min}T_q<V_q>_{ave}$ of the shortest mark is at most 0.5 μm, $T_q<V_q>_{ave}$ is substantially constant with respect to all q of $1 \leq q \leq p$, and
m=n−1 or m=n−2,
$\alpha_1=0.3$ to 1.5,
$\alpha_1 \leq \alpha_i=0.2$ to 0.8 $(2 \leq i \leq m)$,
$\alpha_i\beta_{i-1}=1.0$ $(3 \leq i \leq m)$,
$0 \leq Pb \leq 1.5$ (mW),
$0.4 \leq Pe/Pw \leq 0.6$, and (ii) for every zone, Pb, Pw, Pe/Pw, $\alpha_i(1 \leq i \leq m)$, $\beta_i$ and $\beta_m$ are variable, and recording is carried out by simply decreasing at least $\alpha_i$ (i is at least one of $2 \leq i \leq m$) from the outer zone towards the inner zone.

29. The optical information recording medium according to claim 28, wherein $Pw_{max}/Pw_{min}<1.2$, where $Pw_{max}$ is the maximum value and $Pw_{min}$ is the minimum value of Pw in the record region.

30. The optical information recording medium according to claim 27, whereby when recording or retrieving of data is carried out by focusing a laser beam having a wavelength of from 600 to 680 nm on the recording layer through the substrate by an object lens having a numerical aperture NA of from 0.55 to 0.65, the recording is carried out under the following conditions:

the inner-most diameter of the record region is within a range of the radius being from 20 to 25 mm, the radius of the outer-most diameter is within a range of from 55 to 60 mm, and the average linear velocity in the inner-most diameter zone is from 3 to 4 m/s, when in the q-th zone (wherein q is an integer of $1 \leq q \leq p$), the angular velocity is represented by $\omega_q$, the average linear velocity is represented by $<V_q>_{ave}$, the maximum linear velocity is represented by $<V_q>_{max}$, the minimum linear velocity is represented by $<V_q>_{min}$, the reference clock period is represented by $T_q$, and the time length of the shortest mark is represented by $n_{min}T_q$, n is an integer of from 1 to 14, m=n−1, $\omega_q$, Pb and Pe/Pw are constant irrespective of the zone, $T_q<V_q>_{ave}$ is substantially constant with respect to all q of $1 \leq q \leq p$, and $(<V_q>_{max}-<V_q>_{min})/(<V_q>_{max}+<V_q>_{min})<10\%$, (i) in the first zone, $\alpha^1_1=0.3$ to 0.8, $\alpha^1_1 \leq \alpha^1_i=0.2$ to 0.4 and is constant irrespective of i ($2 \leq i \leq m$), $\alpha^1_2+\beta^1_1 \geq 1.0$, $\alpha^1_i+\beta^1_{i-1}=1.0$ ($3 \leq i \leq m$), (ii) in the p-th zone, $\alpha^p_1=0.3$ to 0.8, $\alpha^p_1 \geq \alpha^p_i=0.3$ to 0.5 and is constant irrespective of i ($2 \leq i \leq m$), $\alpha^p_i+\beta^p_{i-1}=1.0$ ($2 \leq i \leq m$), and (iii) in other zones, $\alpha^1_i \leq \alpha^q_i \leq \alpha^p_i$ ($2 \leq i \leq m$), and $\alpha^q_1$ is a value between $\alpha^1_1$ $\alpha^p_1$.

31. The optical information recording medium according to claim 30, wherein recording is carried out by adjusting $\alpha_1 \leq \alpha^q_1 \leq \alpha^p_1$ (provided $\alpha^1_1 > \alpha^p_1$).

32. The optical information recording medium according to claim 30, wherein Pb, Pe/Pw, $\beta_1$ and $\beta_m$ are constant irrespective of the zone, and recording is carried out by changing $\alpha_1$ and $\alpha_i$ ($2 \leq i \leq m$) depending on the zone.

33. The optical information recording medium according to claim 30, wherein numerical values for at least Pe/Pw, Pb, Pw, $\beta_m$, ($\alpha^1_1$, $\alpha^p_1$), ($\alpha^1_c$, $\alpha^p_c$) are preliminarily recorded on the substrate by prepits or groove deformation.

34. The optical information recording medium according to claim 30, which is an optical information recording medium having an address information preliminarily recorded on the substrate by prepits or groove deformation, wherein the address includes, together with the address information, an information relating to suitable $\alpha_1$ and $\alpha_i$ ($2 \leq i \leq m$).

35. The optical information recording medium according to any one of claims 1, 2 and 4, wherein a recording laser beam having an erasing power Pe capable of crystallizing amorphous phase is applied between record marks, and when the time length of one record mark is represented by nT (wherein T is the reference clock period, and n is an integer of at least 2), the time length nT of the record mark is divided in the order of:

$\eta_1 T, \alpha_1 T, \beta_1 T, \alpha_2 T, \beta_2 T, \ldots,$
$\alpha_i T, \beta_i T, \ldots, \alpha_m T, \beta_m T, \eta_2 T$ wherein m is a pulse dividing number, and m=n−k, where k is an integer of $0 \leq k \leq 2$, $\Sigma_i(\alpha_i+\beta_i)+\eta_1\eta_n=n$, $\eta_1$ is a real number of $\eta_1 \geq 0$, $\eta_2$ is a real number of $\eta_2 \geq 0$, provided $0 \leq \eta_1+\eta_2 \leq 2.0$, $\alpha_i(1 \leq i \leq m)$ is a real number of $\alpha_i>0$, $\beta_i(1 \leq i \leq m)$ is a real number of $\beta_i>0$, $\alpha_1=0.1$ to 1.5, $\beta_1=0.3$ to 1.0, $\beta_m=0$ to 1.5, and when i is $2 \leq i \leq m$, $\alpha_i$ is within a range of from 0.1 to 0.8 and is constant irrespective of i, and when i is $3 \leq i \leq m$, $\alpha_i+\beta_{i-1}$ is within a range of from 0.5 to 1.5 and is constant irrespective of i, a recording laser beam having a writing power Pw of Pw>Pe, sufficient to melt the recording layer, is applied within the time of $\alpha_i T$ ($1 \leq i \leq m$), and a recording laser beam having a bias power Pb of $0<Pb \leq 0.2Pe$ is applied within the time of $\beta_i T$ ($1 \leq i \leq m$) (provided that within $\beta_m T$, the bias power may be $0<Pb \leq Pe$), and while maintaining m, $\alpha_i+\beta_{i-1}$ ($3 \leq i \leq m$), $\alpha_1 T$ and $\alpha_i T$ ($2 \leq \leq m$) to be constant irrespective of the linear velocity, $\beta_m$ is changed so that it simply increases as the linear velocity is small.

36. The optical information recording medium according to claim 35 for recording under the following conditions:

$Pw_{max}/Pw_{min} \leq 1.2$,

Pe/Pw=0.4 to 0.6, $0 \leq Pb \leq 1.5$ (mW)

where $Pw_{max}$ is the maximum recording power and $Pw_{min}$ is the minimum recording power, at each recording linear velocity.

37. The optical information recording medium according to claim 36 for recording under a condition of $\Sigma\alpha_i<0.5n$ at a recording linear velocity of at most 5 m/s.

38. The optical information recording medium according to claim 36 for recording under a condition such that when $\beta_m$ at the maximum recording linear velocity is represented by $\beta^H_m$ and $\beta_m$ at the minimum recording linear velocity is represented by $\beta^L_m$, $\beta_m$ at other recording linear velocities is a value between $\beta^L_m$ and $\beta^H_m$, and Pb and Pe/Pw are constant irrespective of the recording linear velocity.

39. The optical information recording medium according to claim 38, wherein numerical values for at least the Pe/Pw ratio, Pb, Pw, $\alpha_1 T$, $\alpha_i T$ ($2 \leq i \leq m$) and ($\alpha^L_m$, $\alpha^H_m$) are preliminarily recorded on the substrate by prepits or groove deformation.

40. The optical information recording medium according to claim 35 for recording under a condition such that $\beta_m$ is constant irrespective of the recording linear velocity.

41. The optical information recording medium according to any one of claims 1, 2 and 4, which is an optical information recording medium having a predetermined record region, the record region being divided into p zones having radially equal widths and designed to record information by a plurality of mark lengths, by rotating the medium at a constant angular velocity irrespective of the radial position, wherein on the substrate, a groove having a predetermined groove-wobbling signal, is formed, so that the reference period of the groove-wobbling signal varies for every zone, and when in the q-th zone (provided that q is an integer of $1 \leq q \leq p$), the average linear velocity is represented by $<V_q>_{ave}$, the maximum linear velocity is represented by $<V_q>_{max}$, the minimum linear velocity is represented by $<V_q>_{min}$ and the reference period of the groove-wobbling signal is represented by $Tw_q$, $<V_q>_{ave}Tw_q$ is constant, and $(<V_q>_{max}-<V_q>_{min})/(<V_q>_{max}+<V_q>_{min})<1\%$.

42. The optical information recording medium according to claim 41, wherein one revolution of the above groove is taken as one zone, the groove is wobbling with a constant period irrespective of the zone, and the following relation is approximately satisfied:

$$2\pi \cdot TP = a \cdot Tw_0 \cdot v_0$$

where TP is the groove pitch, $Tw_0$ is the wobbling period, and a is a natural number.

43. An optical recording method, which comprises recording information on the optical information recording medium as defined in claim 41, wherein the reference clock period $T_q$ is generated as a multiple or a divisor of the reference period $Tw_q$ of the groove wobbling in each zone.

44. The optical information recording medium according to any one of claims 1, 2 and 4, which is an optical information recording medium having a predetermined record region, the record region being divided into p zones (provided that p is an integer of at least 200) having radially equal widths, and designed to record information by a plurality of mark lengths, by rotating the medium at a constant angular velocity irrespective of the radial position, wherein on the substrate, a groove having a predetermined groove-wobbling signal, is formed, so that the reference period of the groove-wobbling signal varies for every zone, and $<V_q>_{ave}Tw_q$ is constant, where $<V_q>_{ave}$ is the average linear velocity, and $Tw_q$ is the reference period of the groove-wobbling signal.

45. The optical information recording medium according to claim 44, wherein the inner-most diameter of the above record region is within a range of the radius being from 20 to 25 mm, and the outer-most diameter is within a range of the radius being from 55 to 60 mm.

46. An optical recording method for an optical information recording medium, which comprises recording information on the optical information recording medium, wherein a shortest mark length is at most 0.5 μm, and a crystal state is an unrecorded or erased state and an amorphous state is a recorded state, which has, on a substrate, at least a phase change recording layer, wherein erasing of information is made by recrystallization which substantially proceeds by crystal growth from a boundary between a peripheral crystal portion and an amorphous portion or a melt portion, wherein a recording laser beam having an erasing power Pe capable of crystallizing amorphous phase is applied between record marks, and when the time length of one record mark is represented by nT (wherein T is the reference clock period, and n is an integer of at least 2), the time length nT of the record mark is divided in the order of:

$\eta_1 T, \alpha_1 T, \beta_1 T, \alpha_2 T, \beta_2 T, \ldots,$ $\alpha_i T, \beta_i T, \ldots, \alpha_m T, \beta_m T, \eta_2 T$ wherein m is a pulse dividing number, and m=n−k, where k is an integer of $0 \leq k \leq 2$, $\Sigma_i(\alpha_i+\beta_i)+\eta_1\eta_n=n$, $\eta_1$ is a real number of $\eta_1 \geq 0$, $\eta_2$ is a real number of $\eta_2 \geq 0$, provided $0 \leq \eta_1+\eta_2 \leq 2.0$, $\alpha_i(1 \leq i \leq m)$ is a real number of $\alpha_i>0$, $\beta_i(1 \leq i \leq m)$ is a real number of $\beta_i>0$, $\Sigma\alpha_i<0.5n$, $\alpha_1=0.1$ to 1.5, $\beta_1=0.3$ to 1.0, $\beta_m=0$ to 1.5, $\alpha_i=0.1$ to 0.8 ($2 \leq i \leq m$), and when i is $3 \leq i \leq m$, $\alpha_i+\beta_{i-1}$ is within a range of from 0.5 to 1.5 and is constant irrespective of i, a recording laser beam having a writing power Pw of $Pw \geq Pe$, sufficient to melt the recording layer, is applied within the time of $\alpha_i T$ ($1 \leq i \leq m$), and a recording laser beam having a bias power Pb of $0<Pb \leq 0.2Pe$ is applied within the time of $\beta_i T(1 \leq i \leq m)$ (provided that within $\beta_m T_1$ the bias power may be $0<Pb \leq Pe$).

47. The optical recording method according to claim 46, wherein recording or retrieving of data is carried out by focusing a laser beam having a wavelength of from 350 to 680 nm on the recording layer through an object lens having a numerical aperture NA of from 0.55 to 0.9, and wherein:

m=n−1 or m=n−2, $\alpha_1=0.3$ to 1.5, $\alpha_1 \leq \alpha_i=0.2$ to 0.8 ($2 \leq i \leq m$), $\alpha_i\beta_{i-1}=1.0$ ($3 \leq i \leq m$), $0 \leq Pb \leq 1.5$ (mW), $0.3 \leq Pe/Pw \leq 0.6$.

48. The optical recording method according to claim 46 or 47, wherein recording or retrieving of data is carried out by focusing a laser beam having a wavelength of from 600 to 680 nm on the recording layer through the substrate by an object lens having a numerical aperture NA of from 0.55 to 0.65, with the shortest mark length being within a range of from 0.35 to 0.45 μm, and wherein:

n is an integer of from 1 to 14, m=n−1,

Pb is constant irrespective of the linear velocity,

Pe/Pw is changeable depending upon the linear velocity within a range of from 0.4 to 0.6, (i) within a linear velocity of from 3 to 4 m/s, the reference clock period T is To, $\alpha_1=0.3$ to 0.8, $\alpha_1 \geq \alpha_i=0.2$ to 0.4 and is constant irrespective of i ($2 \leq i \leq m$), $\alpha_2+\beta_1 \geq 1.0$ $\alpha_i+\beta_{i-1}=1.0$ ($3 \leq i \leq m$), $\beta_m=0.3$ to 1.5, and a recording laser beam having a writing power Pw1 is irradiated within the time of $\alpha_i T$ ($1 \leq i \leq m$), (ii) within a linear velocity of from 6 to 8 m/s, the reference clock period T is To/2, $\alpha'_1=0.3$ to 0.8, $\alpha'_1 \geq \alpha'_i=0.3$ to 0.5 and is constant irrespective of i ($2 \leq i \leq m$), $\alpha'_1+\beta'_{i-1}=1.0$ ($3 \leq i \leq m$), $\beta'_m=0$ to 1.0, and a recording laser beam having a writing power Pw2 is irradiated within the time of $\alpha_i T(1 \leq i \leq m)$, wherein $\alpha'_{i>\alpha i}(2 \leq i \leq m)$, and $0.8 \leq Pw1/Pw2 \leq 1.2$.

49. The optical recording method according to claim 46, which is a method for recording information by a plurality of mark lengths by rotating the medium having a predetermined record region, at a constant angular velocity, wherein the medium is rotated so that the linear velocity at the inner-most diameter of the record region will be from 2 to 4 m/s, and the linear velocity at the outer-most diameter of the record region will be from 6 to 10 m/s, wherein the record region comprises a plurality of radially divided zones, and recording is carried out by changing the reference clock period T so that the recording density becomes substantially constant depending upon the average linear velocity within each zone, m is made constant irrespective of the zone, and Pb/Pe and/or $\alpha_i$ (i is at least one of $1<i \leq m$) is simply decreased from the outer zone towards the inner zone.

50. The optical recording method according to claim 49, wherein the record region is radially divided into p zones, and when the inner-most diameter side is referred to as the first zone, the outer-most diameter side is referred to as the p-th zone, and in the q-th zone (wherein q is an integer of $1 \leq q \leq p$), the angular velocity is represented by $\omega_q$, the average linear velocity is represented by $<V_q>_{ave}$, the maximum linear velocity is represented by $<V_q>_{max}$, the minimum linear velocity is represented by $<V_q>_{min}$, the reference clock period is represented by $T_q$, and the time length of the shortest mark is represented by $n_{min}T_q$, $<V_p>_{ave}/<V_1>_{ave}$ is within a range of from 1.2 to 3, and $<V_q>_{max}/<V_q>_{min}$ is at most 1.5, (i) within the same zone, $\omega_q$, $T_q$, $\alpha_i$, $\beta_i$, Pe, Pb and Pw are constant, the physical length $n_{min}T_q<V_q>_{ave}$ of the shortest mark is at most 0.5 µm, $T_q<V_q>_{ave}$ is substantially constant with respect to all q of $1 \leq q \leq p$, and m=n−1 or m=n−2, $\alpha_1 = 0.3$ to 1.5, $\alpha_1 \leq \alpha_i = 0.2$ to 0.8 ($2 \leq i \leq m$), $\alpha_i \beta_{i-1} = 1.0$ ($3 \leq i \leq m$), $0 \leq Pb \leq 1.5$ (mW), $0.4 \leq Pe/Pw \leq 0.6$, and (ii) in each zone, Pb, Pw, Pe/Pw, $\alpha_i$ ($1 \leq i < n$), $\beta_1$ and $\beta_m$ are variable, and at least $\alpha_i$ (i is at least one of $2 \leq i \leq m$) simply decreases from the outer zone towards the inner zone.

51. The optical recording method according to claim 50, wherein $Pw_{max}/Pw_{min} < 1.2$, where $Pw_{max}$ is the maximum value and $Pw_{min}$ is the minimum value of Pw in the record region.

52. The optical recording method according to any one of claims 49 to 51, wherein recording or retrieving of data is carried out by focusing a laser beam having a wavelength of from 600 to 680 nm on the recording layer through the substrate by an object lens having a numerical aperture NA of from 0.55 to 0.65, and wherein the inner-most diameter of the record region is within a range of the radius being from 20 to 25 mm, the radius of the outer-most diameter is within a range of from 55 to 60 mm, and the average linear velocity in the inner-most diameter zone is from 3 to 4 m/s, when in the q-th zone (wherein q is an integer of $1 \leq q \leq p$), the angular velocity is represented by $\int_q$, the average linear velocity is represented by $<V_q>_{ave}$, the maximum linear velocity is represented by $<V_q>_{max}$, the minimum linear velocity is represented by $<V_q>_{min}$, the reference clock period is represented by $T_q$, and the time length of the shortest mark is represented by $n_{min}T_q$, n is an integer of from 1 to 14, m=n−1, $\omega_q$, Pb and Pe/Pw are constant irrespective of the zone, $T_q<V_q>_{ave}$ is substantially constant with respect to all q of $1 \leq q \leq p$, and $(<V_q>_{max} - <V_q>_{min})/(<V_q>_{max} + <V_q>_{min}) < 10\%$, (i) in the first zone, $\alpha^1_1 = 0.3$ to 0.8, $\alpha^1_1 \leq \alpha^1_i = 0.2$ to 0.4 and is constant irrespective of i ($2 \leq i \leq m$), $\alpha^1_2 + \beta^1_1 \geq 1.0$, $\alpha^1_i + \beta^1_{i-1} = 1.0$ ($3 \leq i \leq m$), (ii) in the p-th zone, $\alpha^p_1 = 0.3$ to 0.8, $\alpha^p_1 \geq \alpha^p_i = 0.3$ to 0.5 and is constant irrespective of i ($2 \leq i \leq m$), $\alpha^p_i + \beta^p_{i-1} = 1.0$ ($2 \leq i \leq m$), and (iii) in other zones, $\alpha^1_i \leq \alpha^q_i \leq \alpha^p_i$ ($2 \leq i \leq m$), and n is an integer of from 1 to 14, m=n−1, $\omega_q$, Pb and Pe/Pw are constant irrespective of the zone, $T_q<V_q>_{ave}$ is substantially constant with respect to all q of $1 \leq q \leq p$, and $(<V_q>_{max} - <V_q>_{min})/(<V_q>_{max} + <V_q>_{min}) < 10\%$, (i) in the first zone, $\alpha^1_1 = 0.3$ to 0.8, $\alpha^1_1 \leq \alpha^1_i = 0.2$ to 0.4 and is constant irrespective of i ($2 \leq i \leq m$), $\alpha^1_2 + \beta^1_1 \geq 1.0$, $\alpha^1_i + \beta^1_{i-1} = 1.0$ ($3 \leq i \leq m$), (ii) in the p-th zone, $\alpha^p_1 = 0.3$ to 0.8, $\alpha^p_1 \geq \alpha^p_i = 0.3$ to 0.5 and is constant irrespective of i ($2 \leq i \leq m$), $\alpha^p_i + \beta^p_{i-1} = 1.0$ ($2 \leq i \leq m$), and (iii) in other zones, $\alpha^1_i \leq \alpha^q_i \leq \alpha^p_i$ ($2 \leq i \leq m$), and is a value between $\alpha^1_1$ and $\alpha^p_1$.

53. The optical recording method according to claim 52, wherein $\alpha^1_{1 \geq \alpha 1} \geq \alpha^p$ (provided $\alpha^1_1 > \alpha^p_1$).

54. The optical recording method according to claim 52, wherein Pb, Pe/Pw, $\beta_1$, and $\beta_m$ are constant irrespective of the zone, and only $\alpha_1$ and $\alpha_i$ ($2 \leq i \leq m$) are changed depending upon the zone.

55. The optical recording method according to claim 46, which is a method for recording information by a plurality of mark lengths by rotating an optical information recording medium having a predetermined record region, wherein the record region is divided into a plurality of zones in the radial direction, and in each zone, recording is carried out at a constant linear velocity, the ratio of the recording linear velocity $V_{out}$ in the outer-most diameter zone to the recording linear velocity $V_{in}$ in the inner-most diameter zone, i.e. $V_{out}/V_{in}$ is from 1.2 to 2, $\alpha_i = 0.3$ to 0.6 ($2 \leq i \leq m$), and $\beta_m = 0$ to 1.5, and m, $\alpha_i + \beta_{i-1}$ ($3 \leq i \leq m$), $\alpha_1 T$, Pe/Pw nd Pb are constant irrespective of the linear velocity, and $\alpha_i$ and/or $\beta_m$ is changed depending upon the linear velocity.

56. An optical recording method for an optical information recording medium, which comprises recording information on the optical information recording medium, wherein a shortest mark length is at most 0.5 µm, and a crystal state is an unrecorded or erased state and an amorphous state is a recorded state, which has, on a substrate, at least a phase change recording layer, wherein erasing of information is made by recrystallization which substantially proceeds by crystal growth from a boundary between a peripheral crystal portion and an amorphous portion or a melt portion, wherein a recording laser beam having an erasing power Pe capable of crystallizing amorphous phase is applied between record marks, and when the time length of one record mark is represented by nT (wherein T is the reference clock period, and n is an integer of at least 2), the time length nT of the record mark is divided in the order of:

$\eta_1 T, \alpha_1 T, \beta_1 T, \alpha_2 T, \beta_2 T, \ldots ,$ $\alpha_i T, \beta_i T, \ldots , \alpha_m T, \beta_m T, \eta_2 T$ wherein m is a pulse dividing number, and m=n−k, where k is an integer of $0 \leq k \leq 2$, $\Sigma_i(\alpha_i + \beta_i) + \eta_1 + \eta_2 = n$, $\eta_1$ is a real number of $\eta_1 \geq 0$, $\eta_2$ is a real number of $\eta_2 \geq 2.0$, provided $0 \leq \eta_1 + \eta_2 \leq 2.0$, $\alpha_i$ ($1 \leq i \leq m$) is a real number of $\alpha_i > 0$, $\beta_i$ ($1 \leq i \leq m$) is a real number of $\beta_i > 0$, $\alpha_1 = 0.1$ to 1.5, $\beta_1 = 0.3$ to 1.0, $\beta_m = 0$ to 1.5, and when i is $2 \leq i \leq m$, $\alpha_i$ is within a range of from 0.1 to 0.8 and is constant irrespective of i, and when i is $3 \leq i \leq m$, $\alpha_i + \beta_{i-1}$ is within a range of from 0.5 to 1.5 and is constant irrespective of i, a recording laser beam having a writing power Pw of Pw>Pe, sufficient to melt the recording layer, is applied within the time of $\alpha_i T$ ($1 \leq i \leq m$), and a recording laser beam having a bias power Pb of $0 < Pb \leq 0.2Pe$ is applied within the time of $\beta_i T$ ($1 \leq i \leq m$) (provided that within $\beta_m T$, the bias power may be $0 < Pb \leq Pe$), and while maintaining m, $\alpha_i + \beta_{i-1}$ ($3 \leq i \leq m$), $\alpha_1 T$ and $\alpha_i T$ ($2 \leq i \leq m$) to be constant irrespective of the linear velocity, $\beta_m$ is changed so that it simply increases as the linear velocity is small.

57. The optical recording method according to claim 56 for recording under the following conditions:

$Pw_{max}/Pw_{min} \leq 1.2$, $Pe/Pw = 0.4$ to 0.6, $0 \leq Pb \leq 1.5$ (mW)

where $Pw_{max}$ is the maximum recording power and $Pw_{min}$ is the minimum recording power, at each recording linear velocity.

58. The optical recording method according to claim 57 for recording under a condition of $\Sigma \alpha_i < 0.5n$ at a recording linear velocity of at most 5 m/s.

59. The optical recording method according to claim 57 for recording under a condition such that when $\beta_m$ at the maximum recording linear velocity is represented by $\beta^H_m$ and $\beta_m$ at the minimum recording linear velocity is represented by $\beta^L_m$, $\beta_m$ at other recording linear velocities is a value between $\beta^L_m$ and $\beta^H_m$, and Pb and the Pe/Pw ratio are constant irrespective of the recording linear velocity.

60. The optical recording method according to any one of claims 56 to 58 for recording under a condition such that $\beta_m$ is constant irrespective of the recording linear velocity.

61. The optical recording method according to claim 56, which is a method for recording information by a plurality of mark lengths by rotating an optical information recording medium having a predetermined record region, wherein the record region is divided into a plurality of zones in the radial direction, and within each zone, recording is carried out at a constant linear velocity, the ratio of the recording linear velocity $V_{out}$ at the outer-most diameter zone to the recording linear velocity $V_{in}$ at the inner-most diameter zone, i.e. $V_{out}/V_{in}$, is from 1.2 to 2, and $\beta_m$ is changed depending upon the linear velocity in each zone.

62. An optical information recording medium for recording information by a plurality of record mark lengths, wherein the shortest mark length is at most 0.5 μm, and a crystal state is an unrecorded or erased state and an amorphous state is a recorded state, which has, on a substrate, at least a phase change recording layer, wherein erasing of information is made by recrystallization which substantially proceeds by crystal growth from a boundary between a peripheral crystal portion and an amorphous portion or a melt portion, and wherein the phase change recording layer is made of a thin film comprising, as a main component, a $M_y(Sb_x Te_{1-x})_{1-y}$ alloy ($0.6 \leq 0.9$, $0 < y \leq 0.2$, M is at least one of Ga, Zn, Ge, Sn, In, Si, Cu, Au, Ag, Al, Pd, Pt, Pb, Cr, Co, O, S, Se, Ta, Nb and V).

63. An optical information recording medium for recording information by a plurality of record mark lengths, wherein the shortest mark length is at most 0.5 μm, and a crystal state is an unrecorded or erased state and an amorphous state is a recorded state, which has, on a substrate, at least a phase change recording layer, wherein erasing of information is made by recrystallization which substantially proceeds by crystal growth from a boundary between a peripheral crystal portion and an amorphous portion or a melt portion, and wherein when recording of signals is carried out by a plurality of record mark lengths of which the shortest mark length is at most 0.5 μm, the recording is made under the following condition:

$M_1/M_0 \geq 0.9$ wherein $M_0$ represents a modulation of signals retrieved immediately after the recording, and $M_1$ represents a modulation of signals retrieved after the recording medium is kept for 1,000 hours under a condition of 80° C. and 80% relative humidity after the recording.

* * * * *